US012597990B2

(12) United States Patent
Ravishankar et al.

(10) Patent No.: US 12,597,990 B2
(45) Date of Patent: Apr. 7, 2026

(54) SYSTEMS AND METHOD FOR 5G-BASED NON-GEOSTATIONARY SATELLITE SYSTEMS (NGSOs) WITH INTER-SATELLITE LINKS

(71) Applicant: Hughes Network Systems, LLC, Germantown, MD (US)

(72) Inventors: Channasandra S. Ravishankar, Clarksburg, MD (US); James Jehong Jong, North Potomac, MD (US); Nassir Benammar, Germantown, MD (US); Deepak Manohar Arur, Germantown, MD (US); Gaguk Zakaria, College Park, MD (US); Subramanya Bayar Krishna, Germantown, MD (US); John Corrigan, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 397 days.

(21) Appl. No.: 18/112,155

(22) Filed: Feb. 21, 2023

(65) Prior Publication Data

US 2023/0269780 A1 Aug. 24, 2023

Related U.S. Application Data

(60) Provisional application No. 63/312,044, filed on Feb. 20, 2022.

(51) Int. Cl.
*H04B 7/185* (2006.01)
*H04L 5/00* (2006.01)
*H04W 74/0833* (2024.01)

(52) U.S. Cl.
CPC ............ *H04B 7/185* (2013.01); *H04L 5/005* (2013.01); *H04W 74/0833* (2013.01)

(58) Field of Classification Search
CPC ............... H04W 74/0833; H04B 7/185; H04B 7/18539; H04B 7/1851; H04L 5/005
See application file for complete search history.

(56) References Cited

U.S. PATENT DOCUMENTS 6,178,163 B1 1/2001 Yuan et al.
10,523,312 B1 * 12/2019 Tong .................. H04B 7/18513
(Continued)

FOREIGN PATENT DOCUMENTS

IT RM970695 A1 5/1999

OTHER PUBLICATIONS

Canadian Office Action for Application No. 3,252,336, mailed on Sep. 23, 2025, 3 pages.

*Primary Examiner* — Kenny S Lin
*Assistant Examiner* — Wilfred Thomas
(74) *Attorney, Agent, or Firm* — Mannava & Kang, P.C.

(57) ABSTRACT

Systems and methods for communication between user terminals and core network through satellite network and ground network are disclosed herein. The system facilitates connectivity through inter-satellite links in the satellite network. The system provides an air interface based on 5G protocols with satellite specific enhancements at lower layers, low latency, standards based physical layer design on both user and feeder links, beam-hopping design that minimizes end-to-end delay, software defined networking for route management to minimize payload complexity, efficient flow control between ground network and satellite to minimize buffering requirements in satellite payload, differentiated quality of service, advanced scheduler designs to cater to traffic types and full/half duplex terminals, end-to-end Layer 2 transport, direct user terminal to user terminal communications, adaptive modulation and coding, scalable gateway, and the like.

18 Claims, 41 Drawing Sheets

3600

(56) References Cited

U.S. PATENT DOCUMENTS

| | | | | |
|---|---|---|---|---|
| 11,510,238 | B2 * | 11/2022 | Wang | H04W 74/006 |
| 11,985,618 | B2 * | 5/2024 | Narasimha | H04B 7/18506 |
| 12,082,255 | B2 * | 9/2024 | Wu | H04W 74/0833 |
| 2014/0022983 | A1 * | 1/2014 | Ravishankar | H04B 7/18543<br>370/316 |
| 2018/0316414 | A9 | 11/2018 | Ravishankar et al. | |
| 2020/0259739 | A1 * | 8/2020 | Kantawala | H04W 40/26 |
| 2021/0037393 | A1 * | 2/2021 | Choi | H04L 67/10 |
| 2021/0058293 | A1 * | 2/2021 | Whitefield | H04B 7/18539 |
| 2021/0306869 | A1 | 9/2021 | Wei et al. | |
| 2021/0345188 | A1 * | 11/2021 | Shaheen | H04W 88/085 |
| 2021/0377825 | A1 | 12/2021 | Deenoo et al. | |
| 2022/0014265 | A1 * | 1/2022 | Greenidge | H04B 7/18521 |
| 2022/0086786 | A1 * | 3/2022 | Narasimha | H04W 56/0005 |
| 2022/0104082 | A1 * | 3/2022 | Sedin | H04W 36/0085 |
| 2022/0150972 | A1 * | 5/2022 | Turtinen | H04L 43/0864 |
| 2022/0278742 | A1 * | 9/2022 | Gineste | H04B 7/18504 |
| 2023/0072679 | A1 * | 3/2023 | Lauridsen | H04W 74/0833 |

* cited by examiner

1100

1200

10.7 GHz                               12.7 GHz

| RHCP | 1R | 2R | 3R | 4R | 5R | 6R | 7R | 8R |
| --- | --- | --- | --- | --- | --- | --- | --- | --- |
| LHCP | 1L | 2L | 3L | 4L | 5L | 6L | 7L | 8L |

1300

14.0 GHz              14.5 GHz

| RHCP | 1R | 2R | 3R | 4R |
| --- | --- | --- | --- | --- |
| LHCP | 1L | 2L | 3L | 4L |

1400

| Data/Ctrl | Status Poll | Segmentation Info | Reserved | Sequence Number |
|---|---|---|---|---|
| Sequence Number | | | | |
| Sequence Number | | | | |
| Data | | | | |
| Data | | | | |

1500

| Data/Ctrl | Status Poll | Segmentation Info | Reserved | Sequence Number |
|---|---|---|---|---|
| Sequence Number | | | | |
| Sequence Number | | | | |
| Segment Offset | | | | |
| Segment Offset | | | | |
| Data | | | | |

1600

2300

| DWELL CYCLE # | SI AND RACH | DATA TRAMISSION |
|---|---|---|
| 0 | CELL 1 | |
| 1 | | CELL 1 |
| 2 | | CELL 1 |
| 3 | | CELL 2 |
| 4 | | CELL 2 |
| 5 | CELL 2 | |
| 6 | | CELL 1 |
| 7 | | CELL 1 |
| 8 | | CELL 2 |
| 9 | | CELL 2 |
| 10 | CELL 3 | |
| 11 | | CELL 1 |
| 12 | | CELL 1 |
| 13 | | CELL 2 |
| 14 | | CELL 3 |
| 15 | CELL 4 | |
| 16 | | CELL 1 |
| 17 | | CELL 1 |
| 18 | | CELL 2 |
| 19 | | CELL 3 |
| 20 | CELL 5 | |
| 21 | | CELL 1 |
| 22 | | CELL 1 |
| 23 | | CELL 2 |
| 24 | | CELL 3 |
| | | |

2400

| Dwell Cycle # | SI and RACH | Downlink Only | Data Tramission |
|---|---|---|---|
| 0 | Cell 1 | Cell 1 | |
| 1 | | | Cell 1 |
| 2 | | | Cell 1 |
| 3 | | | Cell 2 |
| 4 | | | Cell 2 |
| 5 | Cell 2 | Cell 2 | |
| 6 | | | Cell 1 |
| 7 | | | Cell 1 |
| 8 | | | Cell 2 |
| 9 | | | Cell 2 |
| 10 | Cell 3 | Cell 1 | |
| 11 | | | Cell 1 |
| 12 | | | Cell 1 |
| 13 | | | Cell 2 |
| 14 | | | Cell 3 |
| 15 | Cell 4 | Cell 3 | |
| 16 | | | Cell 1 |
| 17 | | | Cell 1 |
| 18 | | | Cell 2 |
| 19 | | | Cell 3 |
| 20 | Cell 5 | Cell 2 | |
| 21 | | | Cell 1 |
| 22 | | | Cell 1 |
| 23 | | | Cell 2 |
| 24 | | | Cell 3 |
| | | | |

3600

| In Label | LSP | Dest. | Out I/F | Out Label |
|---|---|---|---|---|
| 1 | LSP12F | SAT2 | SAP1 | 1 |
| 2 | LSP12R | LXP1 | - | - |
| 3 | LSP11F | SAT1 | SAP1 | 3 |
| 4 | LSP11R | LXP2 | - | - |

| In Label | LSP | Dest. | Out I/F | Out Label |
|---|---|---|---|---|
| 1 | LSP23F | SAT3 | SAP1 | 1 |
| 2 | LSP23R | LXP2 | - | - |
| 3 | LSP22F | SAT2 | SAP1 | 5 |
| 4 | LSP22R | LXP2 | - | - |
| 5 | LSP21F | SAT1 | SAP1 | 3 |
| 6 | LSP21R | LXP2 | - | |

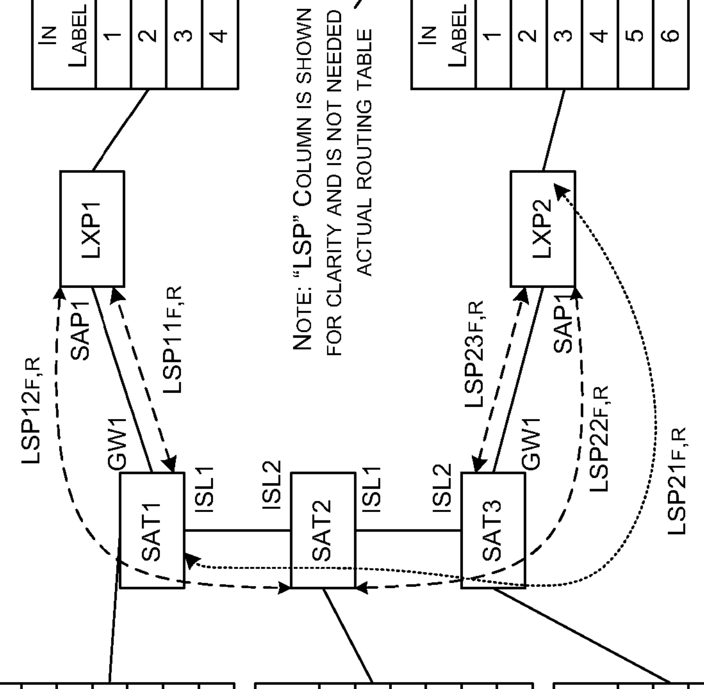

| In Label | LSP | Dest. | Out I/F | Out Label |
|---|---|---|---|---|
| 1 | LSP12F | SAT2 | ISL1 | 1 |
| 2 | LSP12R | LXP1 | GW1 | 2 |
| 3 | LSP11F | SAT1 | - | - |
| 4 | LSP11R | LXP2 | GW1 | 4 |
| 5 | LSP21F | SAT1 | - | - |
| 6 | LSP21R | LXP2 | ISL1 | 4 |

| In Label | LSP | Dest. | Out I/F | Out Label |
|---|---|---|---|---|
| 1 | LSP12F | SAT2 | | - |
| 2 | LSP12R | LXP1 | ISL2 | |
| 3 | LSP21F | SAT1 | ISL2 | |
| 4 | LSP21R | LXP2 | ISL1 | |
| 5 | LSP22F | SAT1 | - | - |
| 6 | LSP22R | LXP2 | ISL1 | |

| In Label | LSP | Dest. | Out I/F | Out Label |
|---|---|---|---|---|
| 1 | LSP23F | SAT3 | - | - |
| 2 | LSP23R | LXP2 | GW1 | 2 |
| 3 | LSP21F | SAT1 | ISL2 | 3 |
| 4 | LSP21R | LXP2 | GW1 | 6 |
| 5 | LSP22F | SAT2 | ISL2 | 5 |
| 6 | LSP22R | LXP2 | GW1 | 4 |

FIG. 36

SYSTEMS AND METHOD FOR 5G-BASED NON-GEOSTATIONARY SATELLITE SYSTEMS (NGSOs) WITH INTER-SATELLITE LINKS

PRIORITY CLAIM

This application claims priority from U.S. provisional application No. 63/312,044 filed on Feb. 20, 2022, the disclosure of which is incorporated in its entirety herein.

BACKGROUND

In order to access a service provider network, a user terminal may communicate with a core network through a satellite network and a ground network. Many user terminals use ground-based cellular networks. Furthermore, many protocols for accessing core networks are defined based on the characteristics of ground-based networks.

There may be a need for systems and methods for 5G-based non-geostationary satellite systems with inter-satellite links.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 36 illustrates an example representation of a routing table generated by the RDF.

Figure 1:
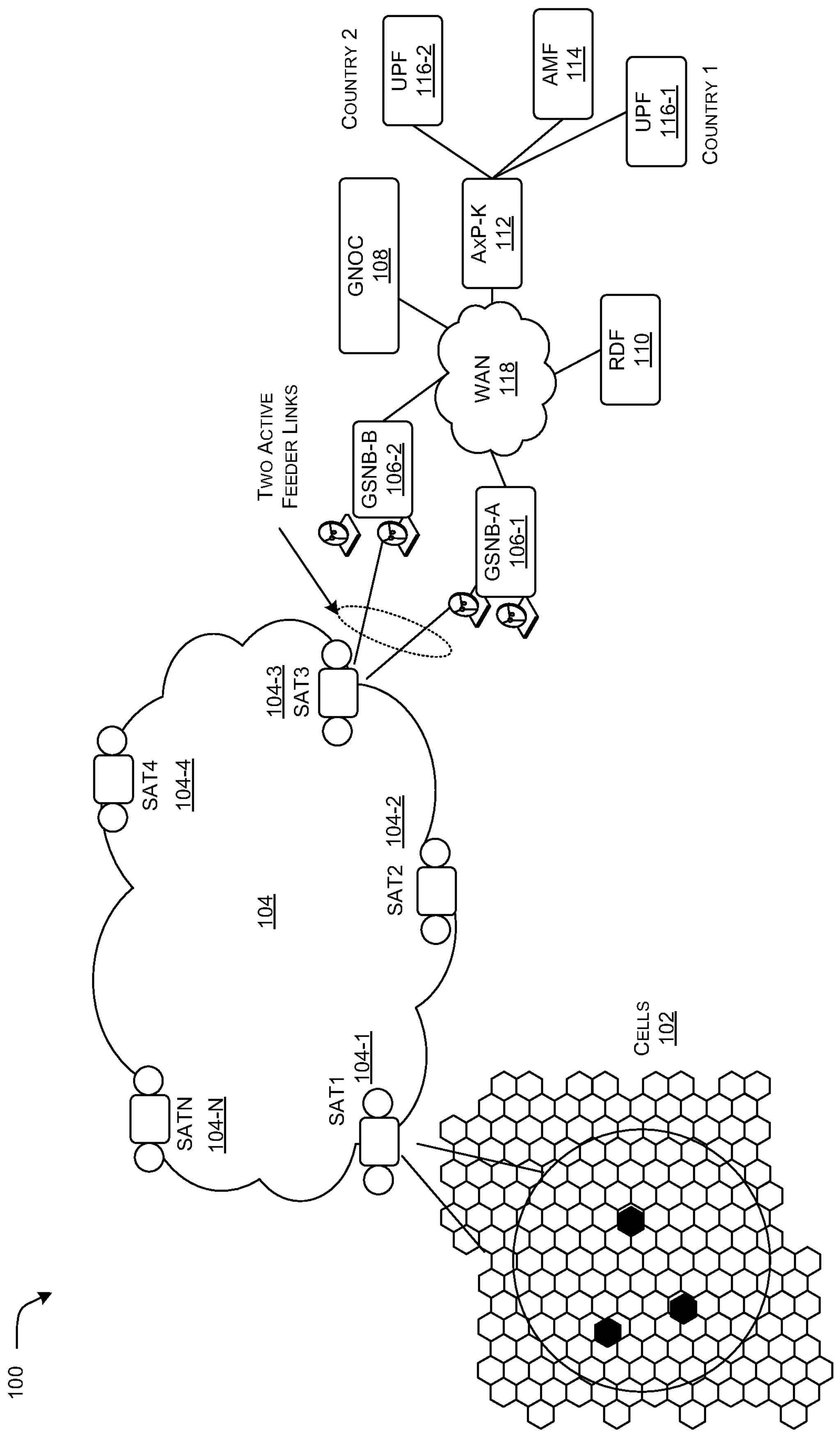
FIG. 1 illustrates an example operating environment or a network architecture for implementing a non-geostationary satellite system.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual examples may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word— without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In an aspect, the present system relates to a communication device including a processor, and a memory coupled to the processor. The memory may include processor-executable instructions to cause the communication device to obtain, via a control plane layer, system information block (SIB) of a source satellite in a satellite network, and receive, via the control plane layer, a radio resource control (RRC) message on a random access channel (RACH) from a user device based on a schedule defined in the SIB, where the RRC message may include a label including information of a destination satellite in the satellite network. Further, the communication device may be to determine an intermediate satellite in the satellite network based on the RRC message, transmit, via a route management plane layer, the RRC message to the destination satellite through the intermediate satellite, and establish, via a user plane layer, a connection between the user device and the ground network through the destination satellite.

In an example, the SIB may include at least one of gateway identifier (ID), feeder link ID, and satellite ID.

In an example, the ground network may include at least a Ground System Node-B (GSNB), an anchor processor (AxP), and a route determination function (RDF) module.

In an example, the communication device may be to communicate via the control plane layer by using at least an RRC layer between the user device and the AxP in the ground network, a packet data convergence protocol (PDCP) layer between the user device and the AxP in the ground network, a radio link control (RLC) layer between the user device and the AxP in the ground network, and a physical (PHY)/medium access control (MAC) layer between the user device and user-link satellite in the satellite network.

In an example, the label may include a satellite identifier (ID) and a feeder link ID for the destination satellite, a satellite ID of the source satellite, and a cell ID, and where the cell ID may include a Cell Radio Network Temporary ID.

In an example, the communication device may be to determine the intermediate satellite based on a routing table of inter-satellite links maintained by each satellite in the satellite network.

In an example, the communication device may be to transmit information corresponding to the inter-satellite links in the satellite network to a Route Determination Function (RDF) module in the ground network via the route management plane layer between the satellite network and the RDF, and receive, via the route management plane layer, the routing table of the inter-satellite links from the RDF based on the information corresponding to the inter-satellite links.

In an example, the communication device may be to communicate via the user plane layer by using at least a physical (PHY)/medium access control (MAC) layer between the user device and user-link satellite in the satellite network, a radio link control (RLC) layer between the user device and a Ground System Node-B (GSNB) in the ground network, and a packet data convergence protocol (PDCP)/service data adaptation protocol (SDAP) layer between the user device and an anchor processor (AxP) in the ground network.

In another aspect, the present method may include obtaining, by a processor, via a control plane layer, system information block (SIB) of a source satellite in a satellite network, and receiving, by the processor, via the control plane layer, a radio resource control (RRC) message on a random access channel (RACH) from a user device based on a schedule defined in the SIB, where the RRC message may include a label including information of a destination satellite in the satellite network. Further, the method may include determining, by the processor, an intermediate satellite in the satellite network based on the RRC message, transmitting, by the processor, via a route management plane layer, the RRC message to the destination satellite through the intermediate satellite, and establishing, by the processor, via a user plane layer, a connection between the user device and the ground network through the destination satellite.

In an example, the method may include communicating, by the processor, via the control plane layer, by using at least an RRC layer between the user device and the AxP in the ground network, a packet data convergence protocol (PDCP) layer between the user device and the AxP in the ground network, a radio link control (RLC) layer between the user device and the AxP in the ground network, and a physical (PHY)/medium access control (MAC) layer between the user device and user-link satellite in the satellite network.

In an example, the method may include determining, by the processor, the intermediate satellite based on a routing table of inter-satellite links maintained by each satellite in the satellite network.

In an example, the method may include transmitting, by the processor, information corresponding to the inter-satellite links in the satellite network to a Route Determination Function (RDF) module in the ground network via the route management plane layer between the satellite network and the RDF, and receiving, by the processor, via the route management plane layer, the routing table of the inter-satellite links from the RDF based on the information corresponding to the inter-satellite links.

In an example, the method may include communicating, by the processor, via the user plane layer, by using at least a physical (PHY)/medium access control (MAC) layer between the user device and user-link satellite in the satellite network, a radio link control (RLC) layer between the user device and a Ground System Node-B (GSNB) in the ground network, and a packet data convergence protocol (PDCP)/service data adaptation protocol (SDAP) layer between the user device and an anchor processor (AxP) in the ground network.

In another aspect, the present system relates to a non-transitory computer readable medium including processor-executable instructions that causes a processor to obtain, via a control plane layer, system information block (SIB) of a source satellite in a satellite network, transmit the SIB to a cell serving a user device based on a schedule defined in the SIB, receive, via the control plane layer, a radio resource control (RRC) message on a random access channel (RACH) from the user device based on the schedule, where the RRC message may include a label including information of a destination satellite in the satellite network, determine an intermediate satellite in the satellite network based on the RRC message, transmit, via a route management plane layer, the RRC message to the destination satellite through the intermediate satellite, and establish, via a user plane layer, a connection between the user device and the ground network through the destination satellite.

The various examples throughout the disclosure will be explained in more detail with reference to FIGS. 1-46.

FIG. 1 illustrates an example operating environment or a network architecture 100 for implementing a non-geostationary satellite system.

Referring to FIG. 1, the network architecture 100 may include one or more user terminals in designated cells 102, a satellite network 104 including a plurality of satellites (104-1, 104-2, 104-3 . . . 104-N), a ground network including one or more Ground System Node-Bs (GSNB) such as GSNB-A 106-1 and GSNB-B 106-2, a global network operations center (GNOC) 108, a route determination function (RDF) module 110, and one or more anchor processor (AxP) such as AxP-K 112, and a core network including an access and mobility function (AMF) module 114 and one or more user plane function (UPF) modules such as a first UPF 116-1 in a first country and a second UPF 116-2 in a second country.

Referring to FIG. 1, the user terminals in the cell 102 may communicate with the ground network through the satellite network 104. At any given instant of time, the user terminals may communicate on a Ku user link of a satellite and the ground network/node may communicate on Ka/V/Q feeder link of a satellite in the satellite network 104.

As depicted in FIG. 1, the satellite (for example, SAT3 104-3) with which the ground network/node communicates may be different from the satellite (for example, SAT1 104-1) with which the user terminal (controlled by that ground node) may be communicating. For example, in FIG. 1, the user terminals are communicating with the SAT1 104-1 to reach the ground node (for example, GSNB-A 106-1 or GSNB-B 106-2) that is communicating with the SAT3 104-3. Inter-satellite links (ISLs) may be used to establish connectivity between the satellites (104-1, 104-2, 104-3 . . . 104-N) in the satellite network 104. In an example, a lightweight software defined satellite networking concept may be used to find the best route between two satellites in the satellite network 104.

The GSNB-A 106-1 and the GSNB-B 106-2 may communicate with the SAT3 104-3 through active feeder links, as depicted in FIG. 1. The GSNB-A 106-1, the GSNB-B 106-2, the GNOC 108, the RDF 110, and the AxP-K 112 may communicate with each other via a suitable network such as, but not limited to, a wide area network (WAN) 118. The GNOC 108 may operate for multiple networks across various geographies from one central location.

A person of ordinary skill in the art will understand that there may be any number of user terminals, satellites, or other components in the network architecture 100.

The user terminal may refer to a wireless device and/or a user equipment (UE). It may be understood that the terms "computing device," "wireless device," "user device," and "user equipment (UE)" may be used interchangeably throughout the disclosure.

A user device or the UE may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, etc. In an example, the user devices may communicate with the satellite network 104 and/or the ground network and/or the core network via a set of executable instructions residing on any operating system. In an example, the user devices may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the user device may include one or more in-built or externally coupled accessories including, but not limited to, a visual aid device such as camera, audio aid, a microphone, a keyboard, input devices for receiving input from a user such as touch pad, touch enabled screen, electronic pen, etc.

A person of ordinary skill in the art will appreciate that the user devices may not be restricted to the mentioned devices and various other devices may be used.

Referring to FIG. 1, the satellite network 104 may be communicatively coupled to the user devices in the cell 102 via a network. The satellite network 104 may communicate with the user devices in a secure manner via the network. The network may include, by way of example, but not limited to, at least a portion of one or more networks having one or more nodes that transmit, receive, forward, generate, buffer, store, route, switch, process, or a combination thereof, etc. one or more messages, packets, signals, some combination thereof, or so forth. The network may also include, by way of example, but not limited to, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fibre optic network, or some combination thereof. In particular, the network may be any network over which the user devices communicates with the satellite network 104.

Although FIG. 1 shows exemplary components of the network architecture 100, in other examples, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
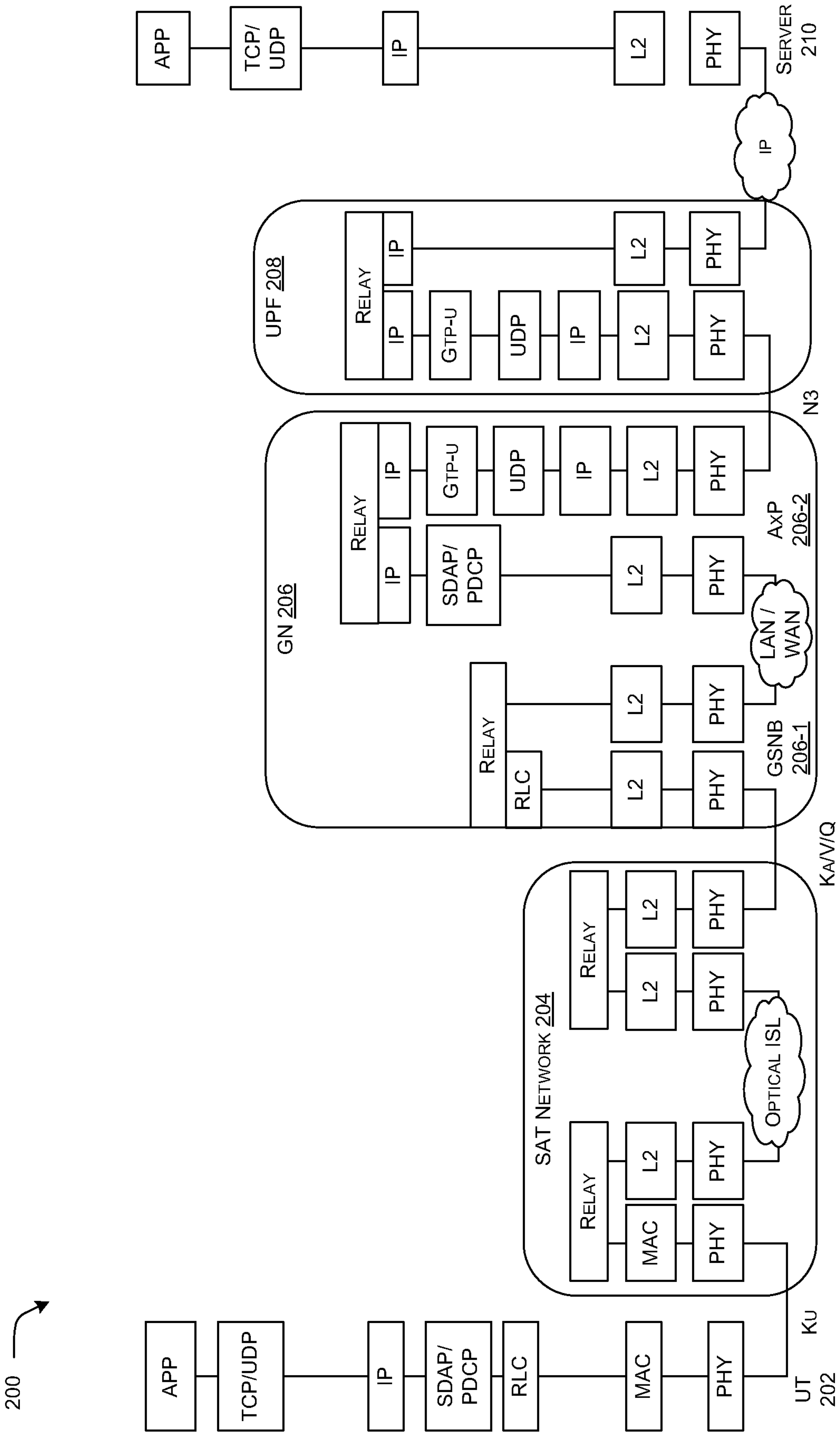
FIG. 2 illustrates an example representation of an end-to-end protocol stack for user plane for the proposed system.

FIG. 2 illustrates an example representation of an end-to-end protocol stack for user plane 200 for the proposed system. It may be appreciated that the components depicted in FIG. 2 may be similar to the components of FIG. 1 in their functionality.

The end-to-end protocol stack for user plane 200 may be based on the Third Generation Partnership Project (3GPP) 5G new radio (NR) protocol stack with satellite-specific enhancements to access stratum. Referring to FIG. 2, physical (PHY) and medium access control (MAC) layers of air interface may be implemented in user-satellite link between a user terminal 202 and a satellite in a satellite network 204. It may be appreciated that the satellite network 204 may be similar to the satellite network 104 of FIG. 1, and may include a plurality of satellites. The PHY and MAC layers may be implemented in the user-satellite link between the user terminal 202 and the SAT1 104-1. In an example, the user-satellite link may be implemented via a Ku interface.

Referring to FIG. 2, a radio link control (RLC) layer and associated automatic repeat request (ARQ) protocols may be implemented between the user terminal 202 and a ground node 206. The RLC layer may be implemented in a satellite network protocol 206-1 of the ground node 206 in order to minimize the Round-Trip Time (RTT) associated with retransmission protocol. It may be appreciated that the GSNB 206-1 may be similar to the GSNB-A 106-1 or the GSNB-B 106-2 of FIG. 1. Further, packet data convergence protocol (PDCP) layer and service data adaptation protocol (SDAP) layer of the end-to-end protocol stack user plane 200 may be implemented between the user terminal 202 and the ground node 206. The PDCP layer and the SDAP layer may be implemented between the user terminal 202 and anchor processor (AxP) 206-2 of the ground node 206. The PDCP layer may implement access stratum encryption, integrity protection, and header compression. Both internet protocol (IP) header compression as well as Layer-2 (L2) header compression may be supported by the AxP 206-2. It may be appreciated that the AxP 206-2 may be similar to the AxP-K 112 of FIG. 1. The GSNB 206-1 and the AxP 296-2 may connected via a network such as, but not limited to, WAN when they are remotely located or local area network (LAN). The link between the GSNB 206-1 and the AxP 206-2 may support guaranteed delivery. The link between the GSNB 206-1 and the AxP 206-2 may also support flow control. The satellite network 204 may be communicatively connected to the ground node 206 via a KaN/Q interface. Further, the interface from the ground node 206 to 5G core network or 5GC elements may be a standard N3 interface.

Referring to FIG. 2, the AxP 206-2 may be connected to multiple UPFs, for example, the UPF 208, in different countries to permit user terminal position-based legal interception. The AxP 206-2 may route sessions belonging to the user terminal 202 to appropriate UPF such as the UPF 208 based on a location of the user terminal 202. Further, the UPF 208 may be connected to a server 210 to provide appropriate services to the user terminal 202.

In an example, protocol for management plane between the user terminal 202 and the device management server 210 may use the end-to-end protocol stack for user plane 200. This may be carried over a separate Data Network Name (DNN) between the user terminal 202 and the device management server 210. Air interface protocols may permit the user terminal(s) 202 to establish IP connections to multiple DNNs, and one of these DNNs may be for the management plane.

Figure 3:
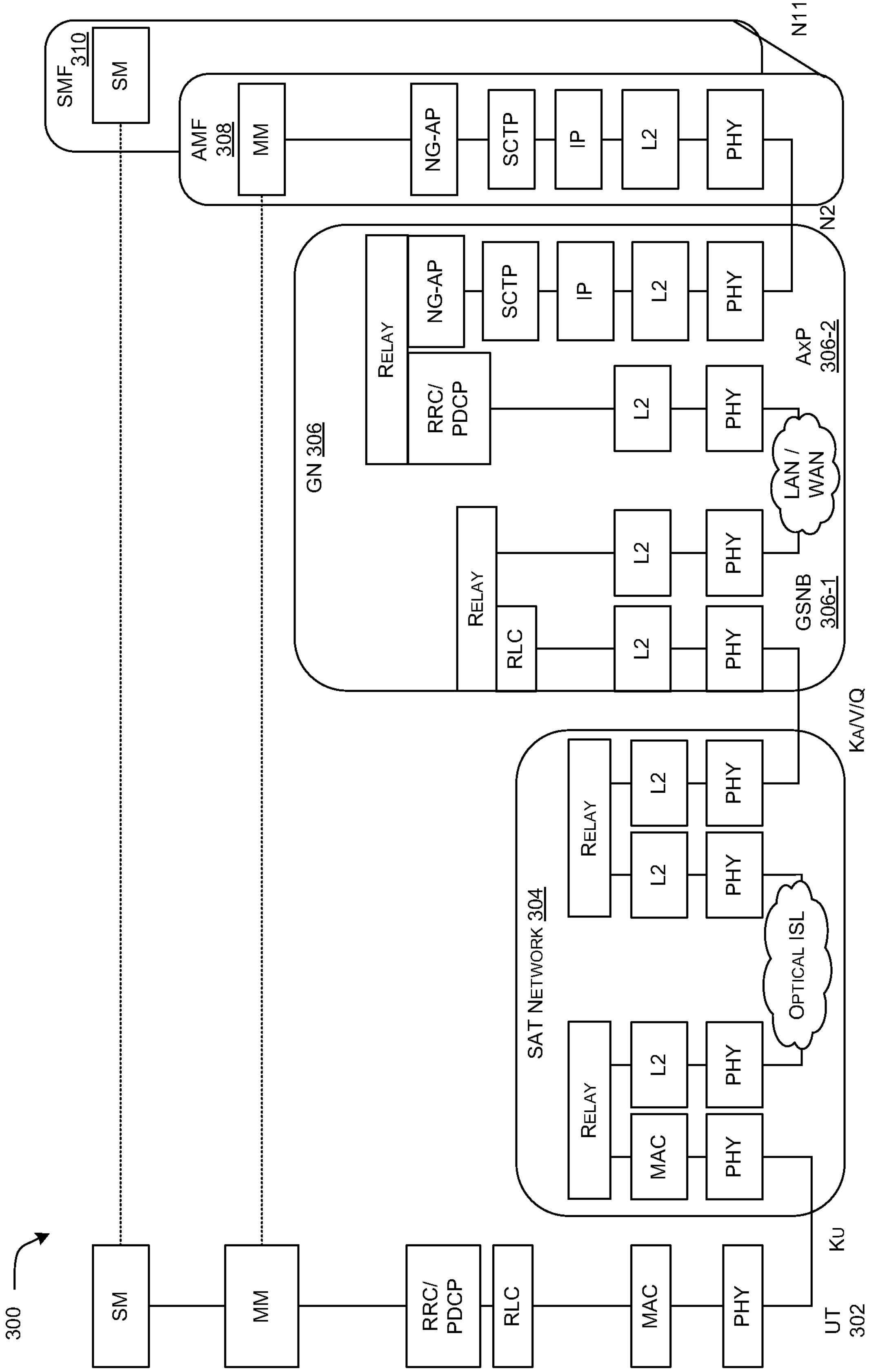
FIG. 3 illustrates an example representation of an end-to-end protocol stack for control plane for the proposed system.

FIG. 3 illustrates an example representation of an end-to-end protocol stack for control plane 300 for the proposed system. It may be appreciated that the components depicted in FIG. 3 may be similar to the components of FIGS. 1 and 2 in their functionality.

Referring to FIG. 3, the Non-Access Stratum (NAS) protocols between a user terminal 302 and an AMF 308 (in 5G core network) may be based on terrestrial standards. Access stratum protocols may be optimized for satellite environment. An RLC layer may be implemented between the user terminal 302 and a ground node 306. The RLC layer may be implemented between the user terminal 302 and an GSNB 306-1 in the ground node 306. Further, a radio resource control (RRC) layer and a PDCP layer may be implemented between the user terminal 302 and the ground node 306. The RRC layer and the PDCP layer may be implemented between the user terminal 302 and an AxP 306-2 in the ground node 306.

Referring to FIG. 3, the PHY and MAC layers may be implemented between the user terminal 302 and a satellite network 304. The PHY and MAC layers may be implemented between the user terminal 302 and a user-link satellite in the satellite network 304.

Further, the interface between the ground node 306 and 5G core network such as the AMF 308 may be based on standard terrestrial NG-AP protocols (N2 interface) defined in 3GPP technical specification (TS) 38.413 standards. The interface between the AMF 308 and a session management function 310 in the 5G core network may be an N11 interface.

Figure 4:
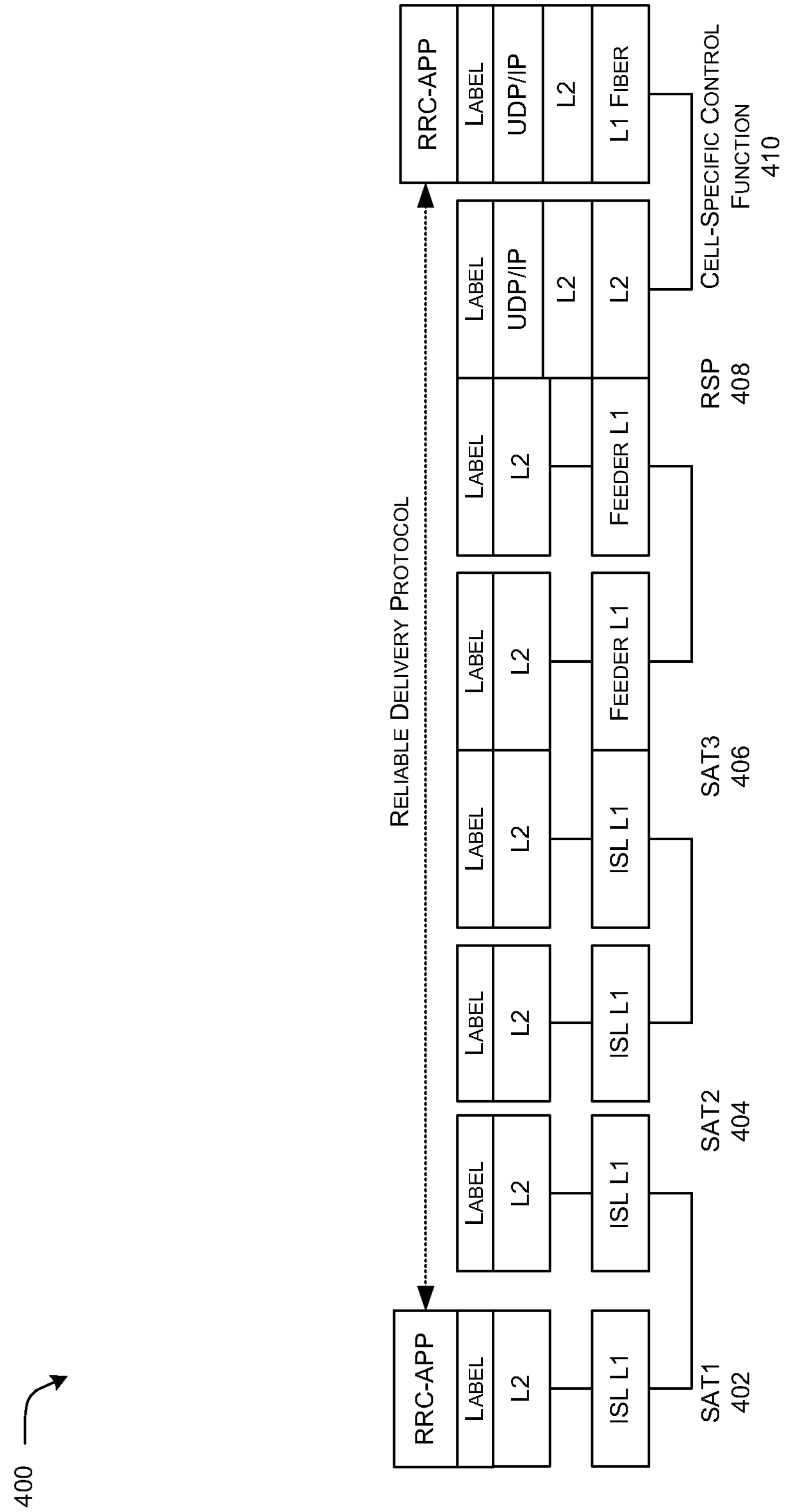
FIG. 4 illustrates an example representation of a control plane protocol stack between a satellite and a ground node.

FIG. 4 illustrates an example representation of a control plane protocol stack 400 between a satellite and a ground node.

For the proposed system, another control plane protocol stack such as 400 may be implemented between a satellite in a satellite network and a ground network/node. This control plan protocol stack 400 may facilitate transfer of information from the ground node to the satellite such as, but not limited to, system information elements that need to be broadcast in user downlink.

Referring to FIG. 4, the control plane protocol stack 400 may facilitate reliable delivery of information from a satellite such as SAT1 402 to an RSP 408 and a cell-specific control function 410 in the ground node through one or more satellites such as SAT2 404 and SAT3 406. It may be appreciated that any number of satellites may be present in the satellite network. In an example, a label may be appended to a data packet to be transferred from the SAT1 402 to the cell-specific control function 410. In such an example, the label may include, but not be limited to, an egress satellite identifier (ID) (for example, SAT3 406), a feeder link ID, a service access point ID indicating the cell-specific control function 410. In an example, the label may also include a cell ID to reach a specific instance in the GSNB in satellite to ground node direction.

Figure 5:
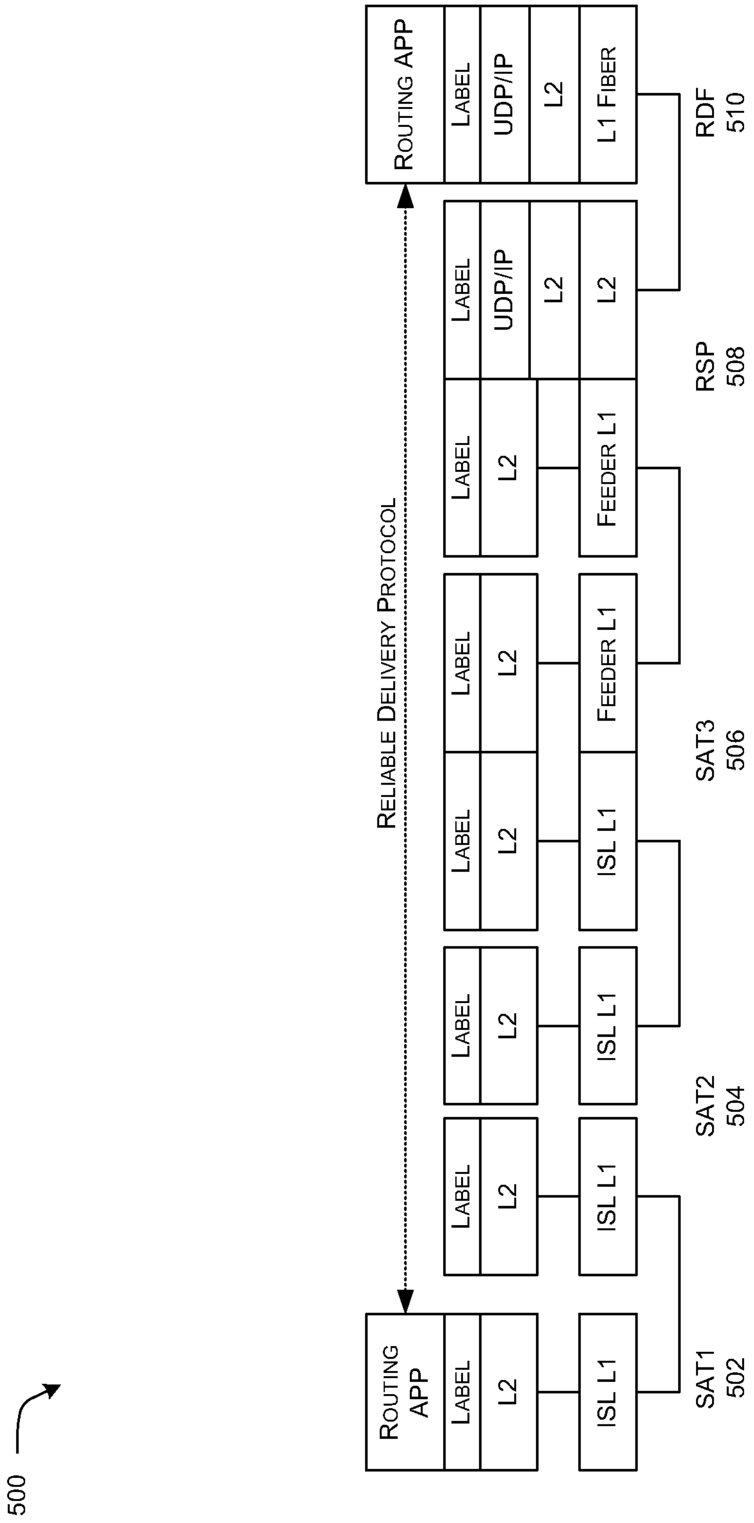
FIG. 5 illustrates an example representation of a route management protocol stack implemented between a satellite and a route determination function (RDF) module.

FIG. 5 illustrates an example representation of a route management protocol stack 500 implemented between a satellite and an RDF.

The RDF 510 may be part of a software defined satellite networking orchestration framework that resides in a ground node. It may be appreciated that the RDF 510 may be similar to the RDF 108 of FIG. 1. The RDF 510 may receive the state of various links in s satellite network from satellites. The RDF 510 may compute label routing tables for each satellite in the satellite network and upload to the satellites as necessary. This removes the burden on the satellites to construct and update the label routing tables. This exchange of link status and label routing tables may be based on the route management plane transfer between the satellites and the RDF 510. For example, referring to FIG. 5, the satellite network may include SAT1 502, SAT2 504, and SAT3 506. A label from the SAT1 502 may include, but not be limited to, an egress satellite ID (for example, the SAT3 506), a feeder link ID, and an SAPI. The satellites SAT1 502, SAT2 504, and SAT3 506 may send the status of inter-satellite links to the RDF 510 via the route management protocol stack 500. Further, the RDF 510, based on the received status of the inter-satellite links, may generate label routing labels for each of the satellites SAT1 502, SAT2 504, and SAT3 506. The RDF 510 may then send the respective label routing labels to each of the satellites SAT1 502, SAT2 504, and SAT3 506 via the route management plane protocol stack 500.

The ground node may transmit system information block (SIB) of all cells covered by SAT1 (for example, SAT1 104-1) to the SAT1 104-1 with a schedule via the control plane stack 400 of FIG. 4 between the ground network and the satellite network. The SAT1 104-1 may transmit the SIB on downlink of individual cells such as 102 based on the schedule defined in the SIB. The SIB may include, but not be limited to, a gateway ID, a feeder link ID, and a satellite ID with respect to each satellite in the satellite network. A user terminal in coverage area of the SAT1 104-1 may camp on the SAT1 104-1.

The user terminal may send an RRC message on a random access channel (RACH) from a specific cell to the SAT1 104-1 via the end-to-end protocol stack of control plane 300 of FIG. 3. The user terminal may send the RRC message according to a beam-hopping schedule determined by a scheduler. The user terminal may include a label that points to the destination gateway. The label may include, but not be limited to, a satellite ID and a feeder link ID of the destination satellite, for example SAT3 104-3. The label may include information related to the satellite (for example, SAT1 104-1) and cell from which the user terminal sent the RRC message. This may reduce the burden on satellite payload. Alternatively, the satellite SAT1 104-1 may append this information when it sends the RRC message to the gateway. The label including the information related to the source satellite and cell may allow an AxP such as the AxP-K 112 to send a response to the user terminal, for example, the AxP 112 may populate L2 header with information received in the label. In such a case, the ground node may reach the user terminal and instruct the user terminal about satellite hand-off based on a location of the user terminal. Air interface may allow the user terminal to indicate its unique identifier within the cell such as Cell Radio Network Temporary ID (CRNTI) in a user connected mode. This may reduce the burden on the satellite SAT1 104-1 to continuously maintain association between return link allocations and CRNTI of the user terminal. Alternatively, the satellite SAT1 104-1 may maintain the CRNTI and append this information to L2 frames that are transmitted towards the ground node from the satellite SAT1 104-1.

Further, the SAT1 104-1 may determine next hop for the destination satellite ID such as the SAT3 104-3, and forwards the RRC message via the satellite network. Each satellite may maintain a routing table uploaded by the satellite periodically as to the next-hop to reach any other satellite in the satellite network. This upload may be performed using the route management plane protocol stack 500 of FIG. 5. As discussed above with reference to FIG. 5, each satellite may report the state of its links to the RDF such as the RDF 110 or 510 via the route management plane protocol stack 500. The satellites may report the state of its links both periodically as well as when there may be a catastrophic failure.

When the user terminal goes back to an idle mode, and if paging were to be needed, then it will be based on last reported location of the user terminal. Paging dilation may be used to reach the user terminal(s) that may have potentially moved from one cell to another in the idle mode. In such a case, the ground node may successively expand the area (i.e. number of cells) surrounding the last known position of the user terminal.

Further, since user link handover may be managed by the AxP 112, the AxP 112 may be aware of the satellite (for example, the SAT1 104-1 that the user terminal may be communicating with. Therefore, frames transmitted from the AxP 112 may have the necessary egress satellite ID (for example, SAT3 104-3. Therefore, uplink frames from the user terminal may contain destination label information derived from source label received in downlink from the AxP 112. The user terminal and the ground node (i.e. GSNB or AxP) may use the end-to-end protocol stack of user plane 200 of FIG. 2 for user data transfer.

In an example, whenever there may be a feeder link handover, the AxP 112 may send a broadcast message to all user terminals using a broadcast medium access control address, which may be applicable for all cells such as 102 in the satellite coverage area. The SIB from the ground node may now indicate new satellite ID and/or feeder link ID.

Figure 6:
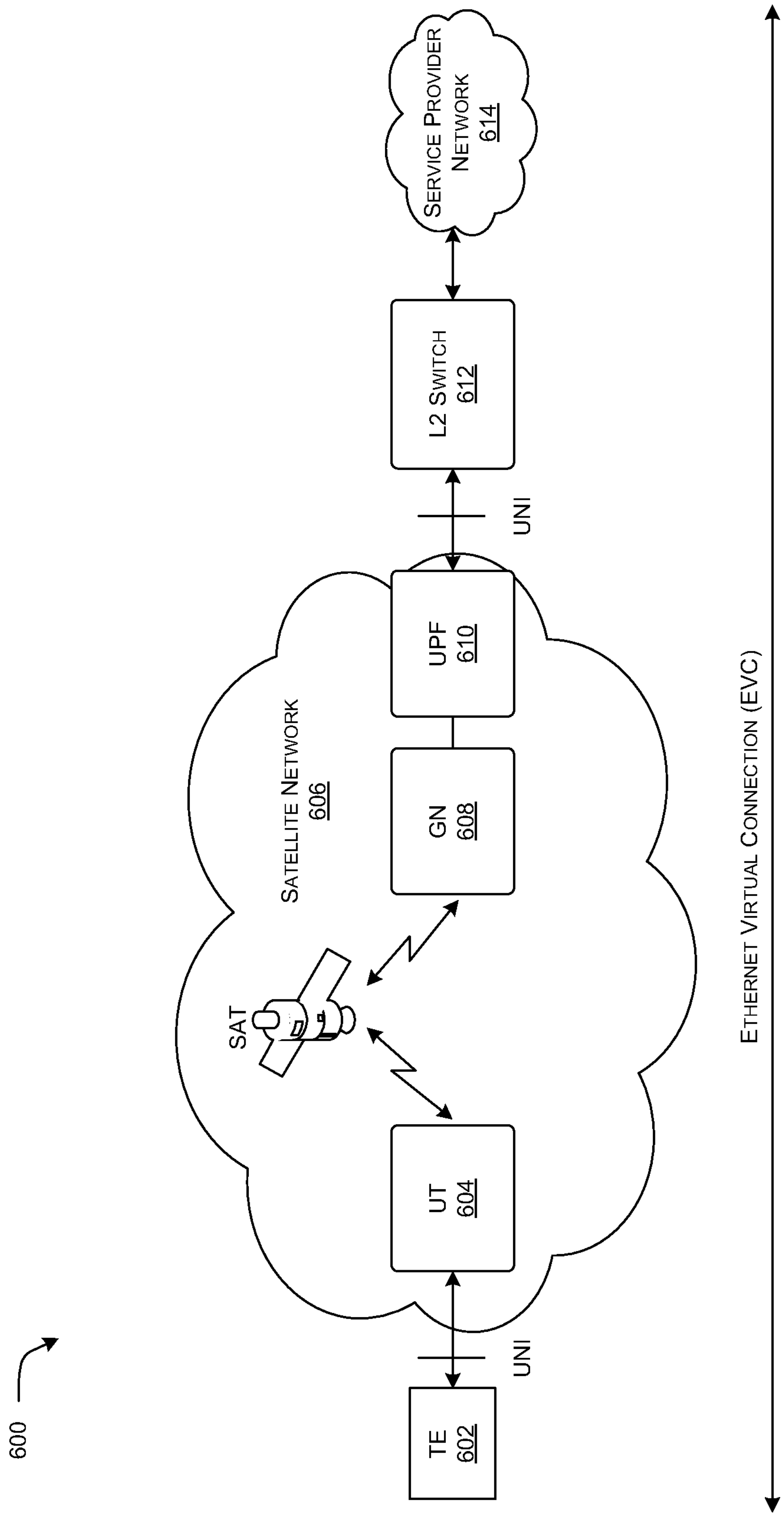
FIG. 6 illustrates an example representation of a layer 2 transport layer over the proposed system.

FIG. 6 illustrates an example representation of a layer 2 transport layer 600 over the proposed system.

An Ethernet frame generated by a Terminal Equipment (TE) 602 attached to a user terminal 604 may be tunneled through a satellite network 606 such that core network (i.e. UPF 610) output may be identical to the Ethernet frame generated at the source. The Ethernet frame may be sent through the ground node 608 to the UPF 610. Further, through a layer 2 switch 612, the Ethernet frame may be sent from the TE 602 to a service provider network 614.

Ethernet preamble and start of frame delimiter may not be transmitted over the satellite network 606. For uplink traffic, the user terminal 604 may strip the preamble, start of frame delimiter, and frame check sequence (FCS) from the Ethernet frame. For downlink traffic, the UPF 610 acting as a packet data unit (PDU) session anchor may strip the preamble, start of frame delimiter, and FCS from the Ethernet frame. Referring to FIG. 6, a customer service connection may be made at a User-Network Interface (UNI). The satellite network 606 between UNIs may be made through an Ethernet Virtual Connection (EVC). The EVC may maintain an Ethernet MAC address and frame contents unaltered, so it may be possible to establish layer 2 connectivity between locations.

Figure 7:
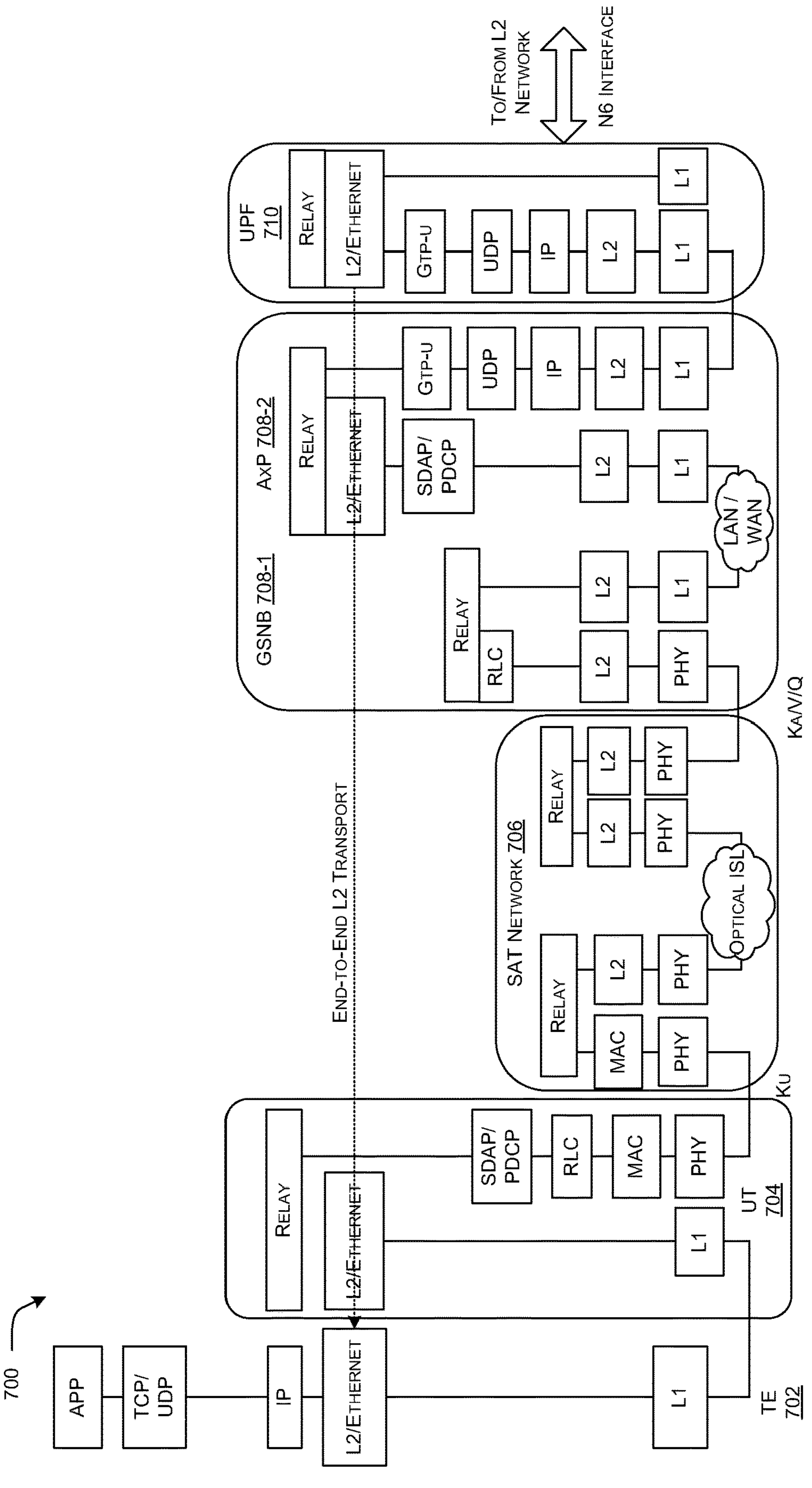
FIG. 7 illustrates an example representation of an end-to-end protocol stack for layer 2 transport over the proposed system.

FIG. 7 illustrates an example representation of an end-to-end protocol stack for layer 2 transport 700 over the proposed system.

As depicted in FIG. 7, an Ethernet frame may be generated at a terminal equipment 702 attached to a user terminal 704. The Ethernet frame may be tunneled through a satellite network 706 and a ground network including an GSNB 708-1 and AxP 708-2 to a core network including a UPF 710. Ethernet header compression (EHC) defined in the 3GPP TS 38.323, version g.6.0 may be implemented in PDCP layer at AxP 708-2 in the ground network and the user terminal 704 in order to be efficient over the air and minimize overheads.

Figure 8:
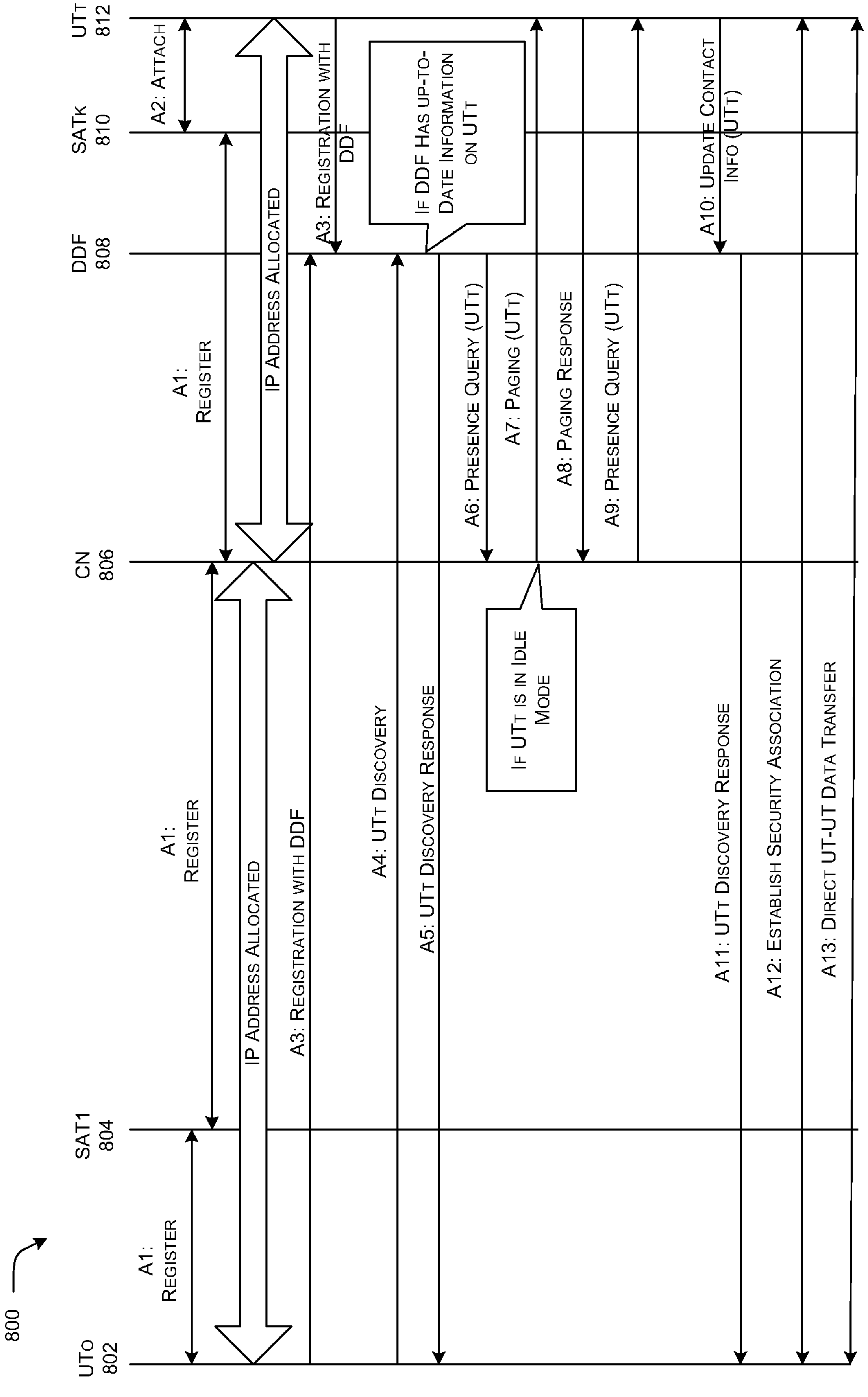
FIG. 8 illustrates an example signal flow for implementing direct user terminal to user terminal connectivity.

FIG. 8 illustrates an example signal flow 800 for implementing direct user terminal to user terminal connectivity.

Direct user-terminal to user terminal connectivity may be achieved based on the proposed label switched routing framework. Here, direct user terminal to user terminal connectivity may be achieved by providing each user terminal with a label that points to a satellite and cell that the other user terminal may be currently communicating with. In an example, packets belonging to a given destination user terminal may be directed to a queue pertinent to the cell with which the destination user terminal may be associated with. In an example, when the destination user terminal may be in idle mode, the core network may page the user terminal and then the direct user terminal to user terminal session may be established. For additional protection, the two user terminals may establish security association between themselves using security keys, as depicted in FIG. 8. The direct discovery function (DDF) module 808 may be the 5G Direct Discovery Name Management Function (DDNMF) if the 5G core network supports it. The control plane traffic for direct user terminal to user terminal session may be through the end-to-end protocol stack for control plane 300 of FIG. 3.

Referring to FIG. 8, at step A1, a source user terminal (UTo) 802 may register with a source satellite SAT1 804 and a core network 806. Similarly, a destination satellite SATk 810 may register with the core network 806. At step A2, a destination user terminal (UTt) 812 may attach or connect with the SATk 810. Based on the registration and attachment in steps A1 and A2, the core network 806 may allocate IP address to both the user terminals UTo 802 and UTt 812.

Further, at step A3, the UTo 802 and the UTt 812 may perform registration with the DDF 808. At step A4, the UTo 802 may perform UTt discovery via the DDF 808. The DDF 808 may send an UTt discovery response at step A5 if the DDF 808 may have up-to-date information on the UTt 812. Further, at step A6, the DDF 808 may send a presence query for the UTt 812 to the core network 806. In an example, if the UTt 812 is in an idle mode, the core network 806 may page the UTt 812 at step A7. At step A8, the UTt 812 may send a paging response to the core network 806. Based on the paging response, at step A9, the core network 806 may send a presence query to the UTt 812.

Further, in response to the presence query, at step A10, the UTt 812 may update its contact information at the DDF 808. Based on the updated contact information of the UTt 812, the DDF 808 may send an UTt discovery response to the UTo 802 at step A11.

Furthermore, at step A12, the UTo 802 may establish a security association with the UTt 812 by sharing security keys. At step A13, direct user terminal to user terminal may be established, and the UTo 802 and the UTt 812 may perform data transfer.

Figure 9:
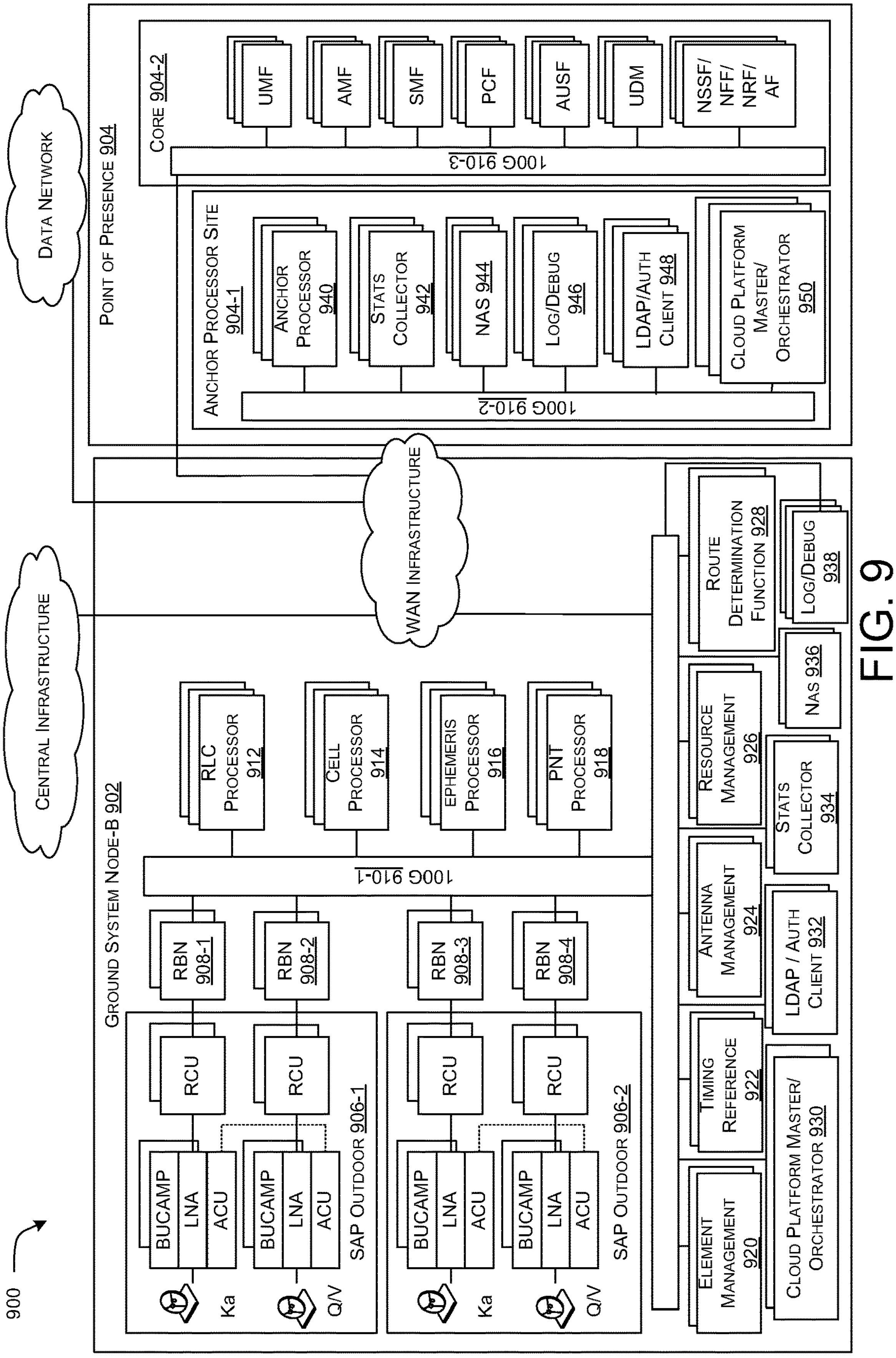
FIG. 9 illustrates an example representation of a ground node architecture.

FIG. 9 illustrates an example representation of a ground node architecture 900.

Each ground node may be composed of one GSNB site 902 and zero or more Point of Presence sites 904. The GSNB site 902 may provide connectivity to satellites from the ground network over feeder links. The POP site(s) 904 may provide connectivity to terrestrial data network. Each GSNB 902 may consist of several satellite access points (SAPs) (906-1, 906-2). The SAP (906-1, 906-2) may contain an equipment required to track and maintain radio connection with the satellites. The SAP (906-1, 906-2) may include tracking antennas, antenna control units (ACUs), frequency up converters/amplifiers, intermediate frequency (IF) to digital converters, and feeder link modems. The SAP (906-1, 906-2) may contain two independent blocks, one for carrying Ka-band channels and another for carrying Q/V-band channels (V-band in the forward, Q-band in the return). Each block may have corresponding Ka-band or V/Q band antennas, corresponding ACUs, two sets of radio frequency (RF)/modem chains, one per polarization. Each RF/modem chain may consist of a High-Power Amplifier and Block Up converter (BUCAMP), Low Noise Amplifier (LNA), RF Conversion unit (RCU), and Radio Baseband Nodes (RBNs), processing all the channels under that polarization. For example, Ka-band polarization block carries 8 channels of 250 MHz, and Q/V-band polarization block carries 16 channels of 250 MHz. The RF chain may be split into outdoor and indoor equipment, connected by one or more dedicated, point-point fiber links up to 2 km in length that are capable of carrying the digital samples of all the channels on that polarization. The outdoor RF equipment may consist of BUCAMP, RCU, and LNA mounted on the antenna. The indoor equipment may consist of RBNs (908-1, 908-2, 908-3, 908-4) that implement modem processing and payload control channel functions. It may be appreciated that the RBNs may be collectively referred as the RBNs 908 and individually referred as the RBN 908. The RBNs 908 may also implement layer 2 protocol functions for the feeder link channel between the GSNB 902 and the satellite with which it may have the contact. Remaining components of the GSNB 902 may be housed indoor in rack containers. This may include the 100G switching infrastructure 910-1, a pool of RLC processors (LXPs) 912, a pool of cell scheduler processors 914, a pool of ephemeris processors 916, a pool of position, navigation, and timing (PNT) processors 918, management entities such as an element management subsystem 920, a pair of timing reference units 922, an antenna management subsystem 924, a resource management subsystem 926, an RDF 928, platform functional entities such as cloud platform orchestrators 930, lightweight directory access protocol (LDAP) authentication clients 932, Stats collectors 934, NAS 936, and log/debug processors 938.

The RBNs 908 may be connected to the GSNB switching infrastructure (central infrastructure) by the fiber links. The GSNB switching infrastructure may connect to the WAN infrastructure to communicate with the rest of the terrestrial infrastructure including POP sites 904.

In SAP (906-1, 906-2), the Low Earth Orbit (LEO) tracking antenna subsystem may be configured for either Ka or V/Q band circular polarization covering complete 360° azimuth and 5-90° elevation range. The tracking antenna tracks the satellite per programmed ephemeris with the support for automatic tracking with the help of embedded beacon tracking RCU and ACU. The ACUs interface with the antenna management subsystem 924 to receive commands for acquiring satellite contact along with the associated timestamped ephemeris for the contact duration. The ACU synchronizes its timing with the GSNB NTP server so that it may apply the ephemeris precisely. The BUCAMP may provide the functions including, but not limited to, receiving IF signals and up converting them to the configured Ka-band or V-band, amplifying the combined up converted signals to the desired transmit power and feeding to the waveguide flange, and providing power detector for composite uplink power measurements and adjusting transmit gain upon RCU commands according to closed loop uplink power control.

Further, the LNA may receive the RF signals from the satellite and provides low noise amplification and feeds it to the associated RCU. The RCU performs the functions including, but not limited to, block down conversion from Ka/Q band to IF band, digital to analog (forward) and analog to digital (return) conversion for individual channels (250 MHz/125 MHz) as well as PCC between IF signals and baseband digital samples, feeder link delay/Doppler compensation using satellite ephemeris, feeder link uplink power control, and receive satellite contact allocation to enable/disable (mute) transmission/reception.

The RBN 908 may perform the functions for each of the feeder link channels including, but not limited to, implement feeder link air interface physical layer including forward error correction (FEC) encoding/decoding, rate matching, interleaving/scrambling functions, π/2-BPSK, QPSK, 8PSK, 16APSK, 32APSK and 64APSK modulation/demodulations, signal to noise ratio (SNR) frequency/timing estimation; implement feeder link layer 2 functions including establish/maintain the link with the satellite with the TX/RX frame timing, multiplex the received data from upper layer sources (i.e., cell scheduler processor 914, RLC processor 912, RDF 928, etc.) and construct transmission frames along with headers with the desired routing labels, demultiplex the frames and propagate the payload to the appropriate upper layer entities based in the routing labels in the packet headers, perform adaptive coding modulation for the feeder link channels based on the link status notification from the satellite for the forward direction and the received signal SNR for the return direction, receive satellite ephemeris from the ephemeris processor 916 and coordinate with RCU to apply delay/Doppler compensation, receive satellite contact allocation and configure the feeder link channels, and PCC CMD/TLM channel physical layer functions including channelization, modulation/demodulation, FEC coding/decoding and liaison with SOC upper layer PCC entities.

The GSNB 902 may have a pool of cell schedule process instances spread across a pool of cell scheduler processors 914. Whenever a satellite is assigned with a cell-slot, if that satellite may have a feeder link contact with one or more GSNBs 902, one of those GSNBs 902 may be designated for providing system information as well as cell schedule information to the satellite for that cell. If that satellite does not have any feeder link contacts with any GSNB 902, then one of the GSNBs 902 closest to the ARs to which the cell belongs to may be designated for providing the system information for that cell. These designations may be dynamically reconfigured by GNOC such as the GNOC 108 of FIG. 1 as needed and communicated to the GSNBs 902 and the satellites. The satellite may reach the GSNB 902 by relaying the packets via ISL with another satellite that may have feeder link contact with the GSNB 902.

Based on this GNOC configuration, whenever a cell-slot is associated with the ground network 900, one of the cell schedule process instances may be allocated to perform the scheduling functions. In an example, the cell schedule process performs the functions including, but not limited to, coordinate with the ephemeris processor 916 to generate the system information specific to the cell/satellite (i.e., cell system information, neighbor satellite information, etc.), setup a thin layer 3 link with the destination cell-slot satellite via the SAP (906-1, 906-2) that may be associated with the routing label determined by a routing agent, periodically send the system information broadcast schedule as well as the system information contents to the destination cell-slot satellite, receive user connection requests from the user terminal via satellite/SAPs (906-1, 906-2), setup MAC session, and route the requests to the POP AxP 904-1 instance that may be handling the AR/TAC for the user's cell, for each of the user MAC session on the satellite, obtain notifications of forward user link condition and return backlogs from the users, return user link SNR measurements from satellite and forward backlog from the RLC processors 912 continuously at regular intervals, perform the differentiated quality of service (QOS) MAC scheduling for user sessions and command the RLC processors 912 and satellites with the schedule sequence, transport block sizes, uplink grants, and the MCS recommendation, perform the desired power control in the return link along based on return user link SNR measurements, receive the flow control/queue backlog indications from the satellite and accordingly incorporate that in its scheduler, receive paging requests from the anchor processor 940, determine destination satellite routing labels, and forward to the SAPs (906-1, 906-2) for transmission.

The GSNB 902 may have a pool of ephemeris processors 916. The ephemeris processor 916 may compute the neighbor satellites for a given cell periodically. The ephemeris processor 916 may perform the functions including, but not limited to, compute the feeder link delay/Doppler compensation for the active satellite contacts and provide to the SAPs (906-1, 906-2), and for the cells for which the ground network 900 generates the cell schedule information, compute the neighbor satellite geometry based on the satellite ephemeris and feed to the cell scheduler processors 914 periodically.

The GSNB 902 may have a pool of RLC processors 912, amongst which user sessions are load balanced. The RLC processor 912 may implement the RLC functions of the air interface protocol. The allocation of a user session to an RLC process instance may be done by the anchor processor 940 during session setup and GSNB/connection handovers. The RLC processor 912 may perform the functions including, but not limited to, establish/maintain link with PDCP layer at the anchor processor 940 for each of the user sessions and transport (TX/RX) the PDCP PDUs, implement flow control mechanism with the anchor processor 940 to smooth the traffic flow as well as retransmissions, coordinate with appropriate cell scheduler processors 914 of the user sessions, providing backlog information and obtaining transmission opportunities with the transmission size, setup a thin layer 3 link with the destination cell-slot satellite via the SAP (906-1, 906-2) that may be associated with the routing label determined by the routing agent, RLC segmentation of PDCP payload according to the granted transmission sizes, format the transmission packets with the headers for sequence numbering, desired routing labels towards the destination satellite and send them to the SAP (906-1, 906-2) for transmission, receive RLC packets from user terminal/satellite via the SAP (906-1, 906-2) and perform desired reassembly as required, loss detection and retransmission in the RLC acknowledgement mode (AM) for the forward direction based on received RLC status from the user terminal and positively/negatively acknowledge the received return traffic by transmitting RLC status to the user terminal.

The GSNB 902 may include the PNT processors 918. The PNT processor 918 may provide supporting functions for the overall PNT operation including, but not limited to, coordinate with the SOC/GNOC to receive the ephemeris correction constructed by the PNT calibration station measurements for each of the satellites that may have cell schedulers, and feed the correction information to the appropriate cell schedulers 914 for transmission in the corresponding cell system information.

The RDF 928 may determine an optimal route from the ground network 900 to each of the satellites through which the ground network 900 may have user sessions. The RDF 928 may perform functions including, but not limited to, obtain feeder link contact schedules of the ground network 900 as well as the ISL contact schedules from the GNOC contact schedule, setup a thin layer 3 link with the satellites via the SAPs (906-1, 906-2) that are associated with the routing label determined by the routing agent, based on the GSNB's feeder link contact link status and the ISL link status obtained from the satellites along with the GNOC contact schedule, dynamically generate/update the routing table of labels for each ground network endpoint and the destination satellite endpoints, distribute the routing tables to all the routing agents in the relevant GSNB components as well as to the satellites with which it communicates (i.e., immediate satellites, intermediate satellites through which it reaches the destination satellites, destination satellites). The routing may have support for additional identifiers in the routing labels to develop load balancing mechanism of the traffic with multiple/parallel channels/flows in the paths.

Referring to FIG. 9, the POP site 904 may contain an anchor processor site 904-1 and 5G core equipment 904-2. The anchor processor site 904-1 may perform upper layer protocols of the 5G g Node B (gNB) functions for a set of administrative regions (ARs) in coordination with the GSNB sites 902 that it communicates with. The 5G core equipment 904-2 may provide connection to the external IP networks such as Internet and other private networks. Like the GSNB site 902, the anchor processor site 904-1 components may be housed in rack containers. This includes the 100G switching infrastructure 910-2, a pool of anchor processors 940 (implementing PDCP, SDAP, RRC, NGAP, GTP protocol layers), platform functional entities such as Stats collectors 942, NAS 944, log/debug processors 946, LDAP authentication clients 948, and cloud platform orchestrators 950. The data processing functions in the ground network 900 may be implemented using load distributed architecture with a pool of traffic carrying processor instances (i.e., RLC processors 912, cell scheduler processors 914, anchor processors 940, etc.). The need for serving additional capacity may be met by adding additional processor instances as the need arises. The on-premises cloud architecture may be employed that allows the system to dynamically instantiate and configure the system functions as the need arises, without requiring hardcoded installs, thereby reducing the inefficiency of hardware resource usage.

The anchor processor 940 may act as a liaison between the air interface and the 5G core network 904-2. An anchor process instance may be responsible for handling the sessions of a TAC. The assignment of a TAC to the anchor processor 940 may be done dynamically by the RMS. The anchor processor 940 may perform the RRC, PDCP, and SDAP functions towards the air interface while handling the NGAP and GTP functions towards the 5G core 904-2. The anchor processor 940 may perform the functions including, but not limited to, set up the N2 interface with the 5G AMFs with the assigned TAC acting as the gNB, assignment of RLC instance from the RLC processors 912 of the GSNB 902 through which the RRC connection request may be received, RRC connection establishment with user terminals from cells belonging to the TAC assigned to the anchor process instance, selection of AMF for the user session and signaling with the AMF for the user terminal context setup, coordinate between the user terminal RRC signaling and the 5G NGAP for the user registration procedure/service request procedure/traffic area update procedures, NAS/AS security mode configurations, establishment of bearers, NAS uplink/downlink information transfers, etc., establish PDU session with the assigned UPF for the user session and transport the data packets between GTP and the PDCP, mapping the QOS flow of the packets to the right dedicated radio bearer and vice versa, perform the header compression and the ciphering of the PDCP packets in the forward direction and decompression and deciphering in the reverse direction, perform sequence numbering of PDCP packets in the forward direction, reordering/duplicate detection in the return direction and the corresponding retransmissions in the forward direction, transmit PDCP PDUs to the RLC processors 912 and receive PDCP PDUs from the RLC processors 912, exercise flow control in the transfer of PDUS to the RLC to ensure that RLC buffers are not overflown, periodically and whenever cell change notification may be received for a user terminal, check the cell to satellite and user link frequency mapping for the user sessions from the GNOC contact schedules and coordinate with user terminal and GSNB 902 (i.e. RLC processor 912 and cell scheduler processor 914) for appropriate satellite handovers or frequency handover or connection handover (to an anchor processor in the same POP or an anchor processor in another POP), coordinate with the RDF 928 to obtain the satellite-RLC processor routes status for its user sessions and upon failure of routes/viable paths or availability of an alternative GSNB with optimal path, select RLC processor 912 from alternate GSNB and coordinate the handover.

The antenna management subsystem 924 in the GSNB site 902 may manage, control, and command the SAP ACUs for setting up the satellite contacts. The antenna management subsystem 924 may perform the functions including, but not limited to, set up control session with each of the ACUs in the ground network 900 and monitor their status periodically, coordinate with RMS, recommending eligible SAPs for a given satellite contact (i.e., those SAPs capable of covering the entire satellite contact), upon satellite-SAP assignment directive from RMS, fetch the GNOC provided satellite ephemeris from the element management subsystem 920 for the assigned satellite and load it to the ACU associated with the assigned SAP and command it to point, acquire, and track the satellite, and coordinate with the PCC entity in each of the SAPs to set up PCC when a satellite contact may be assigned on a SAP.

The resource management subsystem 926 may perform satellite assignment and gNB/TAC assignments functions for the ground network 900. The resource management subsystem 926 may perform the functions including, but not limited to, monitor the status of each of the ground network equipment periodically, fetch the GNOC provided ground network-satellite contact schedule from the element management subsystem 920, assign a suitable SAP for the satellite contact and command the antenna management subsystem 924 and SAP to set up the contact along with providing the cell-duty cycle information (to be used by the cell schedule processors 914), with multiple suitable satellites, prioritize the SAPs according to priority order as well as to ensure that all SAPs are regularly exercised, fetch the GNOC defined AR/TAC-POP configuration from the element management subsystem 920 and assign the TAC/gNB to the available anchor processors 940.

The element management subsystem 920 may perform the element management functions for the ground network components. The element management subsystem 920 may provide web-based local/remote graphical interface for the ground network 900 as well as ReST interface for GNOC management of the ground network. The element management subsystem 920 may perform the functions including, but not limited to, receive and store the GNOC provided various static and dynamic configuration files for the ground network 900 including the antenna definitions, neighbor POP relationships, POP-AR-TAC relationships, AR boundary definitions, satellite ephemeris/attitude, satellite contact schedules, etc., receive and display the component status, statistics and alarms, and propagate to GNOC, provide a secure web-based operator interface for configuration management, status and alarms display, and control of the components and the dashboards for the system statistics, serve the ephemeris fetch requests from the ephemeris processor 916 and antenna management subsystem 924 components at the time of contact assignments and provide the desired ephemeris from its stored ephemeris files, and coordinate with the cloud orchestrator 930 for software image repository for the components and the upgrades.

The GSNB 902 and POP 904 components may be architected as an on-premises cloud platform. To orchestrate the deployment and scheduling of physical hardware resources in the site for various application components, the cloud orchestrator (930, 950) may act as a master with a set of its constituent components, providing interface for application component instance definitions and their resource needs, scheduling, and deploying these instances on the available nodes, monitoring the health of these instantiations on the nodes, and performing the fault recovery. The cloud orchestrator (930, 950) may perform the functions including, but not limited to, auto discover of nodes and their resources and maintain centralized registry, component application profile assignments and container orchestration, image caching and deploy software and configuration on nodes/container, setup container interconnect virtual networking, routing, security, and policy enforcement, node health/status monitoring, reconfiguration including required redundancy, and maintain site install configuration.

The Stats collector (934, 942) and the NAS (936, 944) may maintain local repository of the GSNB 902 and POP 904 statistics files and propagate the central GNOC repositories in the cloud for use in the data analysis. The Stats collector (934, 942) may perform the functions including, but not limited to, site central entity for specifying site specific install configuration such as certificates, external component addresses, site dimensioning configuration, local credentials, system releases, etc., register as a storage device for components to periodically store their statistics files, act as a storage client, register with the cloud storage, and periodically push these statistics files to the cloud.

The LDAP servers (932, 948) in each GSNB 902 and POP 904 sites may provide the role of proxy for central authentication server performing the function of users and their roles authentication. The LDAP servers (932, 948) may perform the functions including, but not limited to, coordinate with central active directories to receive and synchronize operations users and their role definitions, interface with LDAP clients in each of the nodes to receive LDAP bind authentication requests and in turn employ pass-through authentication interface with the AD servers to get the user authenticated at the AD, and for successful authentications, maintain a cache of salted hashed passwords to allow for subsequent user authentication in case of temporary communication failures with AD.

Each GSNB 902 and POP 904 site may maintain a pool of support nodes for the purposes of maintaining the diagnostics logs and traces as well as providing the local user interface for component debugging. The log/debug servers (938, 946) may perform the functions including, but not limited to, receive component diagnostics logs and traces from components in different formats, convert these logs into the searchable database, and provide visualization and filtering tools to facilitate debugging.

Figure 10:
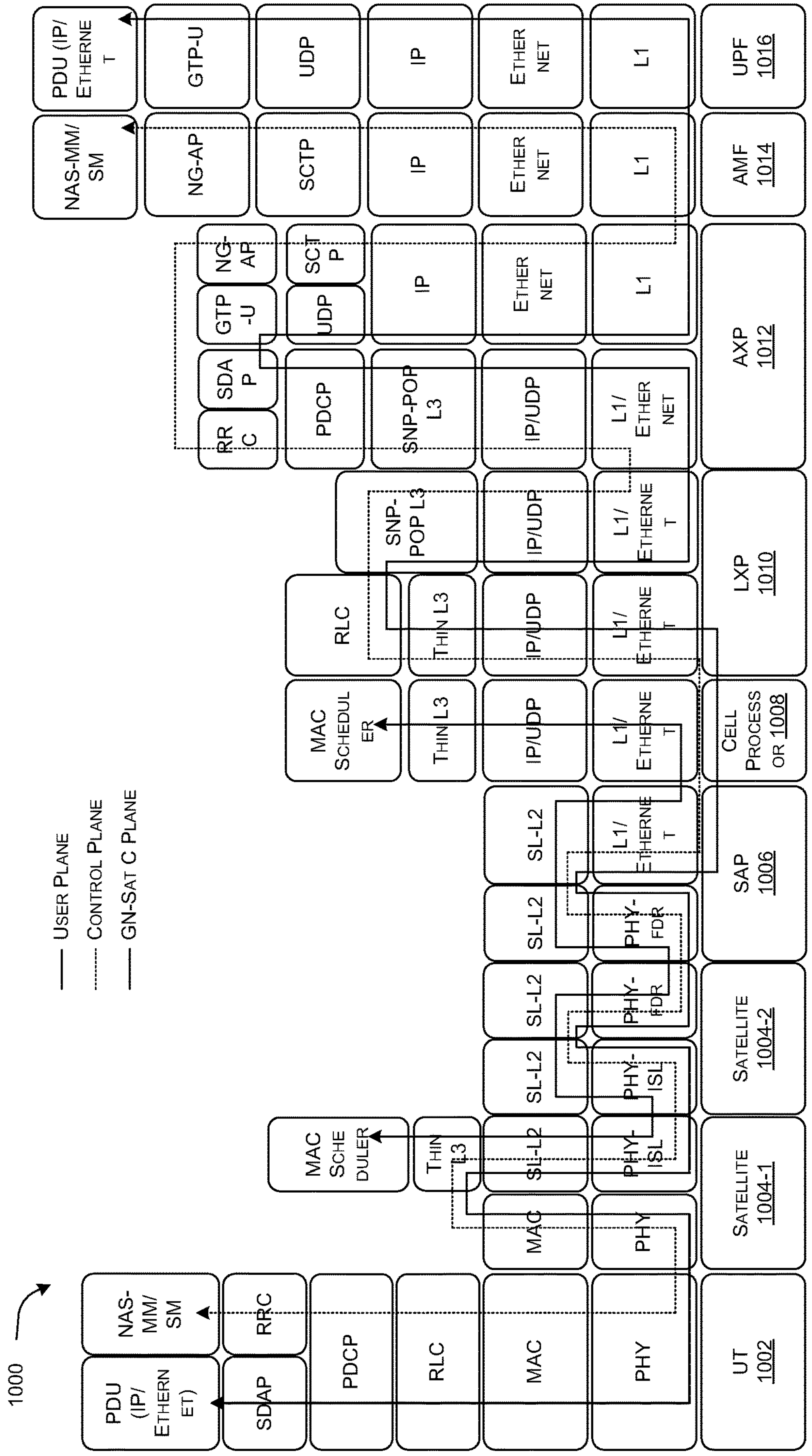
FIG. 10 illustrates an example representation of mapping of different air interface and upper layer protocol stack layers to the GSNB and POP components and their counterparts in the user terminal and satellites.

FIG. 10 illustrates an example representation 1000 of mapping of different air interface and upper layer protocol stack layers to the GSNB and POP components and their counterparts in the user terminal and satellites.

Referring to FIG. 10, the architecture depicts the various protocol stack layers implemented between the user terminal 1002, satellite network including satellites (1004-1, 1004-2), SAP 1006, cell scheduler processor 1008, RLC processor (LxP) 1010, anchor processor 1012, AMF 1014, and UPF 1016. The protocol stack layers may correspond to the representations depicted in FIGS. 2-7.

Physical Layer

Table 1 summarizes main features of feeder link physical layer. In the downlink, to help conserve satellite power, a burst mode reception maybe enabled for the receiver to support discontinuous transmission from the payload.

TABLE 1

| | Forward (Uplink) | Return (Downlink) |
|---|---|---|
| Channelization | 250 MHz | 125 MHz |
| Symbol Rate | Approx. 238 Msps | Approx. 119 Msps |
| Filter Roll-Off | Approx. 5% | Approx. 5% |
| Modulation | Up to 64 APSK | Up to 64 APSK |
| Channel Coding | LDPC | LDPC |
| Peak Spectral Efficiency per Channel | Approx. 5 bits/symbol (64 APSK, 5/6) | Approx. 5 bits/symbol (64 APSK, 5/6) |

The feeder link channelization may be based on 250 MHz (forward) and 125 MHz (return).

For forward link, nominal (Ka-band)

27.5-29.1 and 29.5-30 GHz on each polarization

Total usable bandwidth up to 2×8×¼ GHz=4 GHz.

For forward link, additional (V-band)

47.2-50.2 and 50.4-51.4 GHz on each polarization

Total usable bandwidth up to 2×(3+1) GHz=8 GHz

For return link, nominal (Ka-band)

17.8-18.6 and 18.8-19.3 GHZ, LHCP, RHCP

Total usable bandwidth up to 2×9×⅛ GHz 2.3 GHz

For return link, additional (Q-band)

37.5-42.0 GHz (either 2 GHz on a single polarization or 1 GHz on both polarization)

Total usable bandwidth up to 2 GHz

Figure 11:
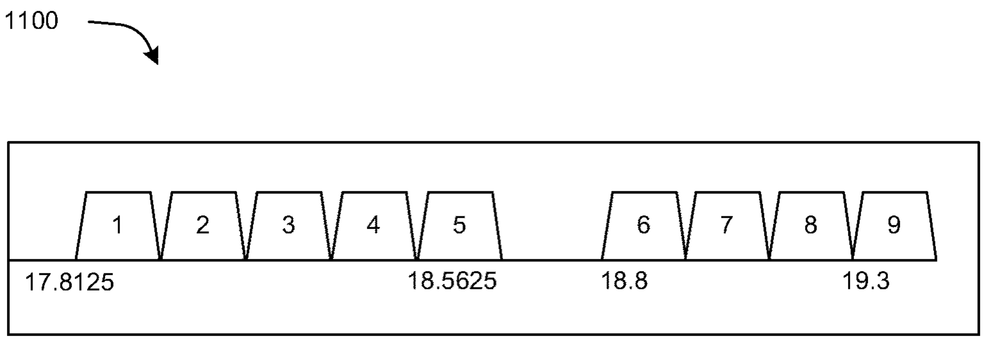
FIG. 11 illustrates an example representation for Ka-band feeder link return channelization.

FIG. 11 illustrates an example representation 1100 for Ka-band feeder link return channelization. Referring to FIG. 11, there may be an additional 125 MHz (channel 9). In an example, a wider bandwidth with a smaller number of channels may be used to minimize payload complexity if needed.

Adaptive coding and modulation (ACM) may be used with various modulation types and code rates as described in Table 2.

TABLE 2

| | Forward (Uplink) | Return (Downlink) |
|---|---|---|
| Modulation | π/2-BPSK, QPSK, 8PSK, 16 APSK, 32 APSK, 64 APSK | π/2-BPSK, QPSK, 8PSK, 16 APSK, 32 APSK, 64 APSK |
| Channel Coding | LDPC | LDPC |
| Code Rate | 1/5~9/10 | 1/5~9/10 |

The forward link may use the super frame format 0 with pilot symbols or its variant to support PNT if needed. The return link may use the super frame format 0 or its variant as well as an enhanced super frame format to support a burst mode reception if needed.

The user link physical layer may be based on the air interfaces including DVB-S2X with beam hopping for forward link, and MF-TDMA with beam hopping for return link. For the return link, the following MF-TDMA standards may be used: DVB-RCS2, IPoS, and 5G NR.

The DVB-RCS2 and IPoS physical layer may be based on conventional TDMA scheme, and 5G NR physical layer may be based on channelization efficient orthogonal frequency division multiplex (OFDM).

Table 3 summarizes main features of user link physical layer.

TABLE 3

| | Forward (Downlink) | Return (Uplink) |
|---|---|---|
| Channelization | 250 MHz | 125 MHz |
| Symbol Rate | Single carrier Approx. 238 Msps | Sub-channelized into multiple chunks: Aggregate symbol rate Approx. up to 104 Msps (DVB-RCS2) Approx. up to 118 Msps (IPoS, NR) |
| Filter Roll-Off | Approx. 5% | Approx. 20% (DVB-RCS2) Approx. 5% (IPoS, NR) |
| Traffic Channel Modulation | Up to 32 APSK or 64 APSK (TBD) | Up to 16 QAM (DVB-RCS2) Up to 64 QAM (IPoS, NR) |
| Traffic Channel FEC | LDPC | Turbo (DVB-RCS2) LDPC (IPoS, NR) |
| Modulation and coding peak Spectral Efficiency (SE) | Approx. 4 bits/symbol or higher | Approx. 3.5 bits/symbol (DVB-RCS2) |
| | | Approx. 4 bits/symbol or higher (IPoS, NR) |

Figure 12:
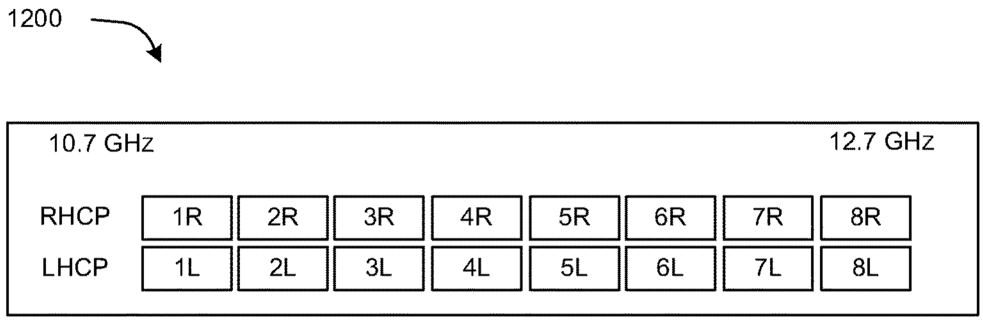
FIG. 12 illustrates an example representation for forward link channelization.

FIG. 12 illustrates an example representation 1200 for forward link channelization. Referring to FIG. 12, there may be 8×250 MHz channels on each polarization. Each 250 MHz channel may be occupied with a single wideband carrier.

Figure 13:
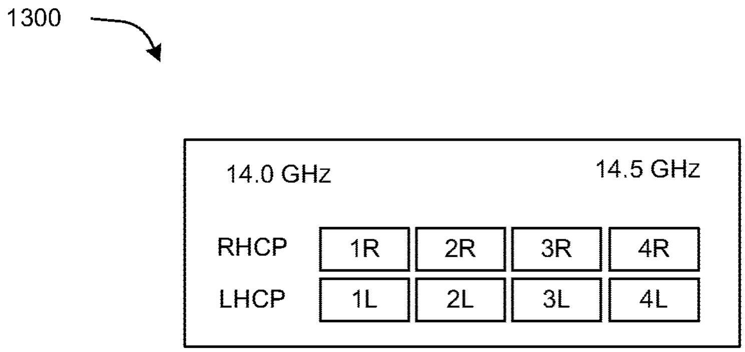
FIG. 13 illustrates an example representation for return link channelization.

FIG. 13 illustrates an example representation 1300 for the return link channelization. Referring to FIG. 13, there may be 4×125 MHz channels on each polarization. Each 125 MHz channel may be further sub-channelized into a smaller bandwidth.

In an example, adaptive coding and modulation (ACM) may be used with various modulation types and code rates as described in Table 4.

TABLE 4

| | |
|---|---|
| Modulation | QPSK, 8PSK, 16 APSK, 32 APSK, 64 APSK [TBD] |

TABLE 4-continued

| | |
|---|---|
| Channel Coding | LDPC |
| Code Rate | 1/5~9/10 and repetition |

Table 5 summarizes the key DVB-RCS2 physical layer features.

TABLE 5

| | MF-TDMA | | |
|---|---|---|---|
| | TC-LM | SS-TC-LM | CC-CPM |
| FEC Scheme | Duo-binary Turbo Codes R 1/3-7/8 | Duo-binary Turbo Codes R 1/3, 1/2 | Conv. Codes K = 3 and K = 4, R 1/2-6/7 |
| Payload Size (bytes) | 14-599 | 38-438 | 21-188 |
| Modulation | π/2-BPSK, QPSK, 8PSK, 16 QAM | π/2-BPSK | 4-ary CPM |
| Pulse Shaping | SQRC, roll-off 0.20 | SQRC, roll-off 0.20 | Weighted average CPM |
| Spreading Factor | N/A | 2-16 | N/A |
| # of Waveforms Specified in [4] | 40 (note 1) | 19 | 20 |
| Channel Bonding (Carrier Aggregation) | No | No | No |

Table 6 summarizes the key IPoS physical layer features.

TABLE 6

| | |
|---|---|
| FEC scheme | DVB-S2X like LDPC, R 1/3-9/10,<br>Regular:<br>Info. bits: 240-5184 bits<br>Extended or Jumbo:<br>Info. bits: up to around 38800 bits<br>Allows code block concatenations in a burst |
| Payload size | Around 30 bytes-4850 bytes |
| Modulation | QPSK, 8PSK, 16 APSK, 32 APSK |
| Pulse shaping | SQRC, configurable roll-off as low as 0.05 |
| Spreading | Up to spreading factor of 32 (all modulation types) |
| Channel bonding (Carrier Aggregation) | No |

Table 7 summarizes the key NR physical layer features.

TABLE 7

| | |
|---|---|
| FEC scheme | NR LDPC, rate compatible<br>BG1 (mother code rate 1/3):<br>Info. bits: 8448<br>BG2 (mother code rate 1/5):<br>Info. bits: 3840<br>Code block concatenations (multiple code block transmissions) in a burst |
| Payload size | TBS size from around 3 bytes to more than 62500 bytes |
| Modulation | OFDM: QPSK, 16QAM, 64 QAM<br>SC-FDMA: π/2-BPSK, QPSK, 16QAM, and 64QAM<br>Sub-carrier spacing: 15, 30, 60, 120 kHz |
| Pulse shaping | Time domain windowing, spectral occupancy around 95% (i.e., 5% roll-off). |
| Spreading factor | Repetition by the rate matching function |
| Channel bonding (Carrier aggregation) | Yes. |

As shown in table 7, NR provides flexibility as well as a wide variety of features.

In an example, synchronization reference point may be defined at the satellite. The satellite may derive system timing and frequency synchronization reference from GNSS. Similarly, the ground network and the user terminal may be equipped with a GNSS receiver. The timing and frequency reference for the ground network and the user terminal may be based on timing and frequency derived from the GNSS receiver and information of their position relative to the satellite. The ground network may periodically broadcast the satellite ephemeris data to the user terminal. The satellite motion may introduce Doppler to the fixed terminals in the magnitude of, for example, 20 ppm at an elevation angle of 20 degrees. The proposed synchronization framework with pre- and post-Doppler/delay compensation reduces the timing and frequency uncertainty introduced by the motion of the LEO satellites.

In an example, to support flexible and efficient beam hopping while meeting the latency requirement, the following beam hopping parameters may be used for the physical layer to support in the user link:

Dwell resolution: around 125~250 us

Hopping cycle: around 2~4 ms

The physical layer may support PNT services using the downlink hopped beams, using the same physical channels defined for the communications service. The forward link air interface may support PNT related broadcast, and the user terminal receiver timing estimation may be accurate enough to support the PNT time precision of at least 10 ns.

MAC/RLC Layer

The MAC layer provides multiplexing capability using logical channels. The MAC layer also provides required signaling for resources allocation, air-interface control messages for link adaptation, etc. The service link MAC functions may be shared between the satellite and the ground network. As an example, the link adaptation functions and signaling associated with the MAC layer may be situated in the ground network thereby significantly reducing complexity of the satellite. Link adaptation loops in satellite systems need not operate with a very small time-constant due to the nature of satellite channels. This characteristic of satellite channel may be exploited here. The satellite may need to compute the signal quality metric of the burst that it receives from the user link and pass it on to the ground network for further processing—this processing may include filtering and determining the best power level and modulation coding scheme that the user terminal need to use for optimal performance. The RLC layer may provide segmentation and reassembly functions. The RLC layer may also provide transmission reliability for acknowledgement mode (AM) flows between the ground network and the user terminal.

The MAC layer runs between the user terminal and satellite and the RLC layer runs between the user terminal and the GSNB in the protocol architecture. AM mode may be configured to provide additional reliability when desired. RLC mode selection may be based on traffic flow and the desired target packet error rate.

RLC sequence numbers (SN) may be used as well to provide information on last SN sent towards user terminal from the source cell/satellite at the time of handover. This provides indication to the GSNB on the data to forward to target cell/satellite or indication that some packets have already been sent at the source cell/satellite. In an example, 5G based RLC may include an 18-bit sequence number option for AM mode and that allows for 131,072 window size. This sequence space may be per radio bearer (flow).

Another advantage of using 5G RLC may be that the SN may not be set at time of transmission and segmentation at the satellite to match the allocated physical bearer but may be done ahead of transmission time. The sequencing happens at the GSNB. At the time of satellite transmission, the MAC layer makes adjustment to RLC header to account for the re-segmentation. The MAC header adjustment may be done efficiently at the satellite. The RLC header gets updated with the fragment offset. The satellite RLC header adjustment may not require RLC stack or maintenance of RLC states. This may be still maintained end-to-end between the user terminal and the GSNB.

Figures 14, 15, 16:
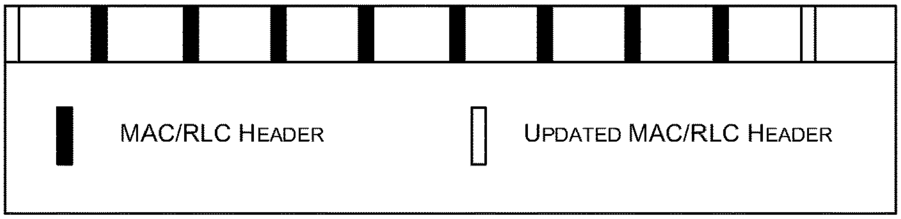
FIGS. 14-15 illustrate example representations of radio link control (RLC)/medium access control (MAC) header structure that enable re-segmentation with minimal processing.
FIG. 16 illustrates an example representation of an RLC block.

In the return direction, the satellite need not reassemble, and forwards the received data to the user terminal's assigned GSNB. FIGS. 14-15 illustrate example representations (1400, 1500) of RLC/MAC header structure that enable re-segmentation with minimal processing. At the time of transmission, the RLC header of last PDU may be updated with Segment Offset field if it is segmented. The update may consist of updating the 2-bit segmentation information and inserting the segment offset. The physical layer burst may carry multiple RLC blocks towards one or multiple user terminals. Only the first and/or the last RLC block in physical bearer may require segmentation information to be updated. This is depicted in FIG. 16 which illustrates an example representation 1600. AM RLC status PDU may report missing sequence number requiring retransmission. In addition, RLC status PDU may have the capability of reporting what fragment of the RLC block if any is missing. This feedback allows the sending entity (i.e. GSNB or user terminal) to retransmit only the missing fragments.

Figure 17:
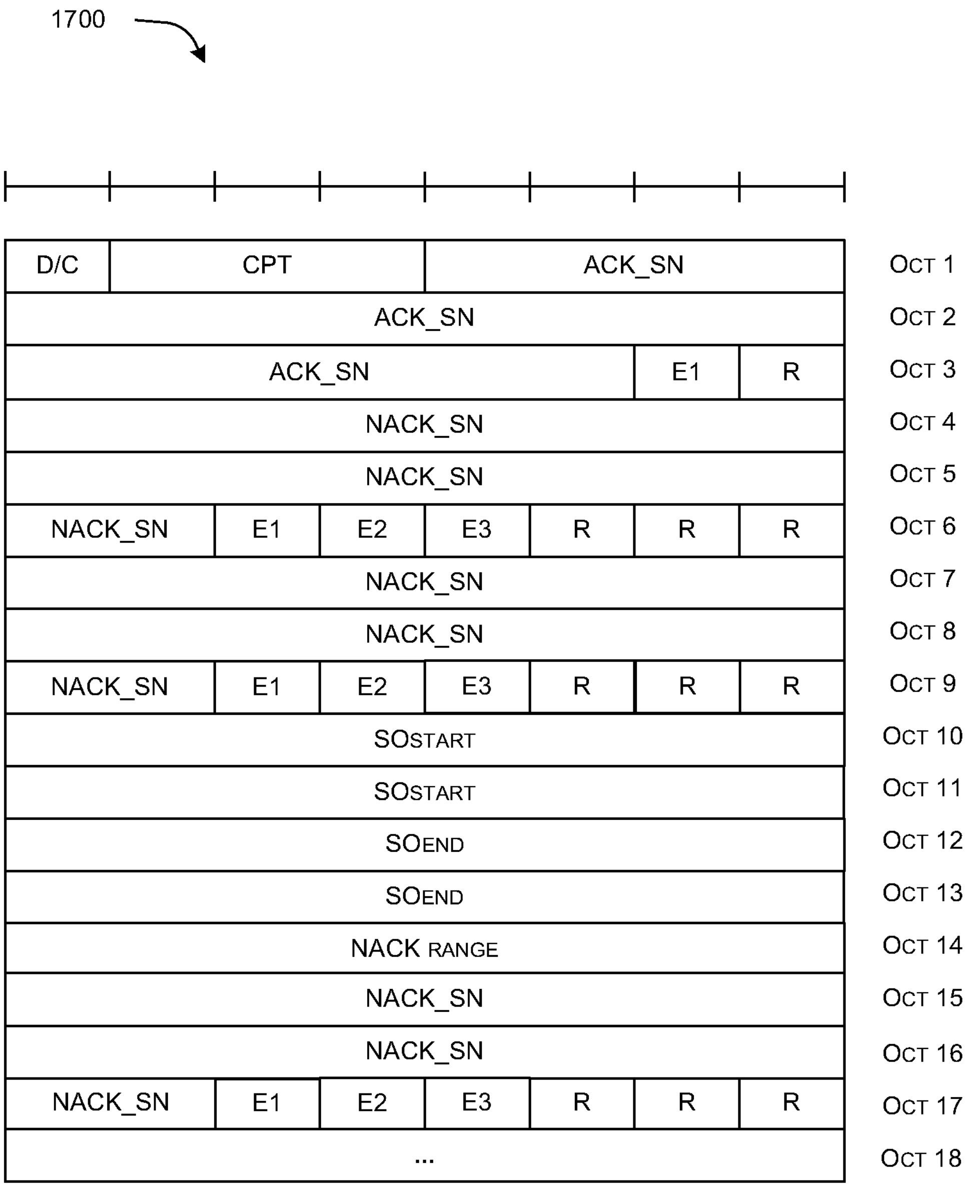
FIG. 17 illustrates an example representation of an RLC status packet data unit (PDU) and relevant fields.

FIG. 17 illustrates an example representation 1700 of an RLC status PDU and relevant fields. It may be appreciated that most of the fields are optional and may be used as needed, for example if there is an RLC SN that may not be received successfully, or fragments of an RLC block, etc.

Figure 18:
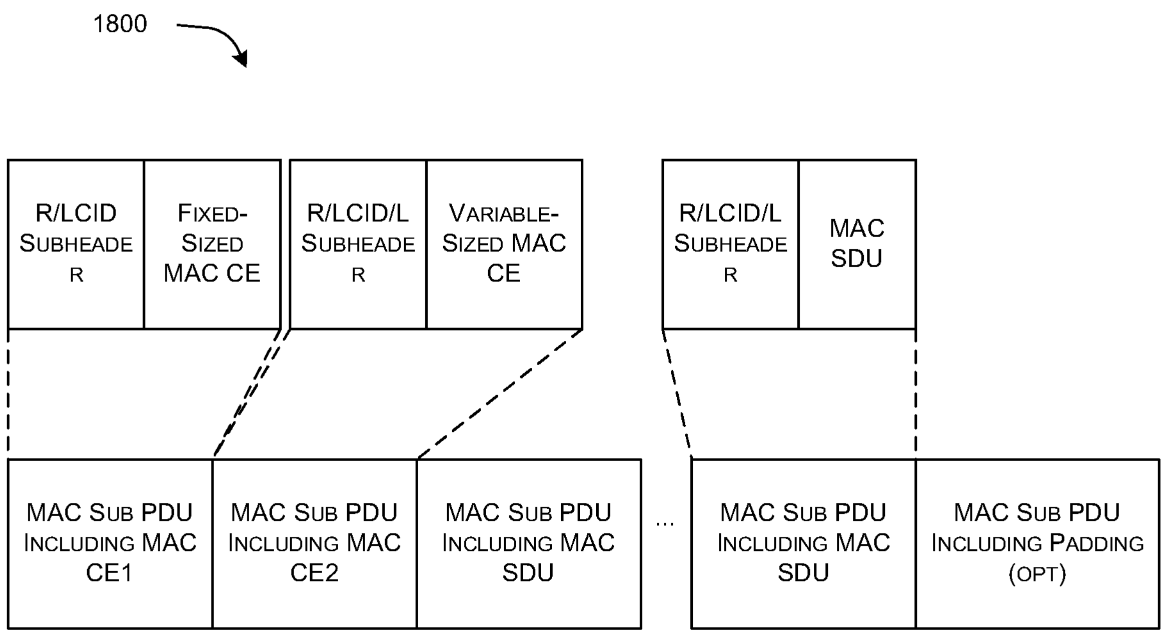
FIG. 18 illustrates an example representation of a downlink MAC PDU.

FIG. 18 illustrates an example representation 1800 of a downlink MAC PDU. In an example, the MAC header identifies flow identifier and not the user identifier. Therefore, no additional adjustment/processing may be needed for the MAC payload and may interface with different PHY/MAC air interfaces using different types of addressing. The flow identifier may also be appended to the RLC header by GSNB.

The MAC layer along the uplink resource allocation may provide feedback on last known uplink transmissions, specifically transmission that failed cyclic redundancy check (CRC) with little overhead. With the return link feedback channel, the user terminal may identify if it needs to retransmit specific RLC blocks. Therefore, this provides a faster recovery mechanism as the feedback may be between the user terminal and the satellite, and supplements the baseline RLC retransmission mechanism between the user terminal and the GSNB.

In an example, some of the QoS parameters that may drive a scheduler include, but are not limited to, resource type (GBR, delay critical GBR, or non-GBR), guaranteed flow bit rate (GFBR)—uplink and downlink, maximum flow bit rate (MFBR)—uplink and downlink, packet delay budget (PDB), packet error rate, and priority level. These QoS parameters may be used to realize guaranteed bit-rate, non-guaranteed bit-rate, and blended guaranteed and non-guaranteed bit-rate.

Figure 19:
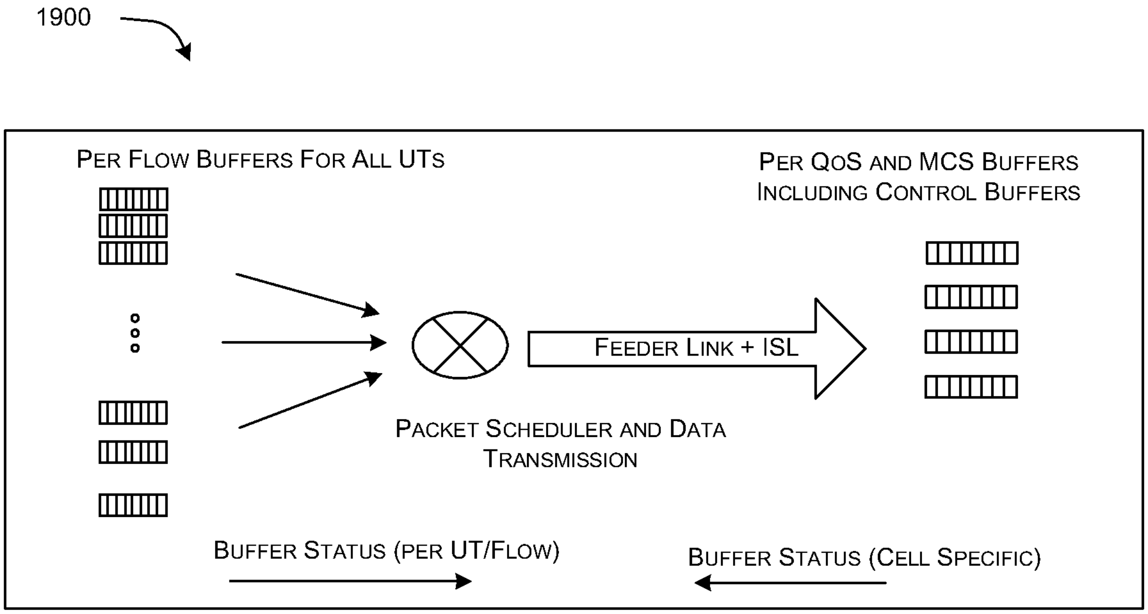
FIG. 19 illustrates an example representation of a ground-assisted satellite scheduler.

FIG. 19 illustrates an example representation 1900 of a ground-assisted satellite scheduler.

In an example, most flows/user terminals may be allocated on the ground. This especially applies in a forward direction where user data may be routed through POPs and GSNBs. First level of scheduling may be done at the GSNB when forwarding user data to the satellite. The GSNB scheduler may allocate different resource types reflecting their QoS requirements. Table 8 shows different traffic types supported by the scheduler 1900 and example application using those services.

TABLE 8

| GBR/Non-GBR | Delay Sensitivity | example application |
|---|---|---|
| Non-GBR | delay insensitive | e-mail, file transfer etc |
| Non-GBR | delay sensitive | Interactive services: web browsing, gaming etc. |
| Non-GBR | immediate | signaling, SIP etc. |
| GBR | delay insensitive | Streaming |
| GBR | delay sensitive | Conversational services (VoIP/video conferencing etc.) |

Subsequently, the scheduler may allocate and organize the traffic from all the flows/user terminals into data streams, each associated with a resource type and a priority that get queued at the satellite accordingly. At the satellite, additional grouping may be done based on user terminal's MCSs.

In an example, satellite packet buffers may be organized per cell and may be associated with a source GSNB. For a direct user terminal to user terminal session such as that depicted in FIG. 8, the user terminal label may indicate the QoS desired and the satellite and cell in which the other user terminal is. L2 frames from this user terminal may be merged into the appropriate cell queue of the satellite that destination user terminal may be communicating with.

In an example, packets may also be buffered based on their QoS. This provides the satellite user link scheduler with the separation needed to provide further segregation between the type of flows according to their guaranteed bit and delay budgets and packet error rate.

The GSNBs are periodically updated with the state of the cell specific buffers and need to ensure that buffer sizes are at a healthy level by ensuring that there are always enough packets queued for transmission given the channel rate while avoiding unnecessary large queues at the satellites.

Figure 20A:
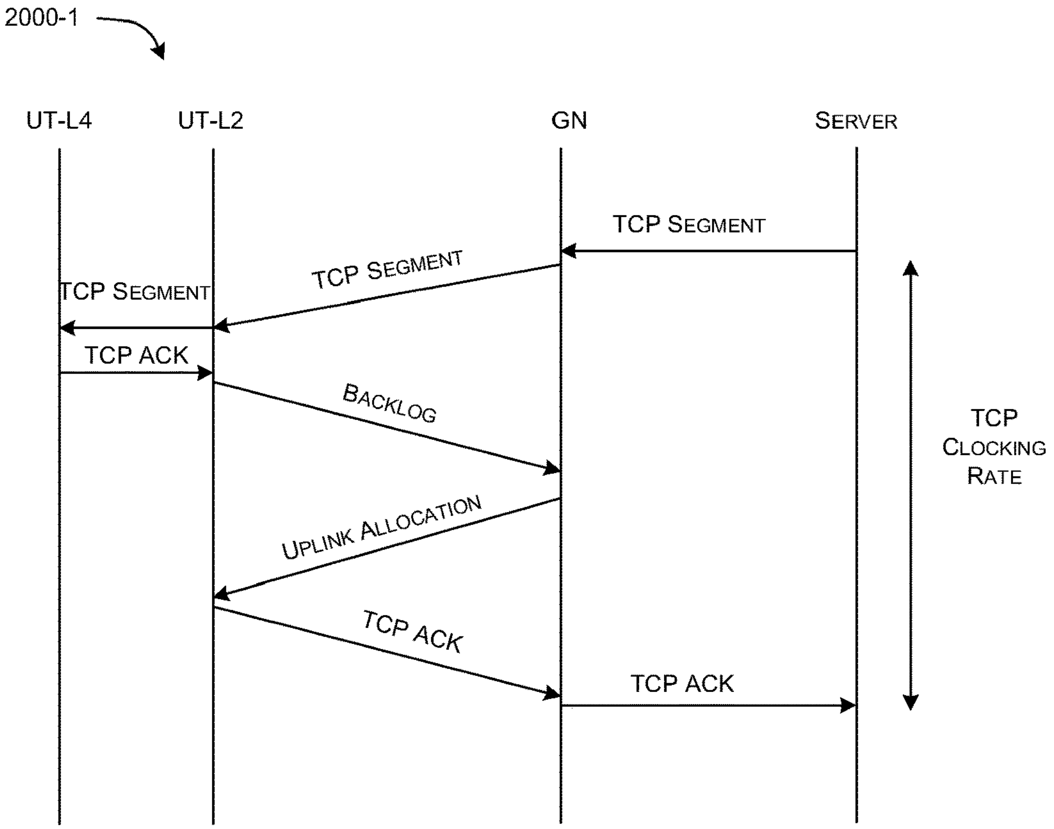
FIGS. 20A-20B illustrate Unsolicited Uplink Grant (UUG) to improve TCP throughput.
Figure 20B:
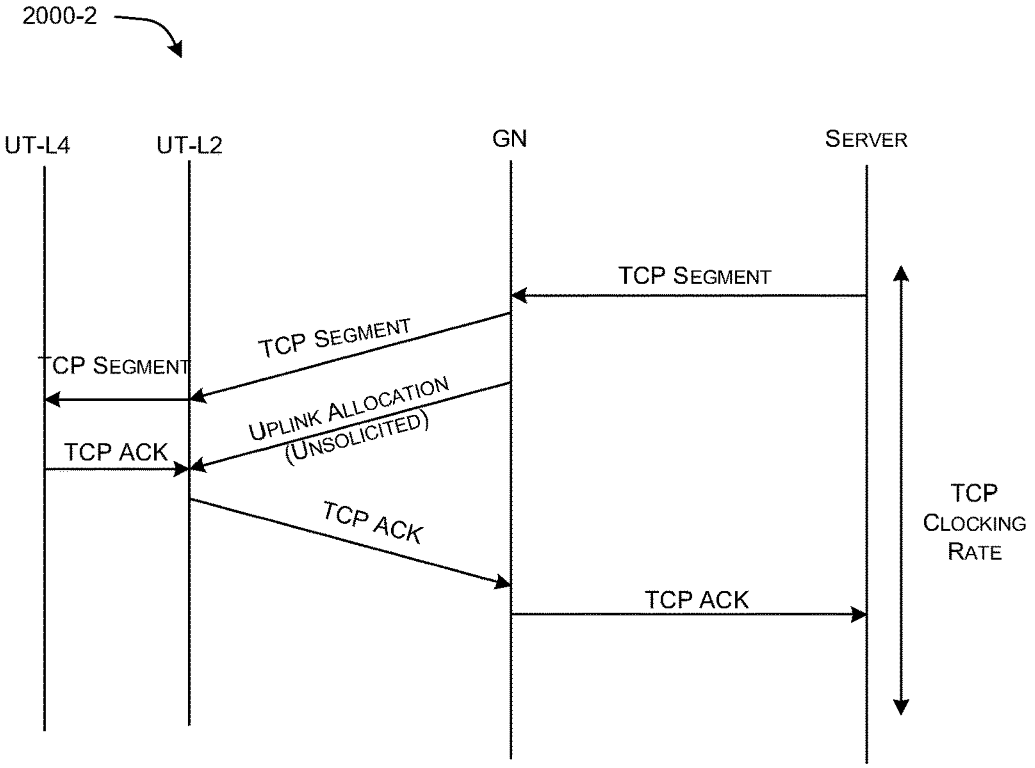

FIGS. 20A-20B illustrate Unsolicited Uplink Grant (UUG) representations (2000-1, 2000-2) to improve TCP throughput.

Figure 21:
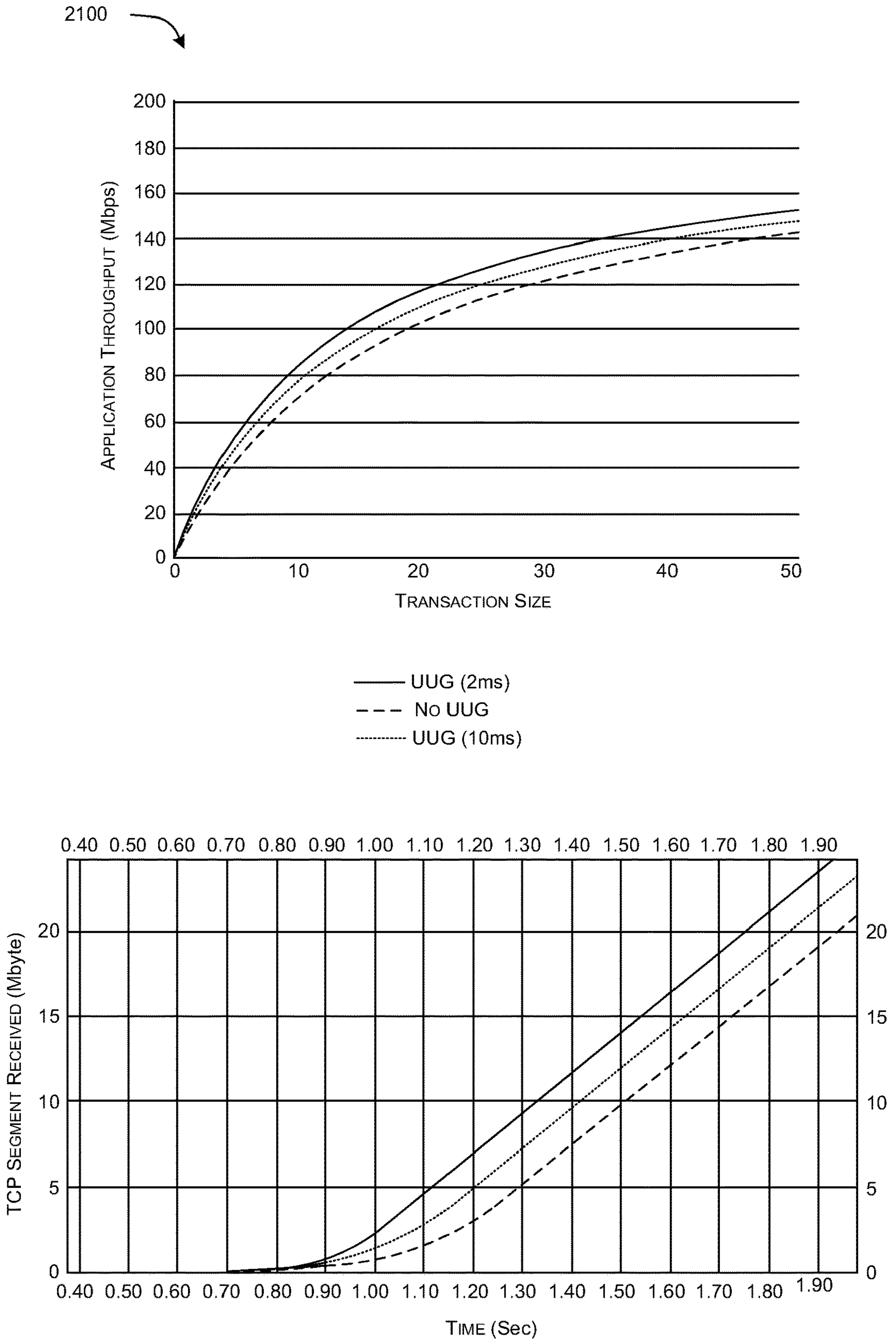
FIG. 21 illustrates an example representation of impact of UUG on transmission control protocol (TCP) throughput.

Return link resource allocation may use user terminal's backlog reporting for different type of flows. Traffic flows that are very delay sensitive may not rely on solely backlog reporting and may get allocated even during low traffic activity. In order to reduce over the air signaling and scheduler complexity, resources are allocated to a user terminal and the user terminal scheduler prioritizes the transmission among the active flows. The user terminal scheduler prioritization configuration may be setup by the ground network at the time the flows are setup. UUG may be yet another feature in the proposed scheduler that enhances the end-to-end experience whereby resources are allocated to a user terminal to improve the responsiveness of some transaction or even the throughput. This feature applies when uplink resources are available or when there may be an expected packet arrival requiring uplink transmission, for example, during registration when there may be signaling between the user terminal, the ground network, and the core network. Another example may be during downlink data transfer, using TCP for which TCP Acks are expected in the opposite direction. FIG. 21 illustrates an example representation 2100 of impact of UUG on TCP throughput.

Figures 22, 23:
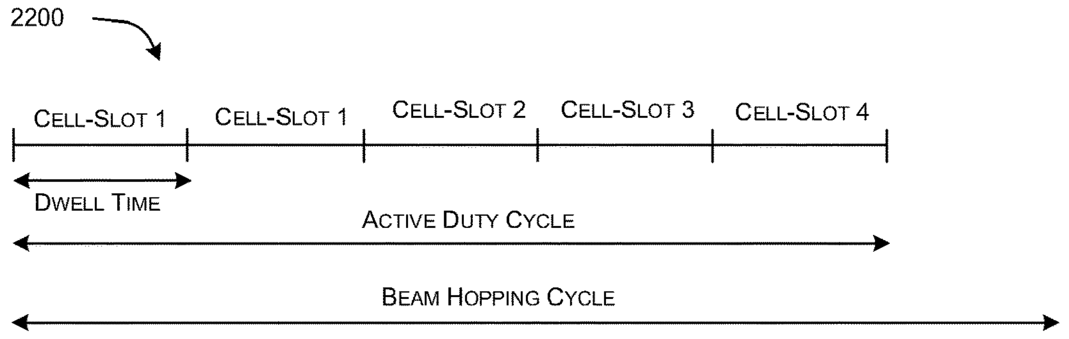
FIG. 22 illustrates an example representation of a relationship of different cycles associated with beam scheduling, hopping, and duty cycle.
FIG. 23 illustrates an example representation of cell-slot schedule, where the schedule may be done semi-statically.

FIG. 22 illustrates an example representation 2200 of a relationship of different cycles associated with beam scheduling, hopping, and duty cycle. Cell demand and load drive cell selection as part of the scheduler with special consideration to GBR demand while ensuring a minimum scheduling opportunity for lightly loaded cells due UT synchronization, cell acquisition or other requirements.

In addition to the cell-slot demand, the beam hopping scheduler may consider the satellite beam hopping capability and how much in advance the hopping cycle may be changed and/or whether the cell-slot may be chosen on demand.

FIG. 23 illustrates an example representation 2300 of cell-slot schedule, where the schedule may be done semi-statically.

As an example, 5 cells may be assigned to a beam in this case. The schedule shows the assigned cell to each dwell cycle. In this case, each cell may be visited at least once every 5 dwell cycle. This cycle represents the minimum idle mode cycle. The cell selection for the purpose of data transmission follows a different pattern and may be based on the demand in the different cells, with cell 1 and 2 getting more allocations compared to cells 3, 4, and 5. The activation of the cell happens at different times in the forward and the return. This follows the timing relationship between the downlink and uplink burst, used for example to provide uplink allocation. This timing relationship may be fixed.

Figures 24, 25:
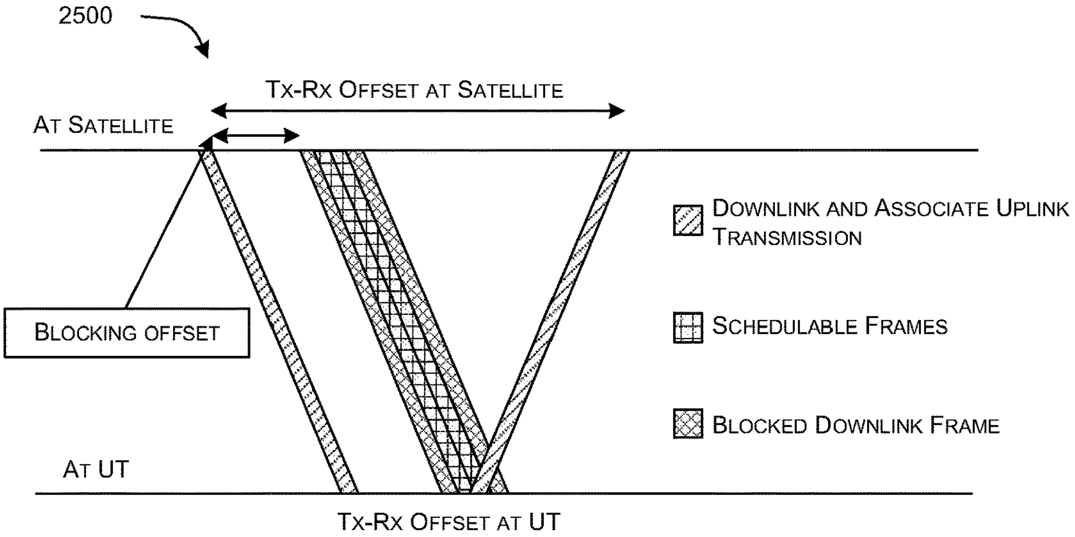
FIG. 24 illustrates an example representation of a cell-slot schedule, where two separate duty cycles may be allowed in return direction.
FIG. 25 illustrates an example representation of half-duplex blocking and impact of uplink transmission on downlink transmission and frames that are blocked.

FIG. 24 illustrates an example representation 2400 of a cell-slot schedule, where two separate duty cycles may be allowed in return direction. Referring to FIG. 24, the RACH cycle may run on a different cycle that may be advertised in system information to allow the user terminal to send RACH even when downlink may not be configured.

FIG. 25 illustrates an example representation 2500 of half-duplex blocking and impact of uplink transmission on downlink transmission and frames that are blocked.

To address half-duplex terminals, it may be required to find optimal configuration to minimize user terminal blocking and hence improving data exchange opportunities (downlink and uplink) and operating with highest throughput. Specifically, Tx-Rx offset at the satellite drives the blocking pattern at the user terminal in the cell. The scheduler needs to know what downlink frames are impacted if an uplink allocation was sent in downlink frame n. All UTs may be treated as if they are collocated based on cell location. The TX-RX configuration needs to be the same for all the cells associated to a specific beam.

Figure 26:
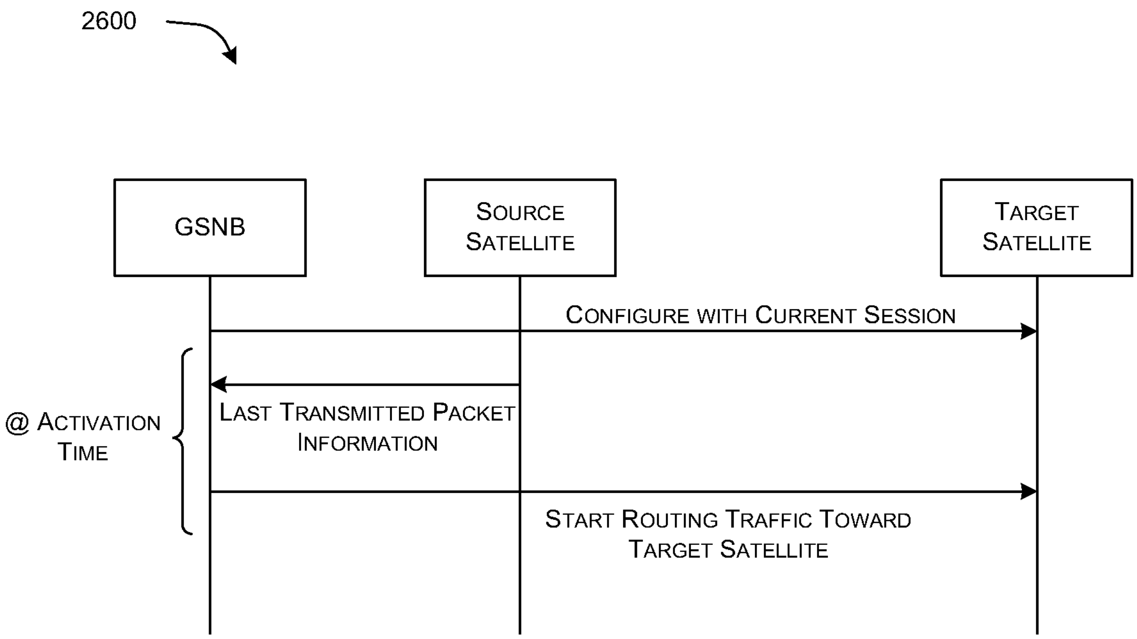
FIG. 26 illustrates an example representation for implementing cell satellite handover.

FIG. 26 illustrates an example representation 2600 for implementing cell satellite handover.

During a satellite handover, all the user terminals in the cell may be assigned to a different satellite. To reduce/eliminate handover messages, the broadcasted system information may provide the user terminals with the target satellite, frequency, and activation time. This may be accomplished by maintaining service link user identifier between source and target satellite. The user terminal service link identifier may be carried along with user terminal configuration either from the GSNB or POP at the time of handover toward the target cell/satellite. Additionally, user terminals unable to get information from system information due to link quality may request a unicast handover message. The same may apply during frequency handover.

Referring to FIG. 26, the representation 2600 depicts the high-level signaling and traffic forwarding used that results in lossless handover while maintaining RLC state transition used for reliable transmission. Maintaining state transition provides faster packet recovery in case of packet error and fewer unnecessary packet retransmission, which results in lossless handover. Further, given that all the user terminals are handed over at the same time, there may be no need to provide them individually with handover message and may continue with the same configuration, including user identifier etc. into the next satellite providing service to the specific cell. Next satellite and frequency information assigned to cell may be periodically sent on the broadcast channel. Intra-satellite frequency handover may be signaled in a similar fashion. Furthermore, user terminal specific handovers may be done using handover messages. This may apply, for example, to mobile user terminals and might be used for load balancing when a cell may be covered by multiple beams and or satellites.

In forward direction, the most efficient modulation and coding scheme (MCS) may be selected that meets the desired target FER (for example 10^-6 FER). The MCS selection may be based on UT reported forward link quality. In return direction, a combination of uplink power control and MCS selection may be used to maximize user channel efficiency, meet desired target FER (for example 10^-6 FER) while ensuring compliance with regulatory requirements associated with transmit power per Hz.

The proposed user link air interface power control may include an open loop and a closed component. The open loop power control may ensure a desired initial power level at initial access and during handover time. Based on the forward signal level, the user terminal may adjust its initial transmit power to be received at the satellite with a desired nominal level. System information may provide satellite transmit power and the desired target nominal level for the user terminal's power level determination. Closed loop power control may adjust user terminal transmit power level based on filtered received SINR and the desired operating point.

RRC Layer

Figure 27:
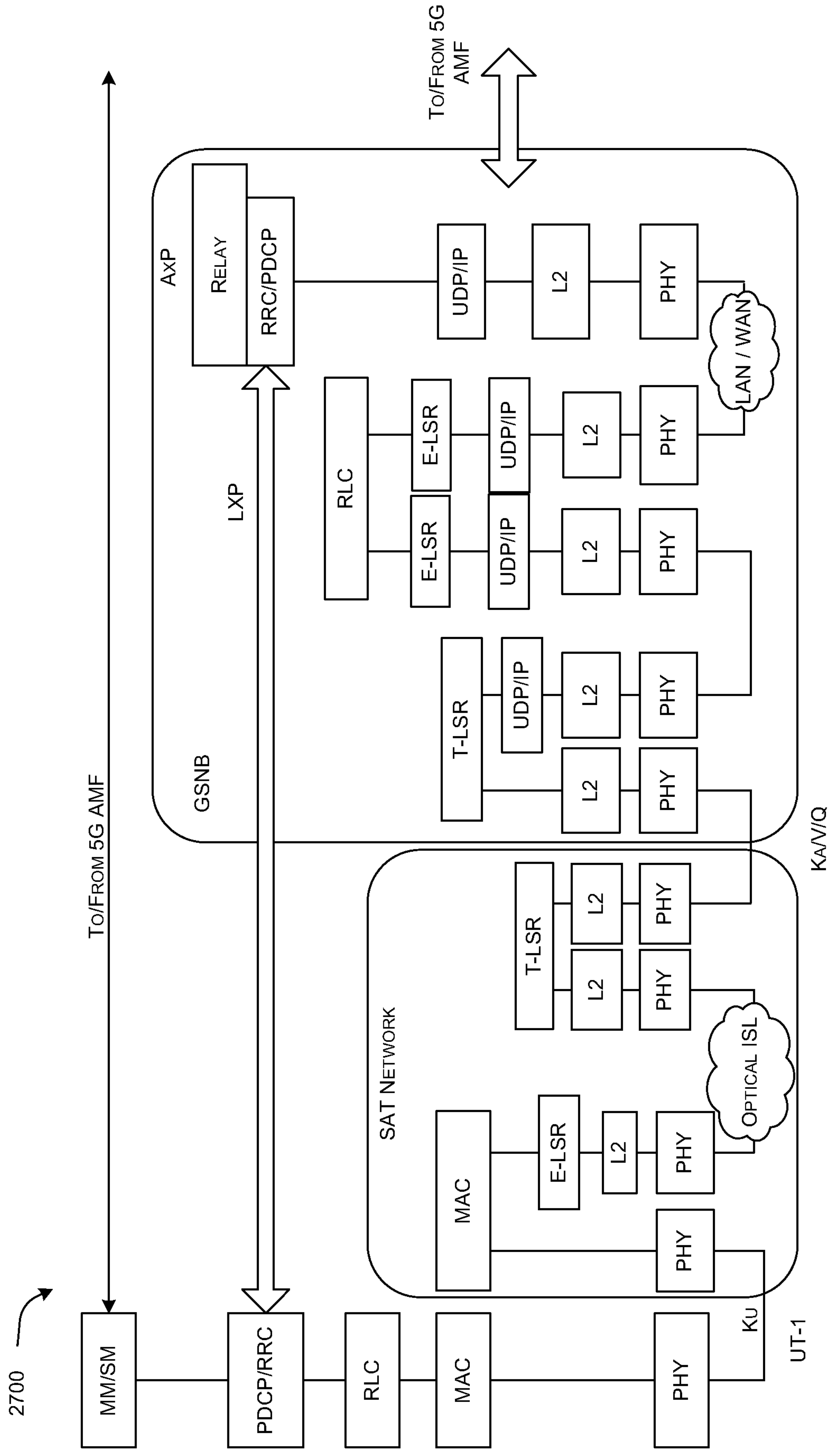
FIG. 27 illustrates an example representation for implementing radio resource control (RRC) layer in the proposed control plane stack.

FIG. 27 illustrates an example representation 2700 for implementing RRC layer in the proposed control plane stack.

RRC is a layer-3 control plane protocol between the ground network and the user terminal in the protocol stack. The major functions and features of RRC may include, but not be limited to, customized system information broadcast customized, latency-optimized connection establishment, maintenance, and recovery, configuration of various user plane protocol layers (PHY, MAC, RLC, PDCP, SDAP), enhanced security (AES-256) and integrity protection for signaling and user data, user terminal location reporting, establishment, modification, and release of signaling and data bearers, establishment of direct user terminal to user terminal sessions, maintaining connection continuity through satellite movement and user terminal movement using customized mobility procedures to achieve fast, efficient, and seamless handovers, and efficient paging at the cell level.

The RRC may define customized system information broadcast formats and schedules that cater specifically to the proposed architecture and supported services. PNT service data may also conveyed efficiently over a dedicated system information block. The RRC may also leverage system information to broadcast cell-level mobility information and thereby eliminate a lot of dedicated handover signaling overhead.

Figure 28:
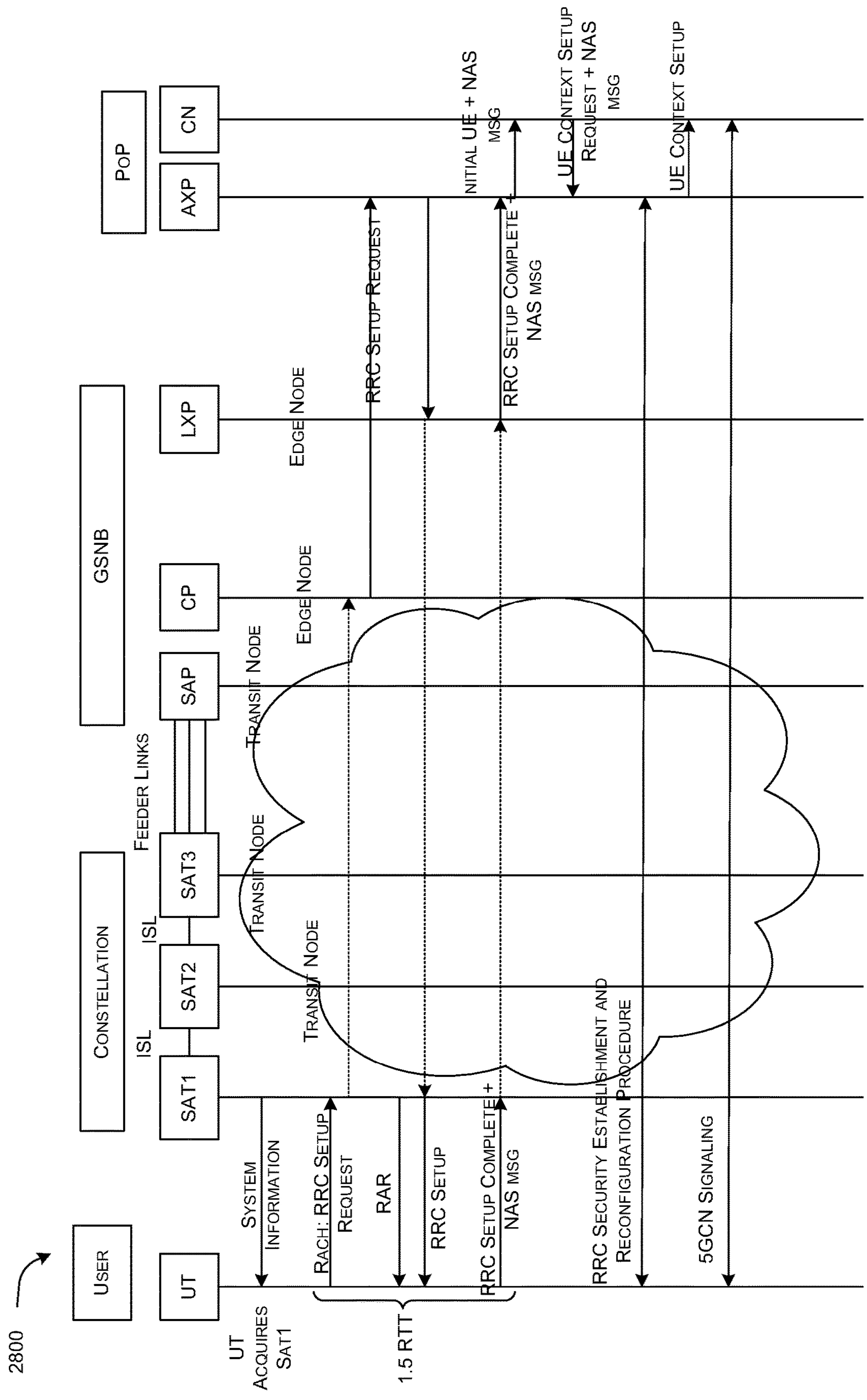
FIG. 28 illustrates an example representation of low latency connection setup.

FIG. 28 illustrates an example representation 2800 of low latency connection setup. The RRC may define low-latency procedures for connection setup and reestablishment. Enhancements over the 5G NR protocol enable RRC connection setup and reestablishment to complete within 1.5 round trips (versus 2.5 for 5G NR) as illustrated in FIG. 28. As in 5G NR, RRC signaling procedures support piggy backed NAS layer signaling to minimize signaling latencies.

The RRC protocol may be ciphered and integrity protected with AES-256 end to end (between the user terminal and the ground network). This may be over and above the independent end-to-end encryption of 5GC signaling carried over RRC connections. Integrity protection and ciphering may be provided by the PDCP layer for signaling radio bearers (SRBs) just as it may be for data radio bearers (DRBs). The RRC manages 256-bit ciphering and integrity keys for signaling and data bearers in coordination with the 5GC core network, thus not requiring additional dedicated key provisioning in the ground network. Security associations are established automatically at connection setup and maintained across handovers and connection reestablishment.

Figure 29:
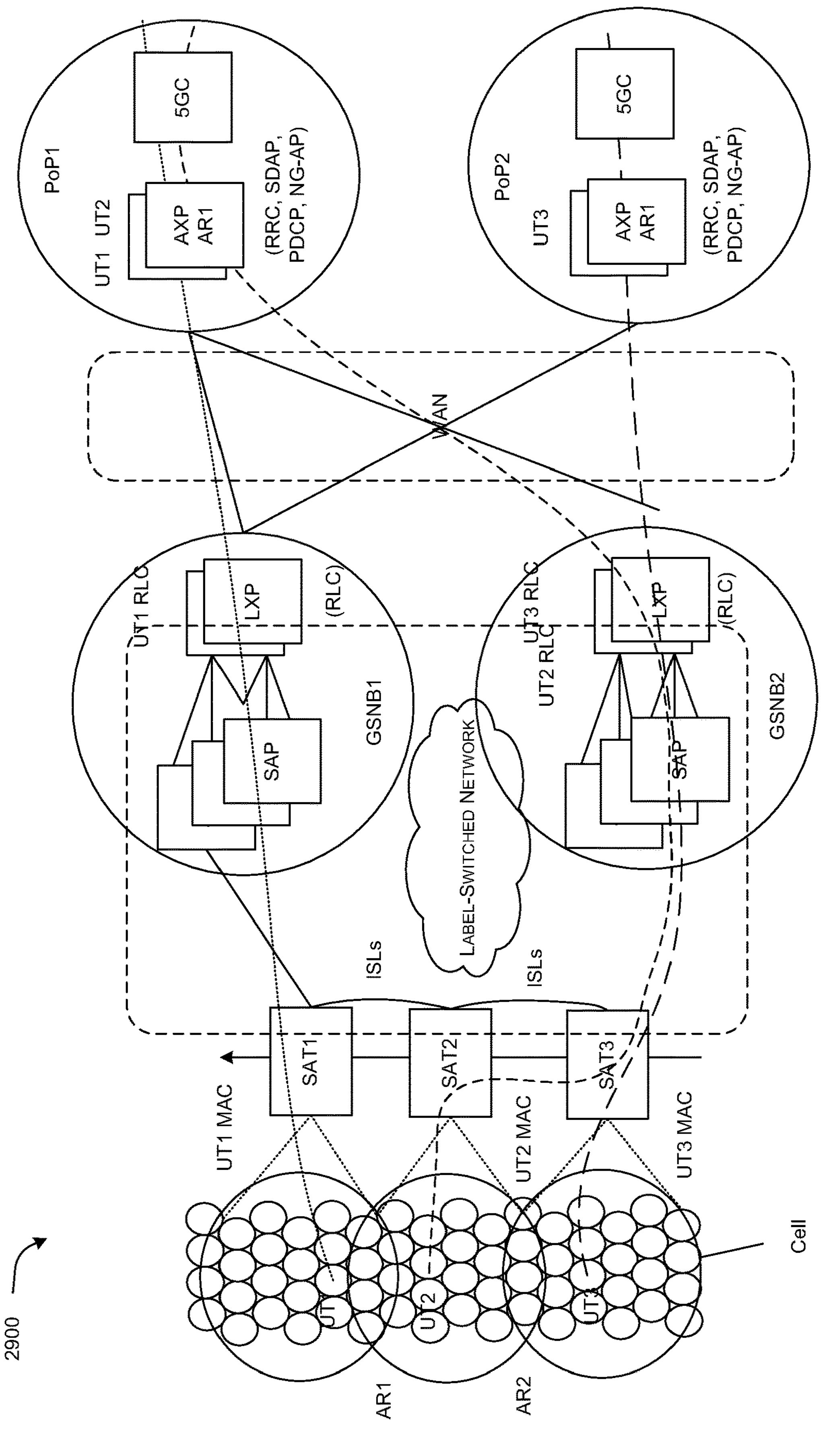
FIG. 29 illustrates an example representation for implementing data bearer paths and locations of protocol entities.

FIG. 29 illustrates an example representation 2900 for implementing data bearer paths and locations of protocol entities.

The RRC may support the configuration of data radio bearers (DRBs) corresponding to PDU sessions using QoS parameters signaled by the 5GC. RRC configures the PDCP, RLC, and MAC layers accordingly to support the corresponding flows. The proposed system implements dynamic label-switched routing infrastructure between the ground network and the satellites, which are connected through a constantly changing set of feeder links and optical ISLs. When setting up data bearers, the RRC also configures appropriate routing tags in the endpoints to ensure that the correct QoS-specific label-switched paths get used for each bearer.

The RRC provides special support for data bearers to support direct user terminal to user terminal communication. After registration and authentication with the 5GC, the direct user terminal to user terminal sessions are set up like regular PDU sessions, but the ground network then configures the user terminals and satellite payloads to map these bearers to label switched paths that do not transit any ground networks or the 5GC.

The ground network provides the user terminal with necessary routing information identifying the current serving satellite and cell of the peer user terminal. The receiving satellite then maps this to the corresponding satellite-satellite label switched path, which may have previously been set up by the RDF's routing table updates. When the serving satellite of either peer user terminal changes, the ground network updates the user terminal to user terminal routing information through RRC-level handover procedures.

Table 9 summarizes the major mobility scenarios anticipated in the proposed network, approximately ordered by decreasing frequency of occurrence.

TABLE 9

| No. | Handover Type | Due to | Could Affect | Mechanism |
|---|---|---|---|---|
| 1 | Satellite HO (Cell) | Cell transitions between satellites (2.2 cells/sec per satellite; once every ~7 minutes per cell) | All UTs in cell and peer UTs (UT-UT sessions) | All UTs in cell moved to MAC scheduler in new satellite, but RLC contexts remain in same LXP(s). Scheduling is suspended and resumed at activation time to minimize retransmissions. Peer UTs in UT-UT sessions are also reconfigured. |
| 2 | Feeder link route change | Serving satellite transitions between GSNBs or scheduled contact change | All UTs served by satellite | MAC contexts remain in same satellite, RLC contexts remain in same LXP, only labels/routes get updated. UTs need not be aware of change. |
| 3 | ISL route change | Satellites move out of each other's FoVs or scheduled OISL contact change | All UTs of some cells served by satellite | MAC contexts remain in same satellite, RLC contexts remain in same LXP, only labels/routes get updated. UTs need not be aware of change. |
| 4 | Frequency HO (Cell) | Frequency-slot assignment of cell changes | All UTs in cell | No context movement, UT, PHY and MAC reconfigured to use new frequency-slot. |
| 5 | GSNB HO (UT) | HO due to no ISL path or no feeder link<br>or load balancing RLC contexts between GSNBs | All UTs in a cell-slot | MAC contexts may or may not remain in same satellite, RLC contexts moved to new LXP.<br>If only needed for load balancing, could use 5G intra-NR GnB-DU mobility procedure (handover via F1). |
| 6 | Cell-slot HO | UT moves between cells in the same TA, within the same satellite | Specific UT and peer UTs (UT-UT sessions) | MAC context is recreated/reconfigured in the same satellite, RLC remains in same LXP and PDCP in same AXP. Peer |

TABLE 9-continued

| No. | Handover Type | Due to | Could Affect | Mechanism |
|---|---|---|---|---|
| | | | | UTs in UT-UT sessions are also reconfigured. |
| 7 | Satellite HO (UT) | UT moves between cells, different satellite, same TA. | Specific UT and peer UTs (UT-UT sessions) | Similar to satellite HO (cell) but only affecting one UT. MAC context is moved to new satellite. Peer UTs in UT-UT sessions are also reconfigured. |
| 8 | AXP HO (Connection HO) | UT moves between cells, different TA and AXP. | Specific UT and peer UTs (UT-UT sessions) | Standard 5G handover via Xn or N2 to a different AXP. AMF and UPF remain the same. |
| 9 | PoP HO (Connection HO) | UT moves between cells, different TA, AXP in different PoP. | Specific UT and peer UTs (UT-UT sessions) | Standard 5G handover via Xn or N2 to an AXP in a different PoP. Potentially AMF and/or UPF also moved. |

Figure 30:
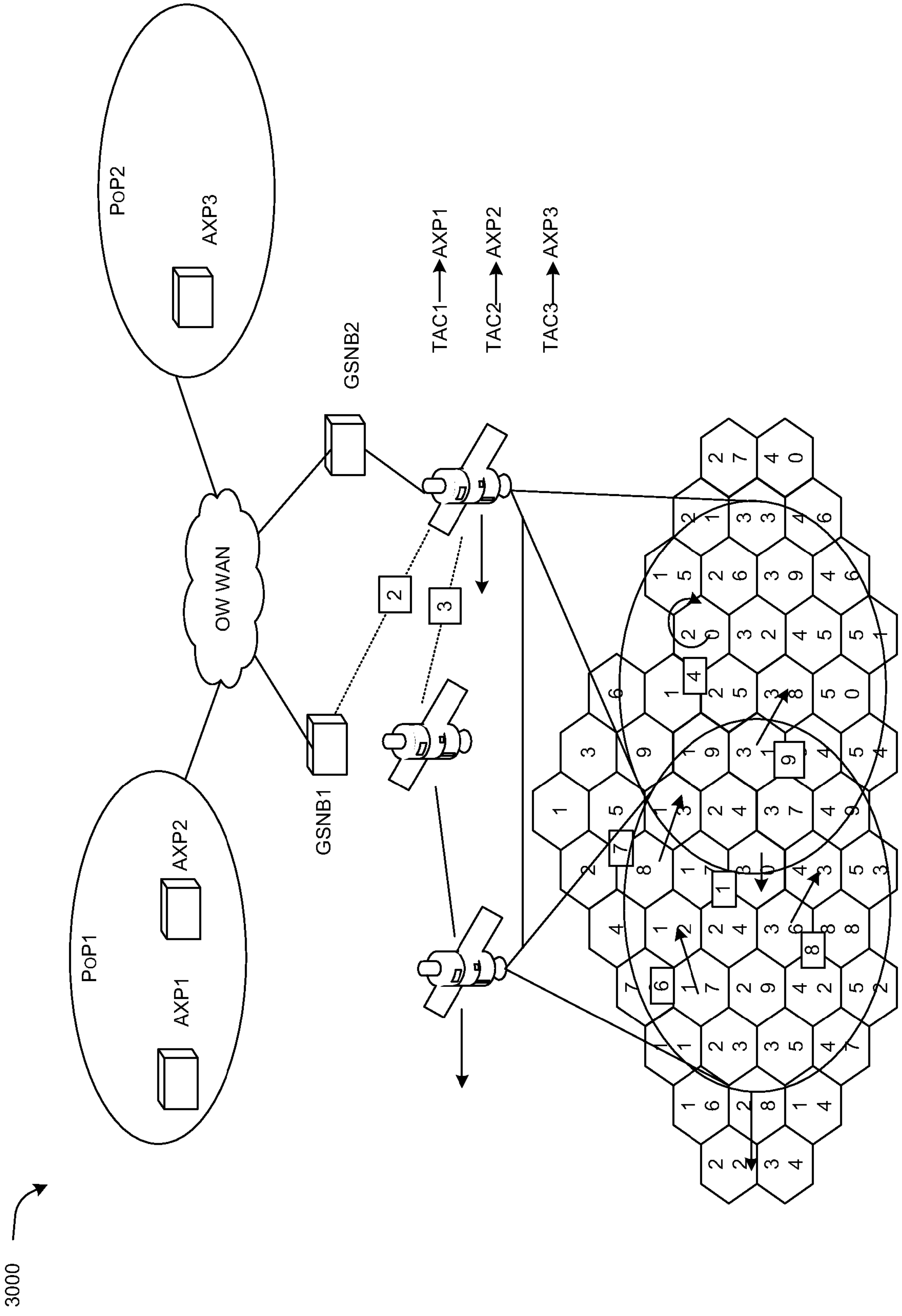
FIG. 30 illustrates an example representation for mobility scenarios anticipated in the proposed network.

FIG. 30 illustrates an example representation 3000 for mobility scenarios anticipated in the proposed network.

Figure 31:
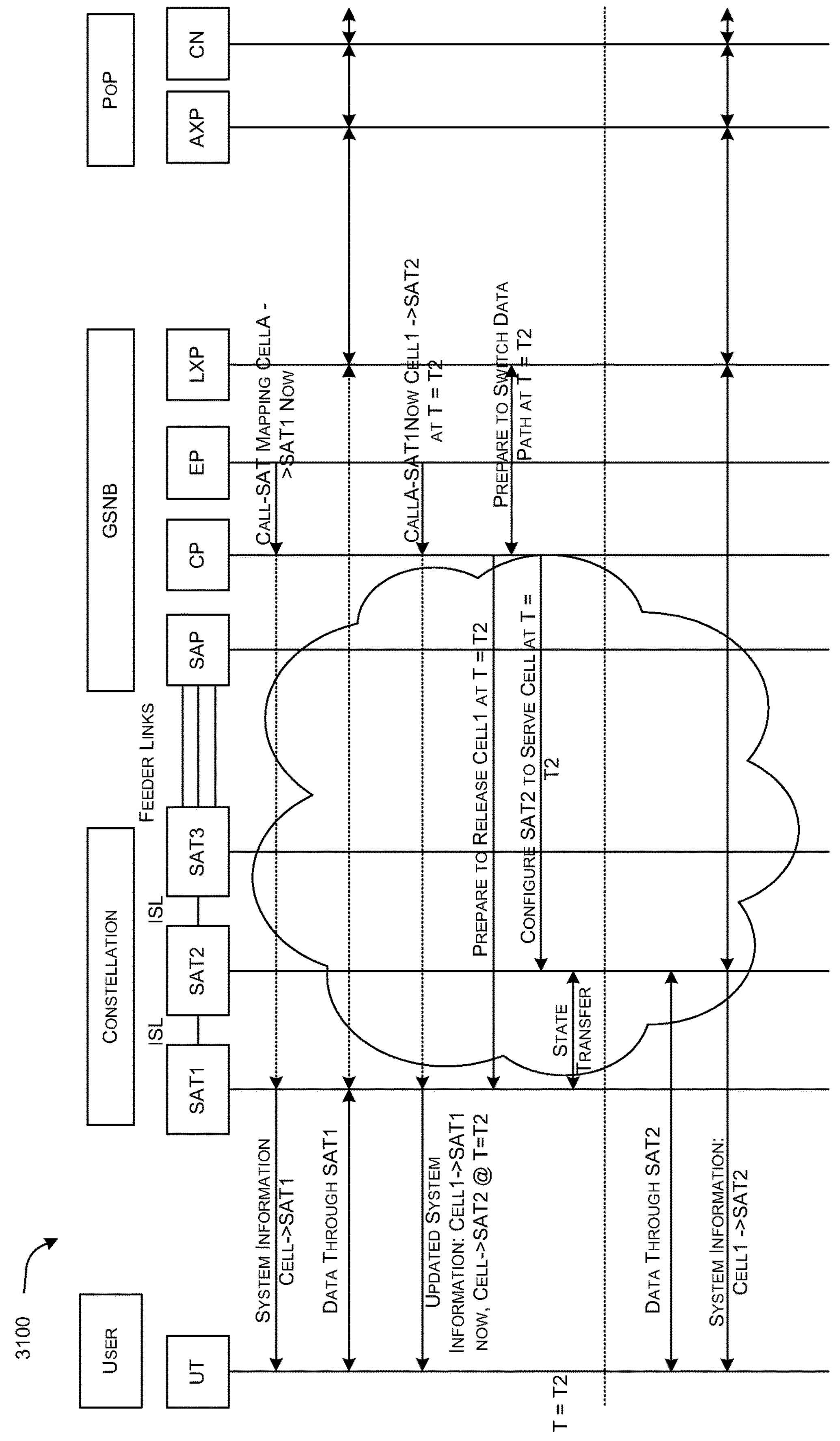
FIG. 31 illustrates an example representation for handover of a cell between satellites.

FIG. 31 illustrates an example representation 3100 for handover of a cell between satellites.

In an example, the cells at the edge of the satellite footprint transition from one satellite to that of a neighbor satellite due to the movement of the footprint at ~6 km/sec. On the average, 2.2 cells/second transition between satellites in this way, requiring all the user terminals in each such cell to be handed over to the next satellite. The RRC handles this scenario by transferring state information for all the user terminals in the cell to the target satellite and updating necessary routing information in the satellites and user terminals. The user terminals seamlessly switch to the target satellite and resume operation. The user terminal RLC and RRC/PDCP contexts may not be moved and there may be minimal retransmission of in-flight data via the target satellite. In an example, the exact time of the satellite handover may be known well in advance from the GNOC resource plan, so the GSNB may pre-configure the target satellite to serve the cell ahead of time. Similarly, the system information broadcast in the source satellite may be updated to inform all user terminals in the cell of the upcoming satellite transition, and the source satellite transfers data sequence numbers and end markers to the target satellite to mark the handover point. At the scheduled handover time, the user terminals in the cell simply switch to the new satellite and continue operation with continuity of state information including RLC sequence numbers and ciphering. The GSNB switches its data forwarding path to the target satellite at the same time. The only interruption in service may be during the user terminal's repointing, retuning, and acquisition of the new satellite (for example, <<20 ms). For direct user terminal to user terminal sessions, the peer user terminals need to be informed of the change of the destination satellite.

Referring to Table 9 above, in scenarios 2 and 3, only transit routing links between the user terminal's serving satellite and ground network are reconfigured. The user terminals are not affected by the reconfiguration, which takes place simply by updating routing tables in the satellites. Further, scenario 4 occurs due to planned reconfiguration of cell-slots. As this may be pre-planned, the new configuration may be conveyed to the user terminals in the cell in advance through updated system information broadcast in the cell (as in scenario 1), and the user terminals seamlessly switch to the new assigned cell-slot at the appointed time without need of the RACH procedure. There may be no movement of user terminal contexts between nodes. The only interruption in service is during the user terminal physical layer reconfiguration and acquisition of the new frequency-slot (<<20 ms).

Further, scenario 5 may be an infrequent case requiring movement of a user terminal's RLC context from one GSNB to another. This may occur, for example, if a user terminal's current serving GSNB no longer may have a route to the serving satellite and so the user terminal may have to be transferred to a different GSNB. This may also occur in the case when a cell may be served by cell-slots on different satellites via different GSNBs, and load balancing between the cell-slots requires some user terminals to be transferred to the other GSNB.

Furthermore, mobility scenarios 6-9 occur due to the movement of mobile user terminals between cells. When a user terminal moves into a different cell, it signals the ground network, which then triggers a specific handover procedure depending on the applicable mobility case. In scenario 6, a user terminal moves into its neighboring cell and the new cell may be served by the same satellite and may be part of the same tracking Area (group of cells served by the same logical gNB). In this case, the anchor processor performs the reconfiguration using radio access network (RAN)-level RRC procedures and without involving the 5GC. In scenario 7, the serving satellite may be changed. The RRC reconfiguration procedures are also similar. In both these cases, the anchor processor remains the same, and therefore the data traffic forwarding point in the 5GC and the ground network may not be changed. The user terminal does not use the RACH procedure to access the system after handover. The only interruption in service may be during the user terminal repointing to the new satellite (scenario 7), physical layer reconfiguration, and acquisition of the new frequency-slot (<<20 ms).

Figure 32A:
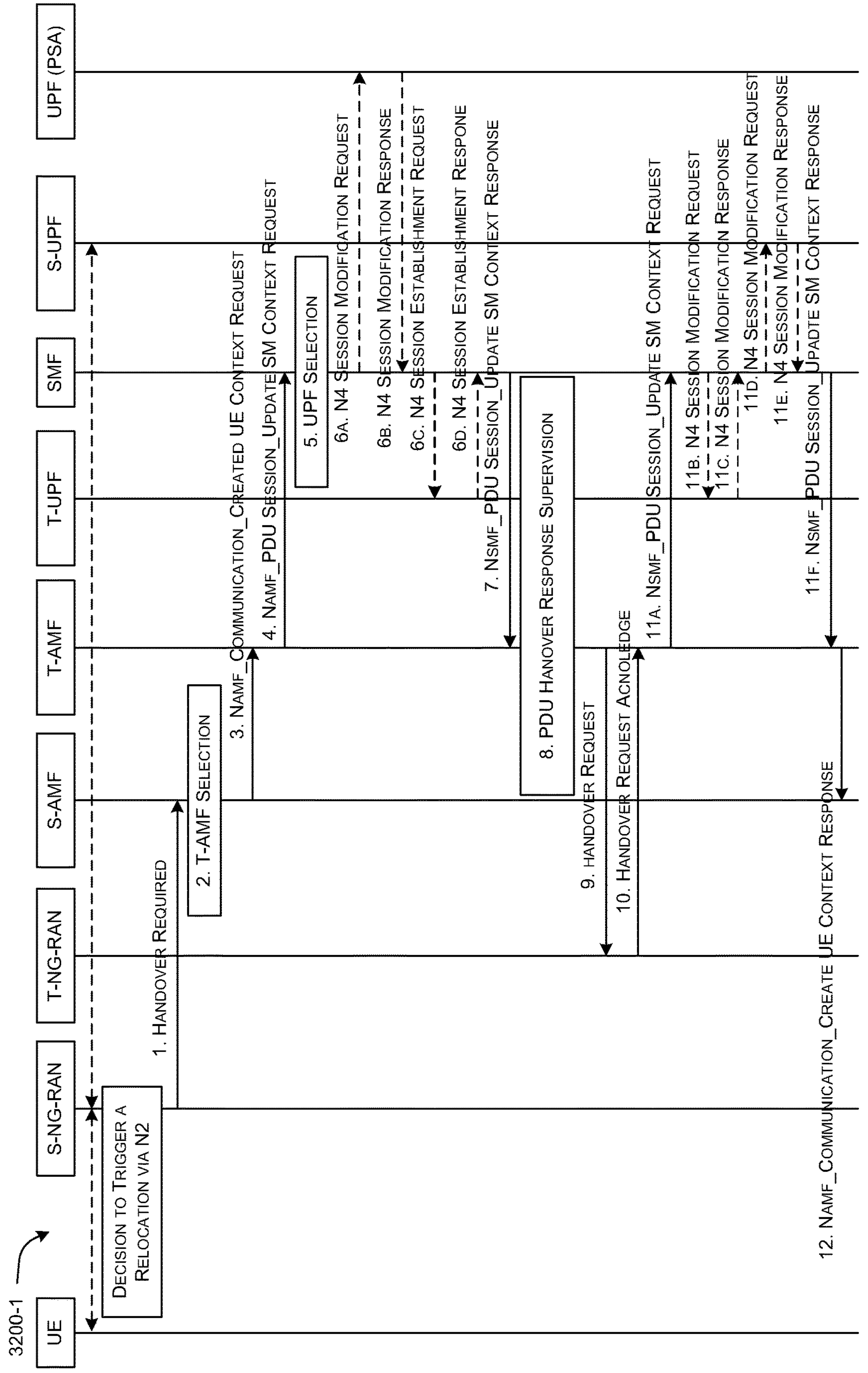
FIGS. 32A-32B illustrate example representations for preparation phase and execution phase of 5G core (5GC) based handover, respectively.
Figure 32B:
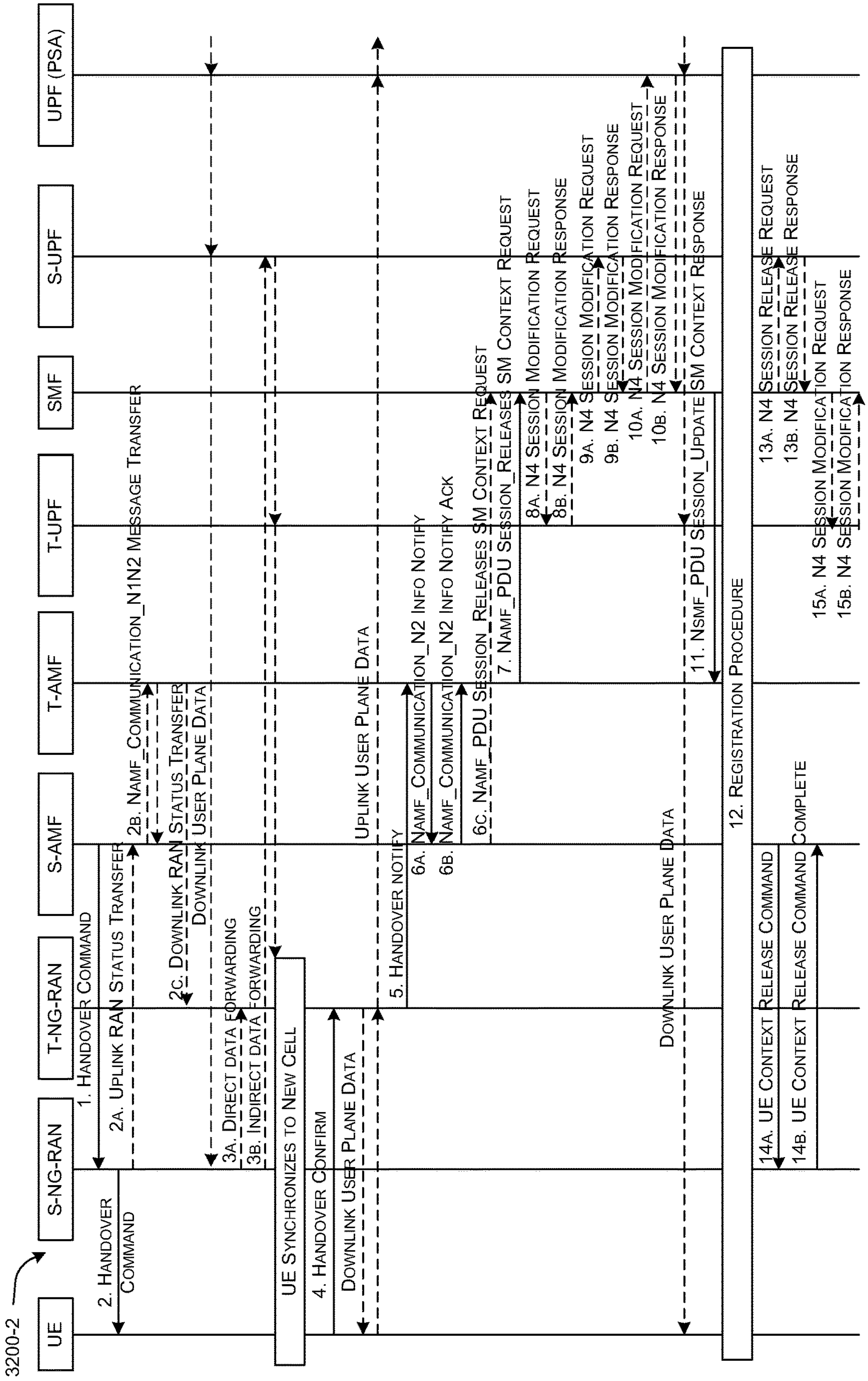

FIGS. 32A-32B illustrate example representations (3200-1, 3200-2) for preparation phase and execution phase of 5GC based handover, respectively.

In an example, user mobility between cells may invoke standard 5GC handover procedures if the user moves between areas served by different anchor processors or PoPs. Scenarios 8 and 9 are examples of such scenarios, where the 5GC handover procedures described in 3GPP 23.502 section 4.9.1 may be used to relocate the user terminal context to a different anchor processor. In these cases, the user terminal does need to use a RACH procedure to access the new cell, but the interruption may be minimized by the use of non-contention RACH opportunities. Assuming the beam-hopping cycle duration for inactive cells may be suitably configured, it may be possible for the user terminal to access the new cell in 20 ms using a pre-allocated opportunity in the next access cycle and complete its handover procedure.

Whether a user terminal is camped on a cell frequency slot (CFS) in idle state or is connected to the network, the user terminal may be aware of the current cell it is located in due to system information it may receive in the CFS. A moving user terminal reports its current location to the ground network through RRC procedures periodically and/or based on a movement threshold criterion. In an example, when the user terminal is in idle mode, the ground network tracks its current cell location in order to contact it later using RAN-based paging. In an example, when the user terminal is in connected mode, the reported cell location may be used by the ground network to trigger the appropriate handover procedure.

Figure 33:
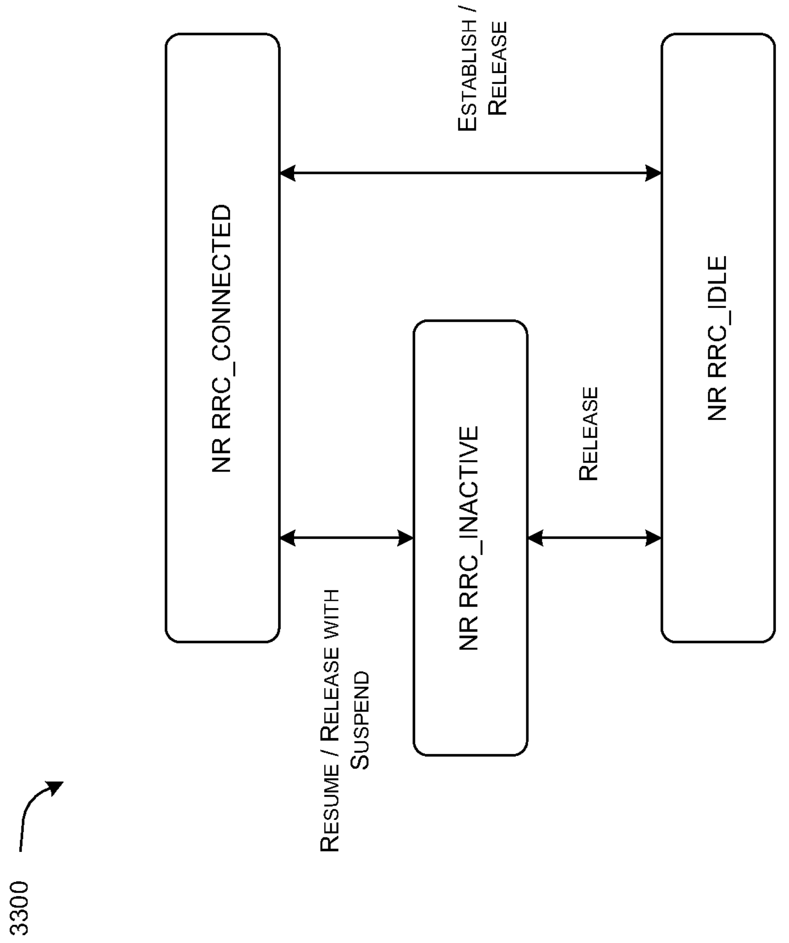
FIG. 33 illustrates an example representation of RRC states.

FIG. 33 illustrates an example representation 3300 of RRC states.

The ground network may track the user terminal's cell location by means of location reports. Based on configurable inactivity criteria, the ground network may suspend the user terminal's RRC connection and move the user terminal to RRC Inactive state in the ground network while it remains CM_Connected in the AMF. In this state, the ground network may maintains the user terminal's RRC context and may resume it through RAN-based paging when a trigger from the 5GC may be received as long as it remains within a group of cells served by the same anchor processor. This may be more efficient than 5GC-based paging because the user terminal may be paged at the cell level, using fewer resources.

In RAN-based paging, the ground network implements paging dilation. This involves paging only in the target cell or TAC initially, but in the event of no response being received, expanding the paging to additional surrounding cells. When a user terminal's RRC context is released, it enters RRC idle state. In this state, the user terminal reports its current TAC to the 5GC, and paging may be handled by the 5G core network, normally at the TAC level (i.e. in all the cells of the tracking area). However, even in 5GC-based paging, the ground network supports optimized cell-level paging based on optional 5G-defined paging assistance information such as paging attempt information and recommended cells and RAN nodes for paging as described in 3GPP TS 38.300. If the 5GC AMF supports paging assistance information, the ground network may use it to implement targeted cell-level paging.

Routing Layer

Figure 34A:
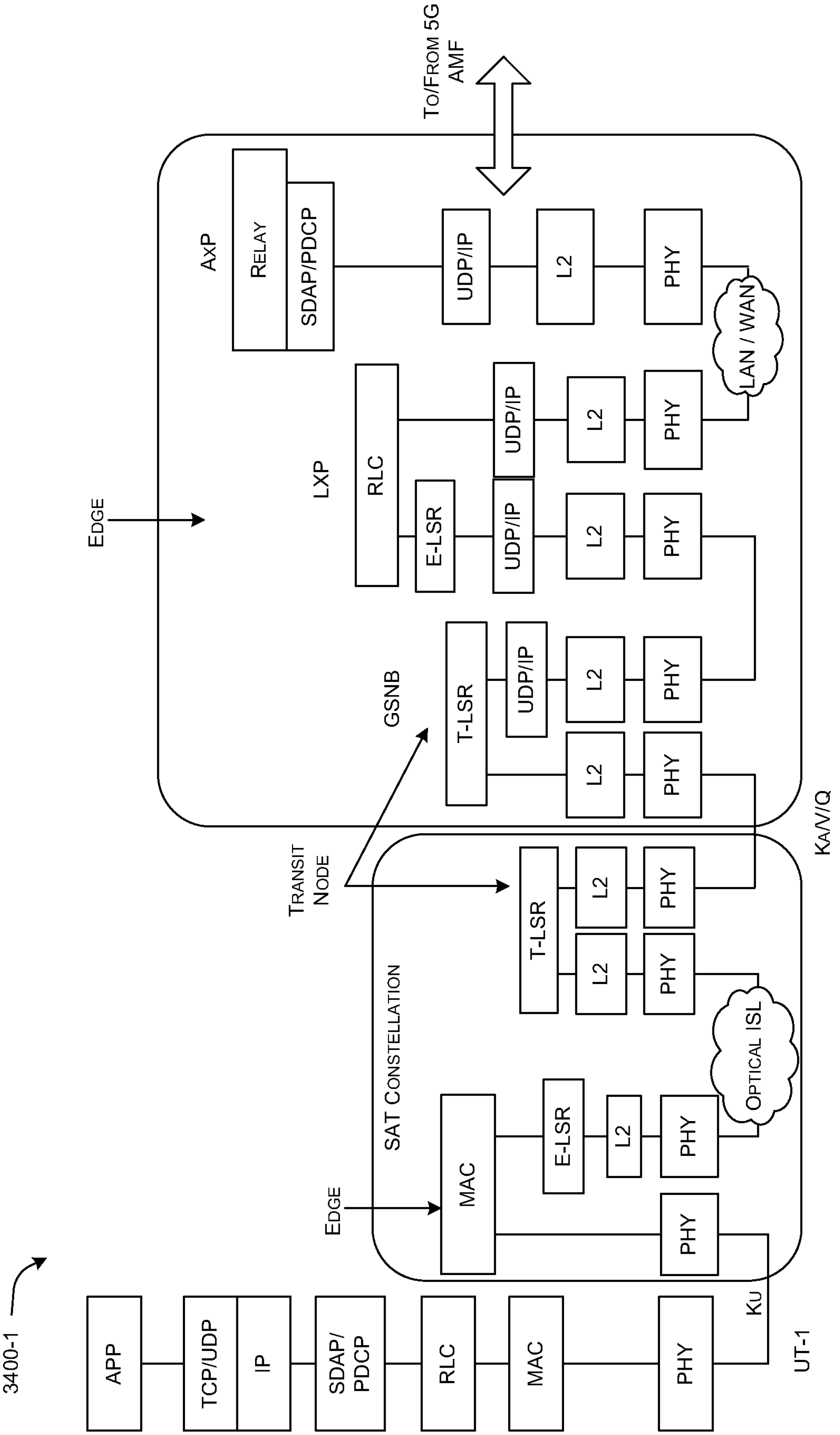
FIGS. 34A-34C illustrate example representations for routing in user plane stack, end-to-end control plane stack, and satellite to ground network control plane stack, respectively.
Figure 34B:
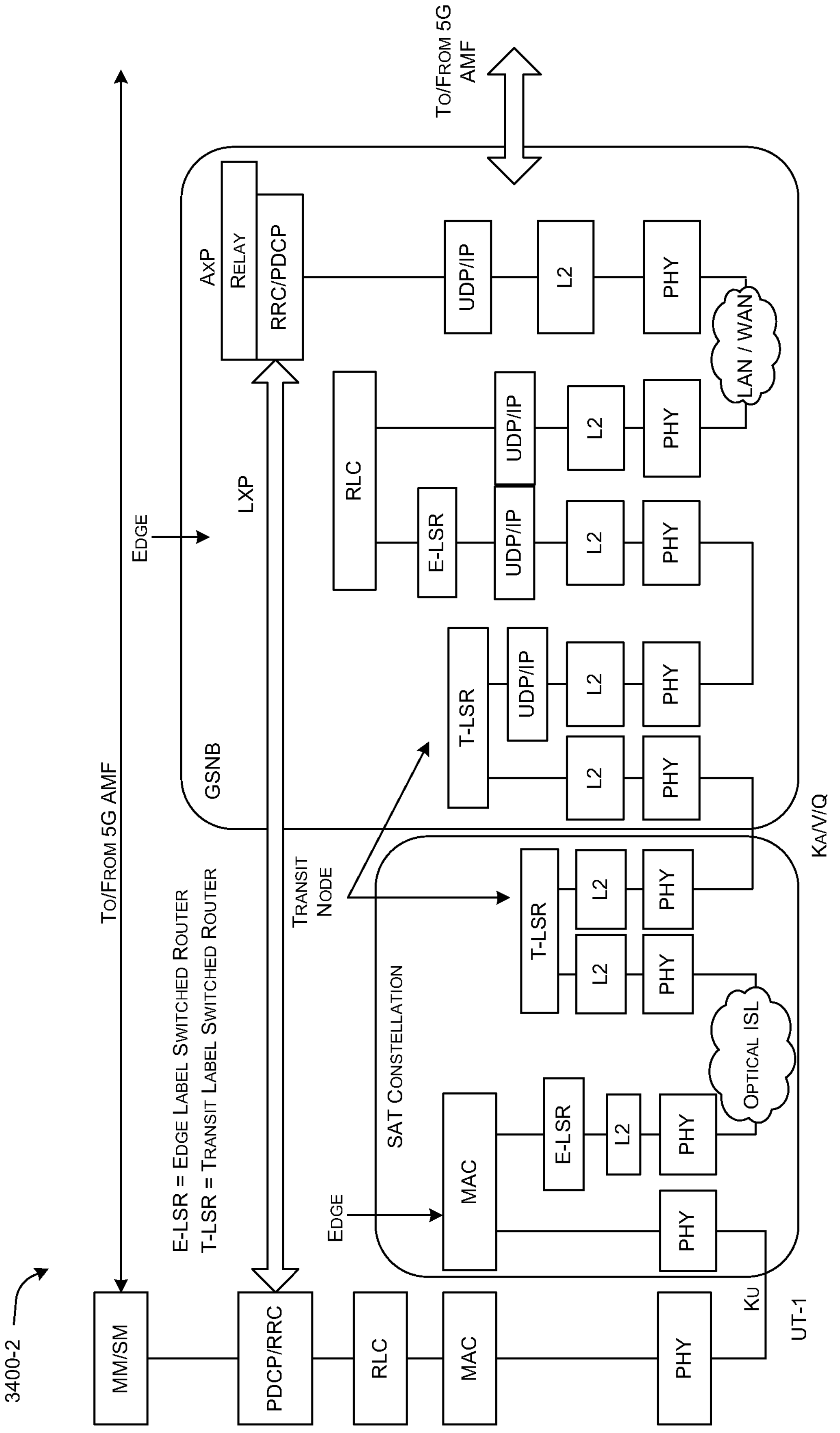
Figure 34C:
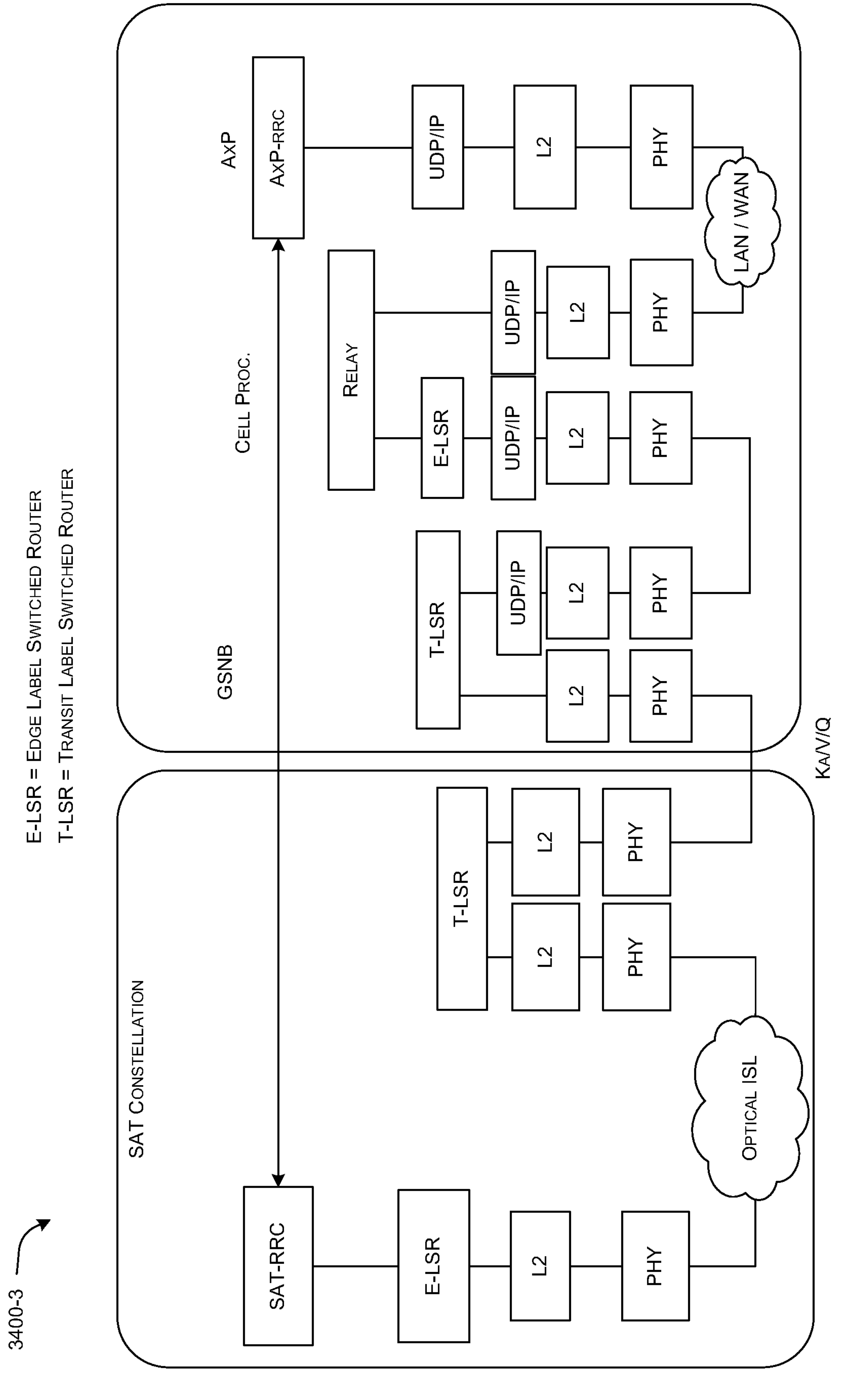

FIGS. 34A-34C illustrate example representations (3400-1, 3400-2, 3400-3) for routing in user plane stack, end-to-end control plane stack, and satellite to ground network control plane stack, respectively.

The label-switched routing cloud may interconnect satellites with GSNB nodes (SAPs, LXPs, cell processors, etc.) through label-switched paths (LSPs). LSPs are like virtual circuits that connect one node in the cloud with another. The endpoints of the LSPs are edge label-switched routers (E-LSRs) and the intermediate nodes through which an LSP path passes are transit label-switched routers (T-LSRs).

As shown in FIG. 34C the control function in the anchor processor may also communicate with a corresponding cell-specific control function in the payload by means of a proxy/relay function located in the cell processor in the GSNB. The cell processor may be an E-LSR and therefore may be able to route communications between the anchor processor and the satellite over the label-switched cloud. The anchor processor may be unaware of routing changes within the cloud.

The routing layer may have a data plane and a control plane component. The data plane component functions are described herein, which include, but are not limited to, performing label-based routing of data packets received on an input interface based on a label stack in the header of each packet by consulting a label-based routing table. Based on the labels, the label stack may be modified, and the packet may then be switched on an output interface as dictated by the routing table. The routing table may also dictate that special actions be taken in certain cases, such as selecting a fallback path or load balancing across a set of aggregated interfaces. For packets received/delivered on an access or edge interface, a label attachment/detachment (LAD) function may be performed. Label attachment may consist of adding one or more labels based on the contents of specific routing destination and class selector fields in the packet's routing header. Label detachment may be done prior to delivering the packet to client application and may consist of removing the labels.

Further, the control plane component of the routing layer may be responsible for maintaining the routing table used by the label-switched router. Unlike in MPLS, the calculation of label-switched routes in the proposed routing may be performed by the RDF, as discussed above.

Figure 35:
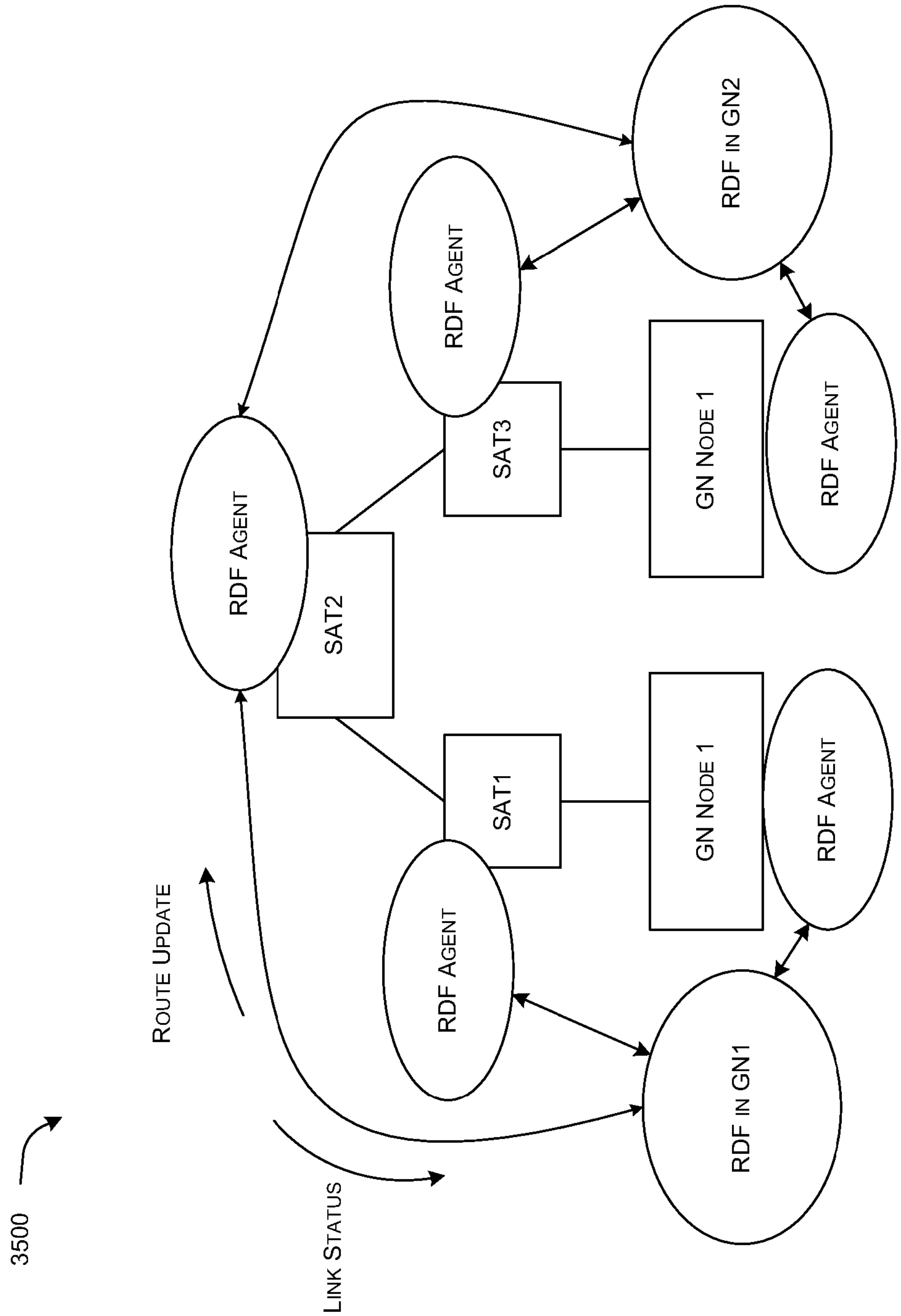
FIG. 35 illustrates an example representation of RDF and RDF agents.

FIG. 35 illustrates an example representation 3500 of RDF and RDF agents.

Referring to FIG. 35, each ground network may have an RDF module. Each node supporting the proposed routing may have an RDF agent that maintains contact with an RDF in order to receive routing table updates and feedback current link status.

The RDF creates the required LSPs based on the known types of inter-node communication required for the air interface. Ground network-satellite LSPs may be needed to support the user plane and data plane air interface. Accordingly, these may be created in advance based on known configuration of cell-ground network and cell-satellite associations provided by the GNOC. Further, satellite-satellite LSPs may be occasionally needed to support direct user terminal to user terminal communication. These may be created on demand when user terminals register for user terminal to user terminal communication. Furthermore, multiple LSPs may be needed between the same pair of destinations to support different classes of traffic (for example, delay-sensitive versus bulk). The RDF may use different metrics to compute optimal routes for the LSPs of the different traffic classes (for example, latency versus capacity).

The RDF may support generation of routes for additional LSPs that may be needed on demand. To this end, the RDF may provide a signaling interface to add and remove LSPs dynamically. The primary use for this feature may be to add satellite-satellite LSPs to support direct user terminal to user terminal communication. The dynamic interface may be invoked by the RRC layer as a part of provisioning a user terminal to user terminal bearer after the appropriate authentication with the 5G core network may be done and the corresponding (dummy) PDP session may have been established. Conversely, RRC may tear down on-demand LSPs and their routes when the user terminal to user terminal PDU session may be released or the user terminal may be disconnected.

The RDF may determine label-switched routes for the LSPs primarily based on the schedules of feeder link contacts and optical ISL contacts generated by the GNOC resource planning function. The routes in the proposed routing table are time-restricted because all the links are temporary. Thus, the routes for any LSP are necessarily changing over time and the routing table contains both current and future routes for the same LSP. FIG. 36 illustrates an example representation 3600 of a routing table generated by the RDF.

All the nodes supporting the proposed routing may be assigned globally unique destination addresses based on node type (for example, satellite, ground node, etc.). This may be a simple, fixed-size address that makes it easy to look up the mapping table and find the corresponding LSPs and labels. In user terminal to ground node communication, the ground node may provide the user terminal with the necessary routing information to prepend to the message so that the receiving satellite (ingress router) may quickly map it to the corresponding LSP and label. The routing information identifies the destination GSNB and end node. In direct user terminal to user terminal communication, the ground node, when setting up the user terminal to user terminal session, may provide the necessary routing information identifying the current serving satellite and cell of the peer user terminal. The receiving satellite serving the originating user terminal may then map this to the corresponding satellite-satellite LSP, which may have previously been set up by the RDF's routing table updates. When the serving satellite of either peer user terminal changes, the ground node may update the user terminal to user terminal routing information through RRC-level handover procedures.

Further, the RDF module may be distributed across different ground nodes. Each ground node may have an RDF that may be responsible for calculating the routes for a subset of the LSPs in the system. This subset may be based on a natural division of responsibility, such as the ground node-satellite LSPs terminating in that ground node and satellite-satellite LSPs requested by user terminals communicating with that RDF. RDFs in the different ground nodes also communicate with each other to coordinate route and link information.

Figure 37:
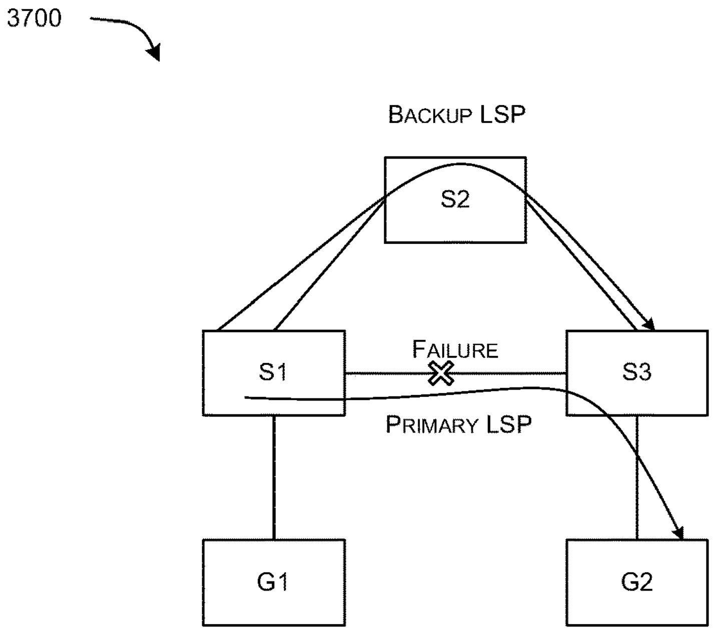
FIG. 37 illustrates an example representation of rerouting using a backup label switched path.

FIG. 37 illustrates an example representation 3700 of rerouting using a backup label switched path.

In an example, all initial LSP routes may be determined by the RDF from feeder link and optical ISL schedules. However, the RDF may also account for unexpected link outage and restoration events. RDF agents in the satellite and ground network nodes convey link outage and restoration events to their RDF so that it may recalculate affected routes. Events are appropriately thresholded to avoid route flapping and update storms.

In order to minimize packet loss due to failed links until the RDF may calculate and distribute new routes, the proposed system may also support fast rerouting for certain failures. For this, there may be backup routes in the routing table calculated in advance. A label switched router that finds a failed output interface may temporarily use the backup route until the RDF provides an updated primary route.

Figure 38:
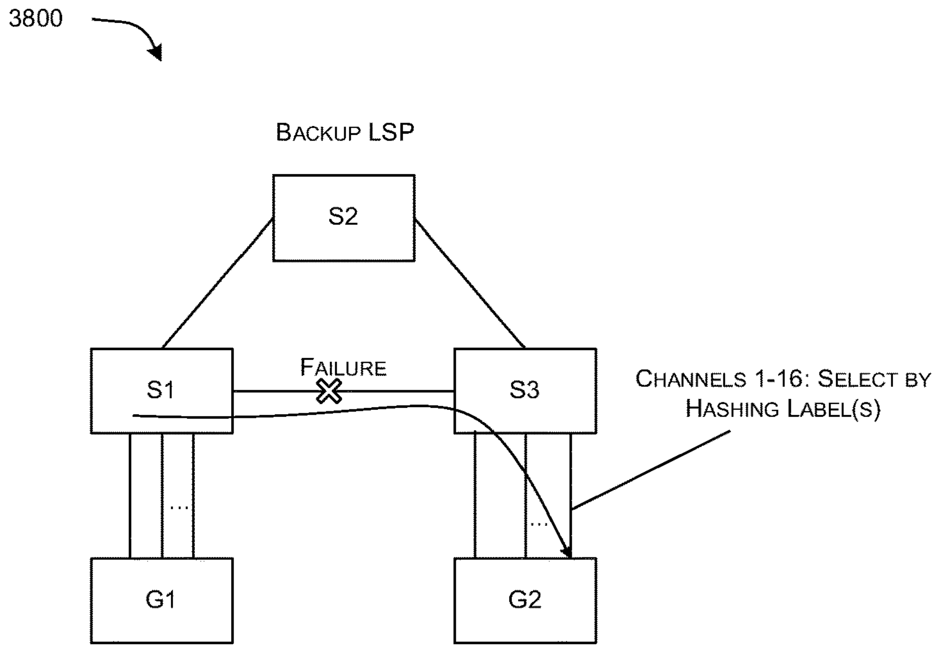
FIG. 38 illustrates an example representation of load balancing on a multi-link interface.

FIG. 38 illustrates an example representation 3800 of load balancing on a multi-link interface.

Feeder links may consist of a number of parallel communication channels (for example, 16×250 MHz channels for a Ka uplink) rather than a single point-to-point link. The routing layer handles such multilink output interfaces by using a load-balancing algorithm to select one of the links in the bundle for a specific packet.

In order to minimize out-of-order packets for a flow, the router hashes a suitable identifier provided by the sender (such as a user terminal temporary identifier) to select an available and in-service link. This way, most or all of the packets from a given flow may use the same link, while packets from different flows may be uniformly distributed over the available links. A weighted scheme may be used if the links in the bundle have unequal capacities. This load balancing scheme may also be fault-tolerant because upon the failure of a link, as the algorithm simply hashes to a different available link.

SDAP/PDCP Layer

Figure 39:
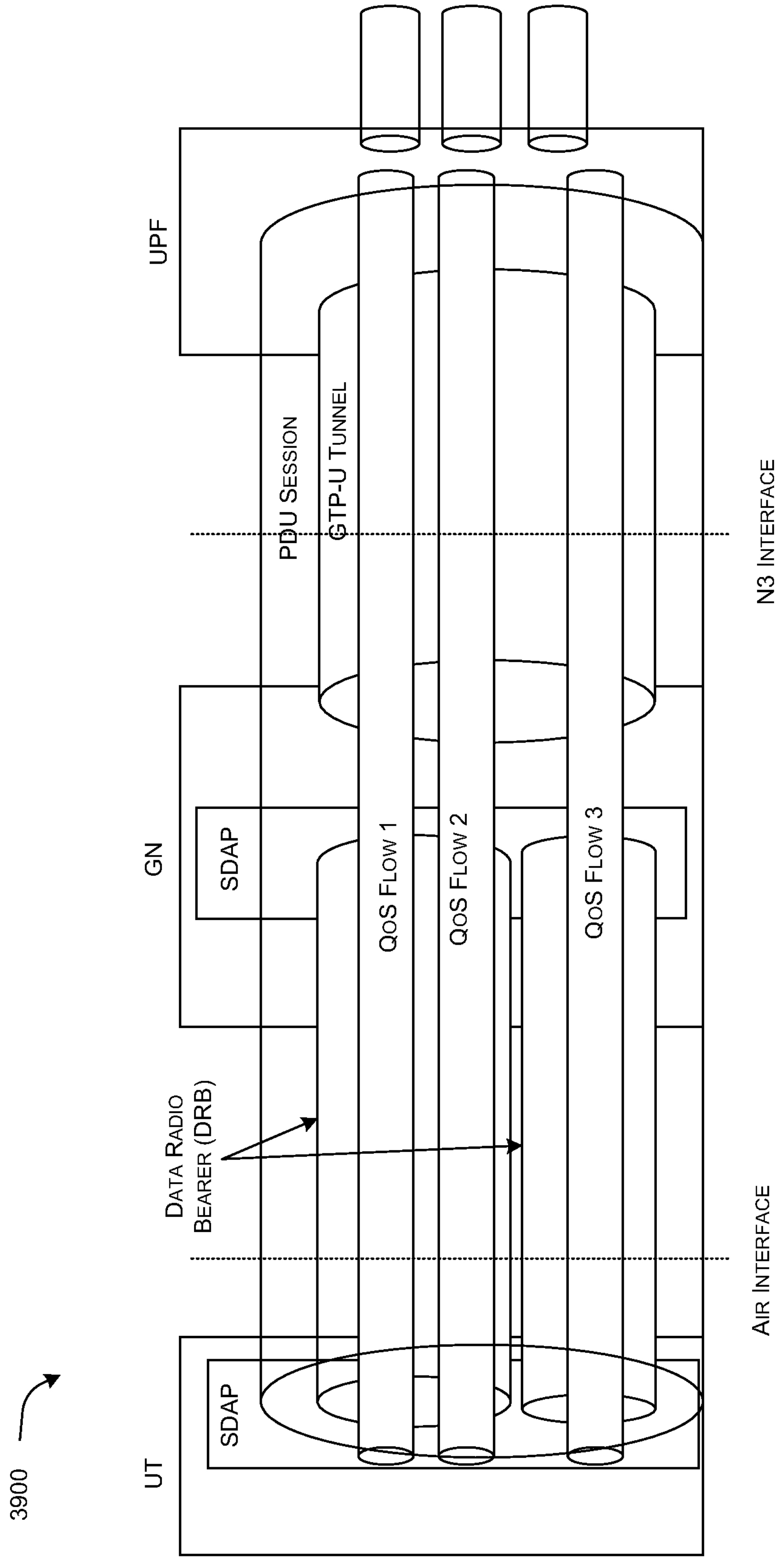
FIG. 39 illustrates an example representation of mapping 5G quality of service (QoS) flows to data radio bearer in service data adaptation protocol (SDAP) layer.

FIG. 39 illustrates an example representation 3900 of mapping 5G QoS flows to data radio bearer in SDAP.

In 5G network, the QoS flows in the network do not have one-to-one mapping with the radio bearers. 3GPP adds SDAP layer above the PDCP layer to map one or more QoS flows to the same data radio bearer (DRB) as shown in FIG. 39. In this example, QoS Flow 1 and QoS Flow 2 are mapped into the same DRB and QoS Flow 3 may be mapped into another DRB.

Figure 40:
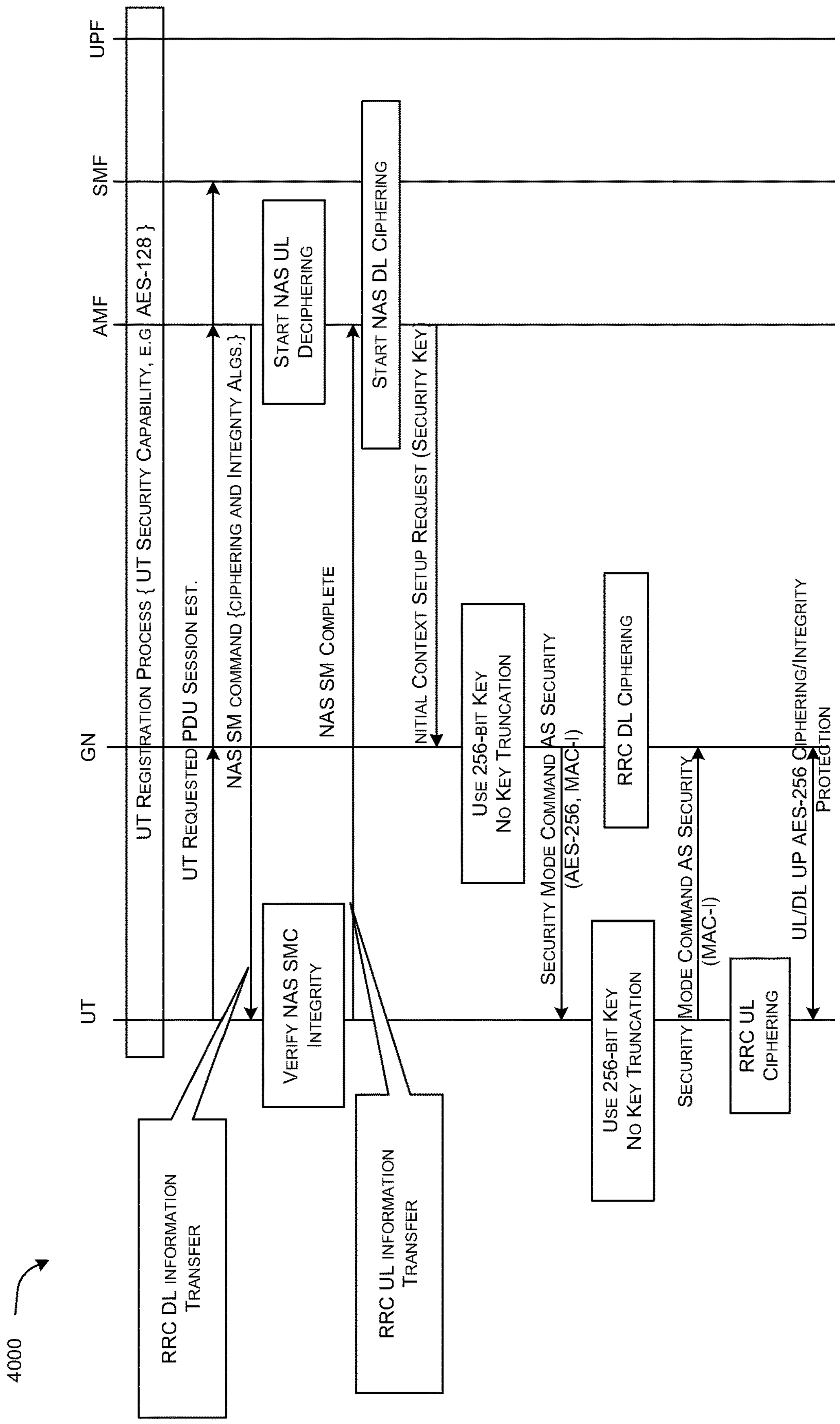
FIG. 40 illustrates an example representation for a change procedure from AES-128 to AES-256.

FIG. 40 illustrates an example representation 4000 for a change procedure from AES-128 to AES-256.

PDCP is a layer that provides service to the SDAP and RRC layers. PDCP provides transfer of user and control plane data, ciphering and integrity protection, and header compression. AES-256 may be used for access stratum ciphering and integrity protection. By using AES-256, user data may get a stronger protection compared to the standard 5G security protection. The AES-256 ciphering and integrity protection keys may be obtained from the key distribution from the 5GC. The ground network receives 256-bit ciphering key, KgNB, from the AMF. This key may be used to derive the ciphering and integrity protection keys as described in 3GPP TS 33.501.

The switching from AES-128 to AES-256 happens during the access stratum security command mode procedures, as depicted in FIG. 40. AES-256 counter mode may be used for the ciphering and AES-256 Cipher-Based Message Authentication Code (CMAC) mode may be used for the integrity protection.

The PDCP SN may be either 12 bits or 18 bits. The 18-bit sequence may be used for GEO compatibility of the air interface (required in RFI requirements). It may also be used when WAN delays are of the orders of hundreds of milliseconds. In an example, the maximum size of PDCP SDU may be 9000 bytes for both data and control. In order to prevent packet loss during handover, PDCP status reporting may be used.

Figure 41:
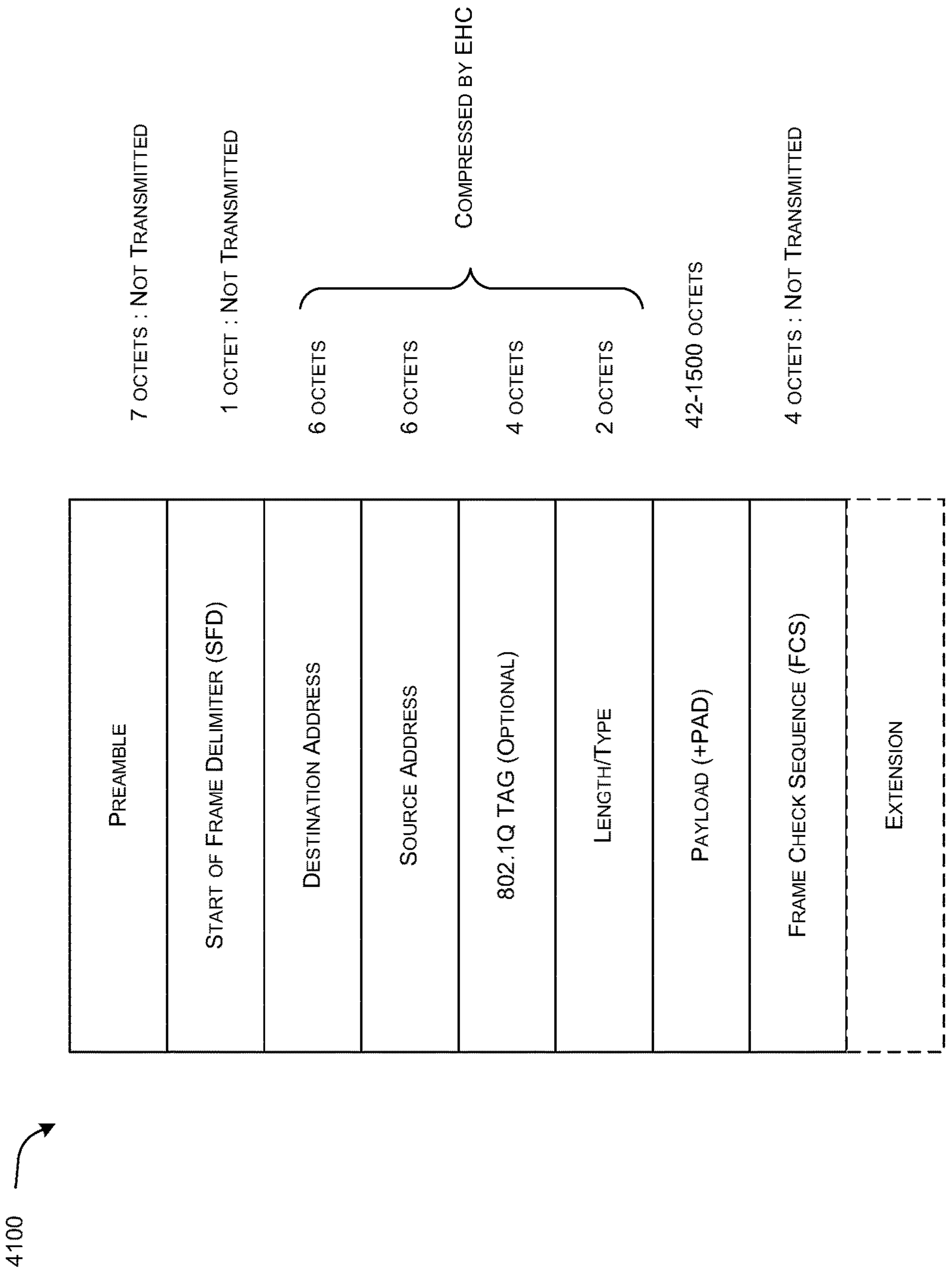
FIG. 41 illustrates an example representation of an Ethernet packet format.

FIG. 41 illustrates an example representation 4100 of an Ethernet packet format. For Ethernet type PDU session, PDCP provides Ethernet header compression (EHC) to compress the Ethernet header.

Table 10 shows PDCP supported header compression profiles.

TABLE 10

| Profile Identifier | Usage | Reference |
|---|---|---|
| 0x0000 | No compression | RFC 5795 |
| 0x0006 | TCP/IP | RFC 6846 |

TABLE 10-continued

| Profile Identifier | Usage | Reference |
| --- | --- | --- |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

Figure 42:
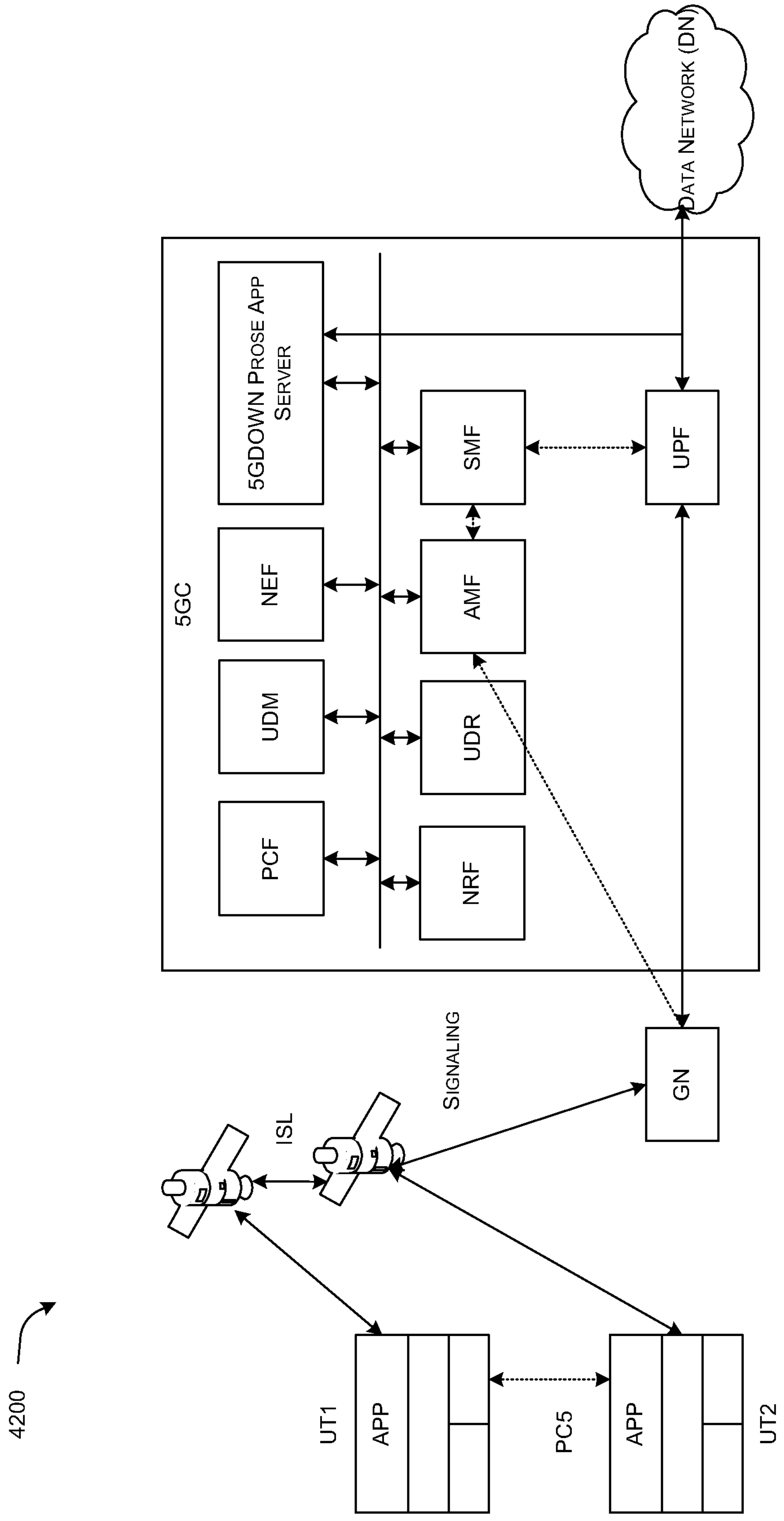
FIG. 42 illustrates an example representation of a network diagram with 5GC for user terminal to user terminal communication.

FIG. 42 illustrates an example representation 4200 of a network diagram with 5GC for user terminal to user terminal communication. FIG. 42 may correspond to FIG. 8.

As discussed above with reference to FIG. 8, the user terminals involved in direct user terminal to user terminal communication may be served by two different satellites. In such cases, ISLs will be used. The direct user terminal to user terminal connection may involve use of a proximity services (ProSe) application on the user terminal, user terminal registration with 5G core with an additional parameter indicating ProSe capability as described in 3GPP TS 23.304, establishment of a PDU session to obtain IP addresses, authorization from ProSe application server to establish direct user terminal to user terminal communication, discovery process for the two user terminals using (DDNMF) function in core network, paging the destination user terminal if it is in idle mode, obtaining response from destination user terminal for discovery request from originating user terminal, establishing routes using RDF, establishing a security association between the two user terminals directly after routes are established as described in 3GPP TS33.503, resume secure direct data transfer, but not limited to the like.

Figure 43:
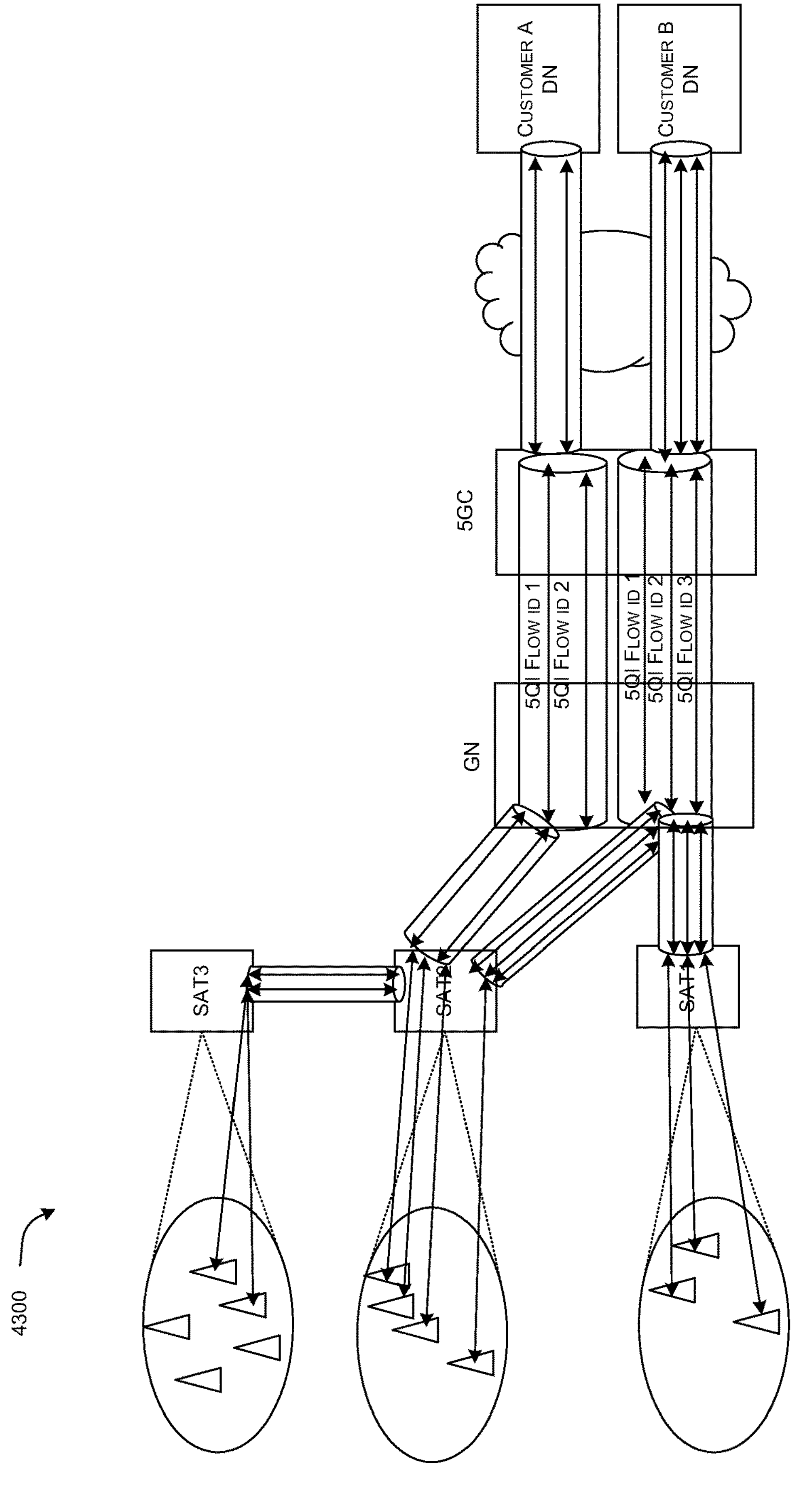
FIG. 43 illustrates an example representation of network slicing.

FIG. 43 illustrates an example representation 4300 of network slicing.

Network slicing is a mandatory 5G feature which allows the network resources to be dedicated to each slice. Inside each slice, the 5G QoS Indicator (5QI) may also be applied to different flows. Table 11 shows 3GPP standardized slice types. Slice service type (SST) may be 8-bit value where values 1-127 may be reserved for standardized slices, and values 128-256 may be for non-standardized SST. Each user terminal may have a maximum of eight slices.

TABLE 11

| Slice/Service Type | SST Value | Characteristics |
| --- | --- | --- |
| eMBB | 1 | Slice suitable for the handling of 5G enhanced Mobile Broadband |
| URLLC | 2 | Slice suitable for the handling of ultra-reliable low latency communications |
| MIoT | 3 | Slice suitable for the handle of massive IoT |
| V2X | 4 | Slice suitable for the handling of V2X services |
| HMTC | 5 | Slice suitable for the handling of High-Performance Machine-Type Communications |

In an example, network slices may need to be customized based on needs of different business cases such business-to-customer, military, governments, etc. To accommodate these cases, network slicing using non-standardized SST values are proposed. The representation 4300 shows network slicing using non-standardized SST values. The definition or the applications of non-standardized SST values may be defined according to the business cases.

Therefore, the proposed system provides at least an air interface based on 5G protocols with satellite specific enhancements at lower layers, low latency, standards based physical layer design on both user and feeder links, beam-hopping design that minimizes end-to-end delay, software defined networking for route management to minimize payload complexity, efficient flow control between ground network and satellite to minimize buffering requirements in satellite payload, differentiated quality of service, AES-256 encryption, TCP/UDP/IP and Ethernet header compression, advanced scheduler designs to cater to traffic types and full/half duplex terminals, end-to-end Layer 2 transport based on 3GPP standards, direct user terminal to user terminal communications, adaptive modulation and coding, delay efficient MAC layer protocol, scalable gateway, Ka and V/Q SAPs, user terminal based on mature software, and air interface compatibility with GEO.

Figure 44:
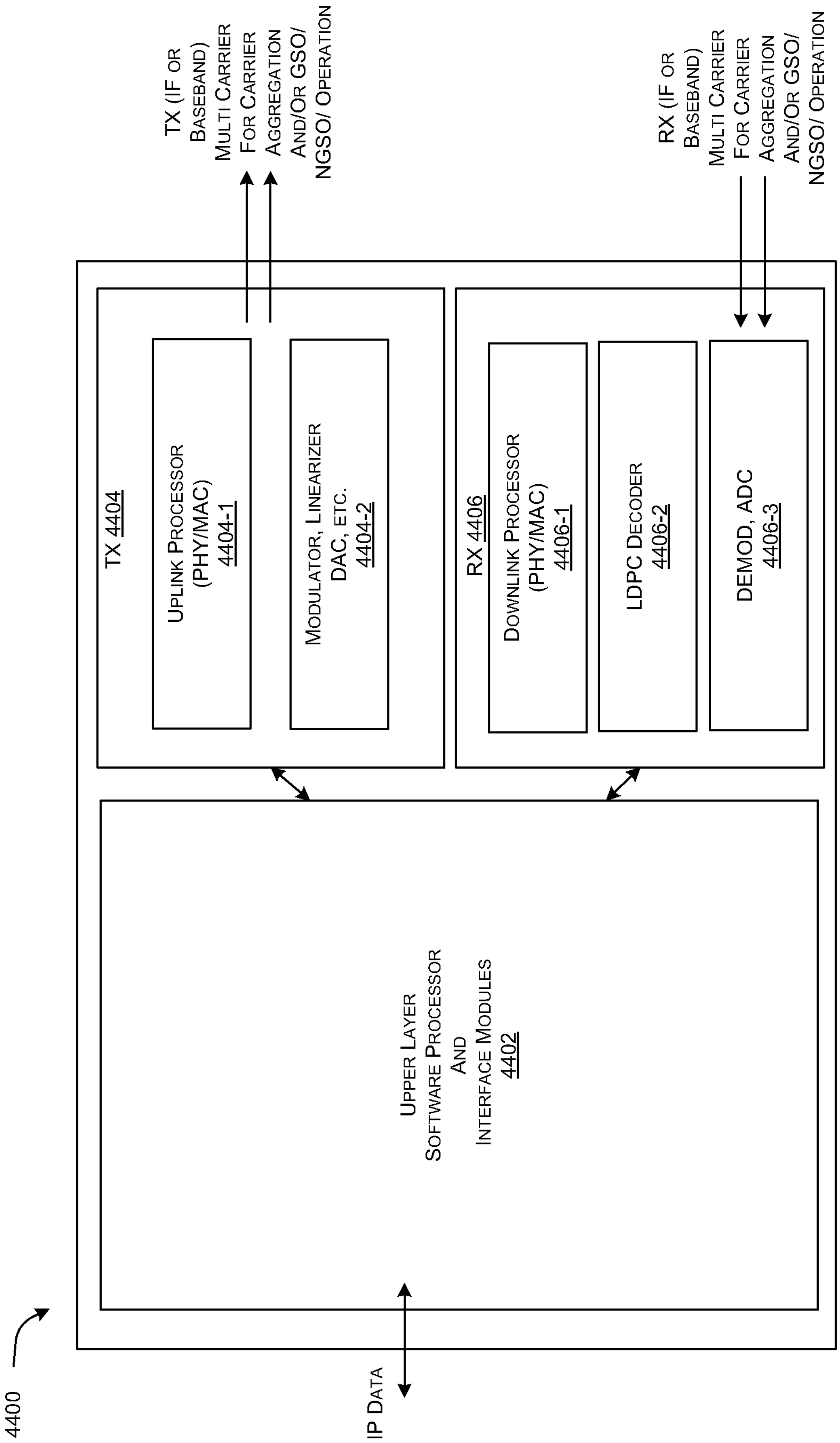
FIG. 44 illustrates an example block diagram of an application specific integrated circuit (ASIC) device with carrier integration.

FIG. 44 illustrates an example block diagram 4400 of an application specific integrated circuit (ASIC) device with carrier integration.

The proposed user terminal may be based on the ASIC depicted in FIG. 44. The ASIC device 4400 may integrate major functions including, but not limited to, satellite transmission layer modem functions, satellite transport layer packet processing functions, network layer IP applications, user interface functions, overall satellite operations (management and control), etc.

The ASIC may be implemented as a System-On-Chip (SoC) in standard cell ASIC technology targeting complementary metal-oxide semiconductor (CMOS) 28 nm process. The ASIC device 4400 may have 20 power domains to support low power consumption. The ASIC device 4400 may have an on-chip power sequencer that can be programmed to turn on-off the various power domains. As an example, the ASIC device 4400 may have a peak power dissipation of 8 W.

Referring to FIG. 44, the ASIC device 4400 may include upper layer software processor and interface modules 4402, a transmitter 4404, and a receiver 4406. The transmitter 4404 may include an uplink processor 4404-1 and other modules 4404-2 such as, but not limited to, modulator, digital to analog converter, etc. The receiver 4406 may include a downlink processor 4406-1, a low density parity check (LDPC) decoder 4406-2, and other modules 4406-3 such as, but not limited to, demodulator, analog to digital converter, etc.

The demodulator 4406-1 may also support two narrow band carriers for carrier aggregation, each of up to 500 MHz bandwidth. The demodulator 4406-1 may have an integrated baseband and IF ADC 4406-3 to support baseband and IF interface. The demodulator 4406-1 may support burst reception for beam hopping application. The demodulator 4406-1 may also process very low signal to noise ratio (VLSNR) frames to −10 dB SNR. The LDPC decoder 4406-2 may support layered belief decoding that may support throughput of 5 Gbps.

On return link, the ASIC device 4400 may support FEC encoding, interleaving, spectral spreading, baseband modulation, critical filtering, pre-distortion, burst formatting, and real time external analog transmit control. The ASIC device 4400 may support both multi-frequency-time division multiple access (MF-TDMA) for burst transmission and time division multiplexing (TDM) for continuous transmission. MF-TDMA may support modulation schemes up to 32 APSK with LDPC FEC codes. TDMA access may support automatic coding and modulation (ACM) on return link. TDM modulator 4404-2 may support modulation up to 64 APSK and symbol rates up to 400 Msps.

Referring to FIG. 44, the software processor 4402 may be based on multi-core processor and responsible for upper layers of the protocol. Further, the same ASIC may be used for GEO compatibility as well.

Figure 45:
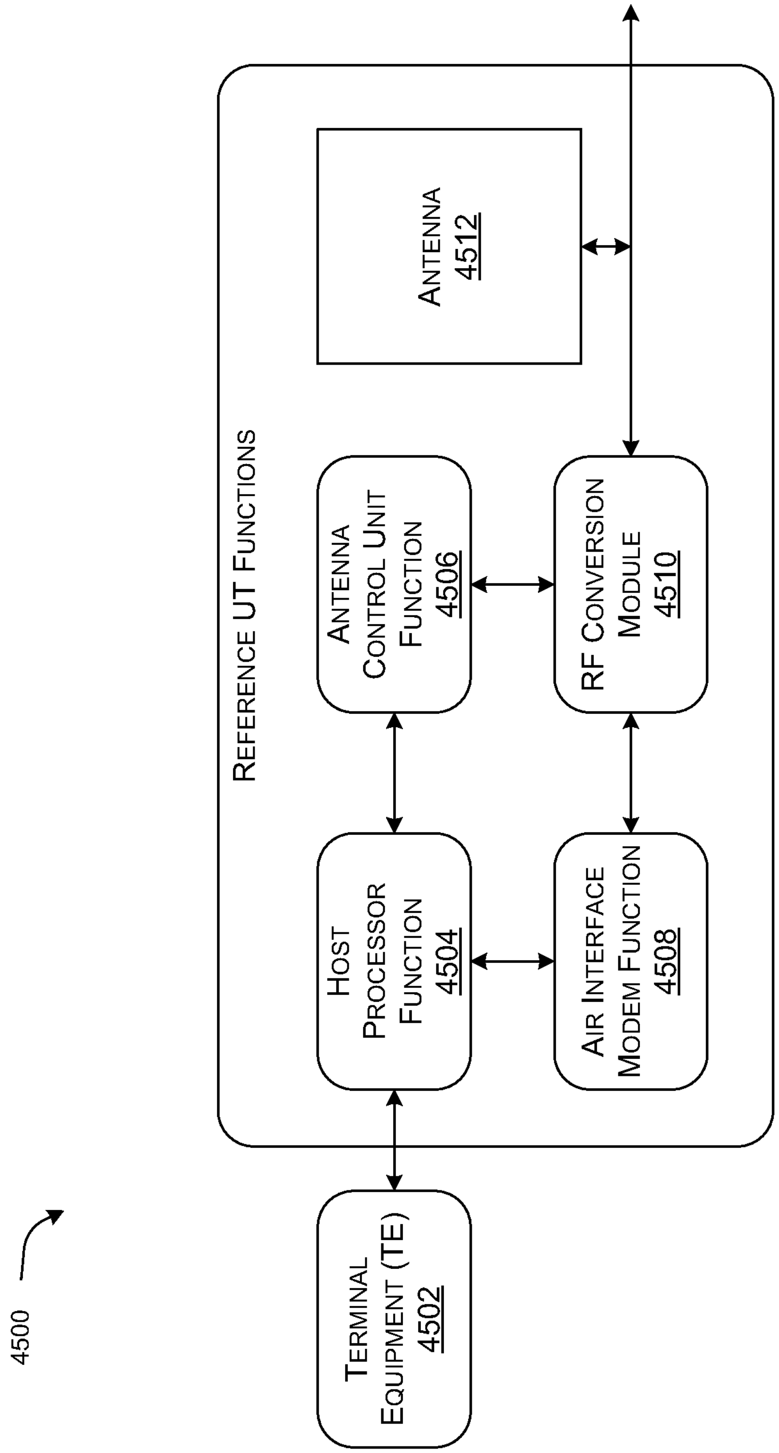
FIG. 45 illustrates an example representation of reference user terminal functions.

FIG. 45 illustrates an example representation 4500 of reference user terminal functions. The user terminal functions may be implemented using the ASIC device 4400 depicted in FIG. 44. In particular, the user terminal may be attached to a terminal equipment 4502. Further, the user terminal may include a host processor function 4504, an antenna control unit function 4506, an air interface modem function 4508, an RF conversion module 4510, and an antenna 4512. These user terminal functions may facilitate communication from the user terminal to a core network through a satellite network, as explained above.

Figure 46:
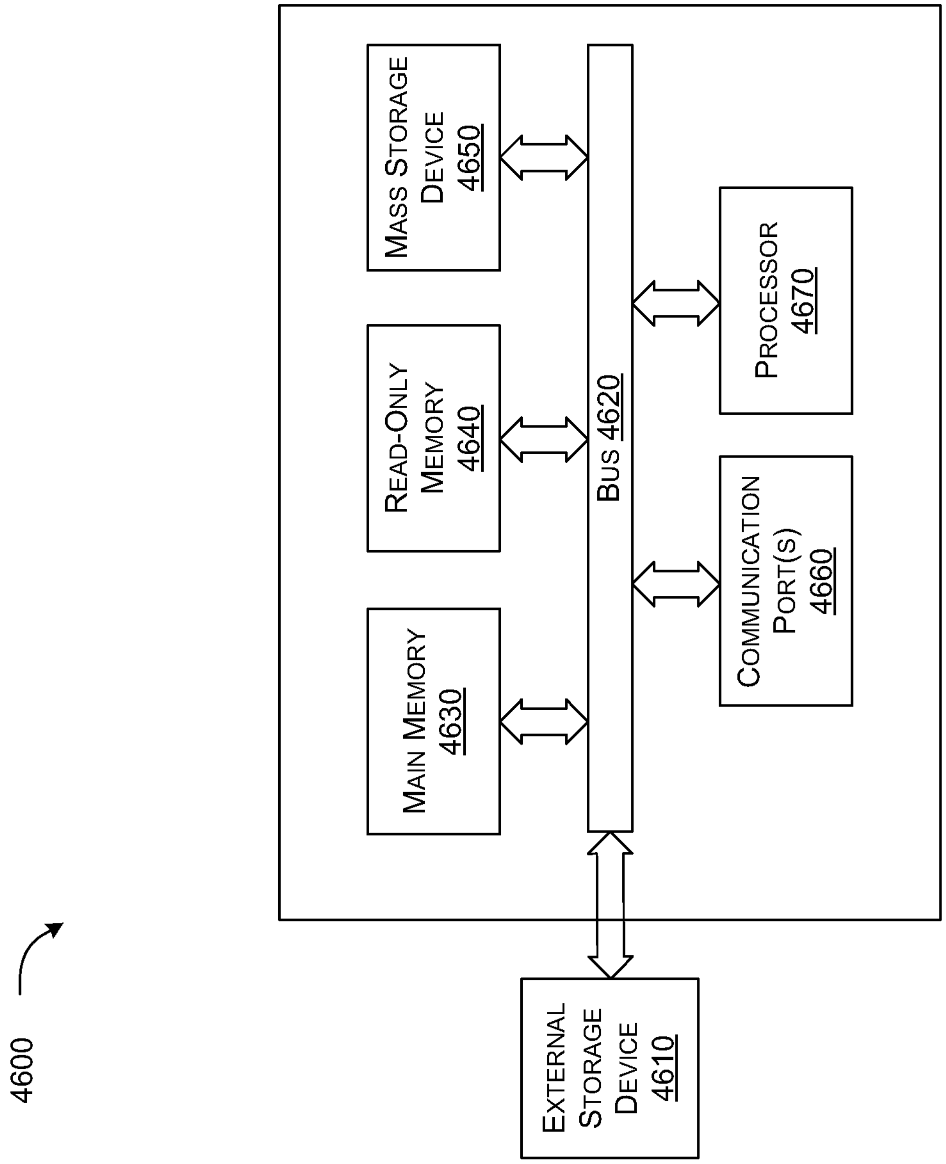
FIG. 46 illustrates a computer system in which or with which embodiments of the present system may be implemented.

FIG. 46 illustrates a computer system 4600 in which or with which embodiments of the present system may be implemented.

Referring to FIG. 46, the computer system 4600 may include an external storage device 4610, a bus 4620, a main memory 4630, a read-only memory 4640, a mass storage device 4650, communication port(s) 4660, and a processor 4670. A person skilled in the art will appreciate that the computer system 4600 may include more than one processor and communication ports. The communication port(s) 4660 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 4660 may be chosen depending on a network, such a Local Area Network (LAN), Wide Area Network (WAN), or any network to which the computer system 4600 connects. The main memory 4630 may be random access memory (RAM), or any other dynamic storage device commonly known in the art. The read-only memory 4640 may be any static storage device(s) including, but not limited to, a Programmable Read Only Memory (PROM) chips for storing static information e.g., start-up or basic input/output system (BIOS) instructions for the processor 4670. The mass storage device 4650 may be any current or future mass storage solution, which may be used to store information and/or instructions. The bus 4620 communicatively couples the processor 4670 with the other memory, storage, and communication blocks. The bus 4620 may be, e.g. a Peripheral Component Interconnect (PCI)/PCI Extended (PCI-X) bus, Small Computer System Interface (SCSI), universal serial bus (USB), etc., for connecting expansion cards, drives, and other subsystems as well as other buses, such a front side bus (FSB), which connects the processor 4670 to the computer system 4600. Optionally, operator and administrative interfaces, e.g. a display, keyboard, and a cursor control device, may also be coupled to the bus 4620 to support direct operator interaction with the computer system 4600. Other operator and administrative interfaces may be provided through network connections connected through the communication port(s) 4660. In no way should the aforementioned exemplary computer system 4600 limit the scope of the present disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A communication device, comprising:

a processor; and a memory coupled to the processor, the memory comprising processor-executable instructions to cause the communication device to:

obtain, via a control plane layer, system information block (SIB) of a source satellite in a satellite network;

receive, via the control plane layer, a radio resource control (RRC) message on a random access channel (RACH) from a user device based on a schedule defined in the SIB, wherein the RRC message comprises a label including information of a destination satellite in the satellite network;

transmit, via a route management plane layer, information corresponding to inter-satellite links in the satellite network to a Route Determination Function (RDF) module in a ground network, wherein the RDF module is to compute a plurality of time-restricted label-switched paths based on satellite ephemeris and inter-satellite link status;

receive, via the route management plane layer, a routing table of the inter-satellite links from the RDF module based on the transmitted information;

determine an intermediate satellite in the satellite network based on the RRC message and the received routing table;

transmit, via the route management plane layer, the RRC message to the destination satellite through the intermediate satellite using the plurality of time-restricted label-switched paths; and establish, via a user plane layer, a connection between the user device and the ground network through the destination satellite.

2. The communication device of claim 1, wherein the SIB includes at least one of:

gateway identifier (ID), feeder link ID, and satellite ID.

3. The communication device of claim 1, wherein the ground network includes at least a Ground System Node-B (GSNB), an anchor processor (AxP), and a route determination function (RDF) module.

4. The communication device of claim 3, wherein the communication device is to communicate via the control plane layer by using at least:

an RRC layer between the user device and the AxP in the ground network;

a packet data convergence protocol (PDCP) layer between the user device and the AxP in the ground network;

a radio link control (RLC) layer between the user device and the AxP in the ground network; and a physical (PHY)/medium access control (MAC) layer between the user device and user-link satellite in the satellite network.

5. The communication device of claim 1, wherein the label includes a satellite identifier (ID) and a feeder link ID for the destination satellite, a satellite ID of the source satellite, and a cell ID, and wherein the cell ID includes a Cell Radio Network Temporary ID.

6. The communication device of claim 1, wherein the communication device is to determine the intermediate satellite based on a routing table of inter-satellite links maintained by each satellite in the satellite network.

7. The communication device of claim 1, wherein the communication device is to communicate via the user plane layer by using at least:

a physical (PHY)/medium access control (MAC) layer between the user device and user-link satellite in the satellite network;

a radio link control (RLC) layer between the user device and a Ground System Node-B (GSNB) in the ground network; and a packet data convergence protocol (PDCP)/service data adaptation protocol (SDAP) layer between the user device and an anchor processor (AxP) in the ground network.

8. A method, comprising:

obtaining, by a processor, via a control plane layer, system information block (SIB) of a source satellite in a satellite network;

receiving, by the processor, via the control plane layer, a radio resource control (RRC) message on a random access channel (RACH) from a user device based on a schedule defined in the SIB, wherein the RRC message comprises a label including information of a destination satellite in the satellite network;

transmitting, by the processor, information corresponding to inter-satellite links in the satellite network to a Route Determination Function (RDF) module in a ground network via a route management plane layer between the satellite network and the RDF, wherein the RDF module is to compute a plurality of time-restricted label-switched paths based on satellite ephemeris and inter-satellite link status;

receiving, by the processor, via the route management plane layer, a routing table of the inter-satellite links from the RDF module based on the transmitted information;

determining, by the processor, an intermediate satellite in the satellite network based on the RRC message and the received routing table;

transmitting, by the processor, via the route management plane layer, the RRC message to the destination satellite through the intermediate satellite using the plurality of time-restricted label-switched paths; and establishing, by the processor, via a user plane layer, a connection between the user device and the ground network through the destination satellite.

9. The method of claim 8, wherein the SIB includes at least one of: gateway identifier (ID), feeder link ID, and satellite ID.

10. The method of claim 8, wherein the ground network includes at least a Ground System Node-B (GSNB), an anchor processor (AxP), and a route determination function (RDF) module.

11. The method of claim 10, comprising communicating, by the processor, via the control plane layer, by using at least:

an RRC layer between the user device and the AxP in the ground network;

a packet data convergence protocol (PDCP) layer between the user device and the AxP in the ground network;

a radio link control (RLC) layer between the user device and the AxP in the ground network; and a physical (PHY)/medium access control (MAC) layer between the user device and user-link satellite in the satellite network.

12. The method of claim 8, wherein the label includes a satellite identifier (ID) and a feeder link ID for the destination satellite, a satellite ID of the source satellite, and a cell ID, and wherein the cell ID comprises a Cell Radio Network Temporary ID.

13. The method of claim 8, comprising determining, by the processor, the intermediate satellite based on a routing table of inter-satellite links maintained by each satellite in the satellite network.

14. The method of claim 8, comprising communicating, by the processor, via the user plane layer, by using at least:

a physical (PHY)/medium access control (MAC) layer between the user device and user-link satellite in the satellite network;

a radio link control (RLC) layer between the user device and a Ground System Node-B (GSNB) in the ground network; and a packet data convergence protocol (PDCP)/service data adaptation protocol (SDAP) layer between the user device and an anchor processor (AxP) in the ground network.

15. A non-transitory computer readable medium comprising processor- executable instructions that causes a processor to:

obtain, via a control plane layer, system information block (SIB) of a source satellite in a satellite network;

transmit the SIB to a cell serving a user device based on a schedule defined in the SIB;

receive, via the control plane layer, a radio resource control (RRC) message on a random access channel (RACH) from the user device based on the schedule, wherein the RRC message comprises a label including information of a destination satellite in the satellite network;

transmit, via a route management plane layer, information corresponding to inter-satellite links in the satellite network to a Route Determination Function (RDF) module in a ground network, wherein the RDF module is to compute a plurality of time-restricted label-switched paths based on satellite ephemeris and inter-satellite link status;

receive, via the route management plane layer, a routing table of the inter-satellite links from the RDF module based on the transmitted information;

determine an intermediate satellite in the satellite network based on the RRC message and the received routing table;

transmit, via the route management plane layer, the RRC message to the destination satellite through the intermediate satellite using the plurality of time-restricted label-switched paths; and establish, via a user plane layer, a connection between the user device and the ground network through the destination satellite.

16. The non-transitory computer readable medium of claim 15, wherein the processor is to communicate, via the control plane layer, by using at least:

an RRC layer between the user device and an anchor processor (AxP) in the ground network;

a packet data convergence protocol (PDCP) layer between the user device and the AxP in the ground network;

a radio link control (RLC) layer between the user device and the AxP in the ground network; and a physical (PHY)/medium access control (MAC) layer between the user device and user-link satellite in the satellite network.

17. The non-transitory computer readable medium of claim 15, wherein the processor is to communicate, via the user plane layer, by using at least:

a physical (PHY)/medium access control (MAC) layer between the user device and user-link satellite in the satellite network;

a radio link control (RLC) layer between the user device and a Ground System Node-B (GSNB) in the ground network; and a packet data convergence protocol (PDCP)/service data adaptation protocol (SDAP) layer between the user device and an anchor processor (AxP) in the ground network.

18. The non-transitory computer readable medium of claim 15, wherein the processor is to determine the intermediate satellite based on a routing table of inter-satellite links maintained by each satellite in the satellite network.

* * * * *